United States Patent
Bry et al.

(10) Patent No.: US 12,492,022 B2
(45) Date of Patent: Dec. 9, 2025

(54) ENVIRONMENT ILLUMINATION FOR AUTONOMOUS AERIAL VEHICLES

(71) Applicant: Skydio, Inc., Redwood City, CA (US)

(72) Inventors: Adam Parker Bry, Redwood City, CA (US); Abraham Galton Bachrach, San Francisco, CA (US); Kevin Patrick Smith O'Leary, San Francisco, CA (US); Asher Mendel Robbins-Rothman, Redwood City, CA (US); Zachary Albert West, Mountain View, CA (US); Daniel Thomas Adams, Palo Alto, CA (US); Christopher Brian Grasberger, Burlingame, CA (US); Enyu Luo, Redwood City, CA (US); Benjamin Scott Thompson, San Carlos, CA (US)

(73) Assignee: Skydio, Inc., San Mateo, CA (US)

(*) Notice: Subject to any disclaimer, the term of this patent is extended or adjusted under 35 U.S.C. 154(b) by 422 days.

(21) Appl. No.: 17/219,049

(22) Filed: Mar. 31, 2021

(65) Prior Publication Data

US 2021/0245860 A1   Aug. 12, 2021

Related U.S. Application Data

(63) Continuation of application No. 17/148,107, filed on Jan. 13, 2021.
(Continued)

(51) Int. Cl.
*B64U 20/83* (2023.01)
*B64U 10/14* (2023.01)
(Continued)

(52) U.S. Cl.
CPC ............ *B64U 20/83* (2023.01); *B64U 10/14* (2023.01); *B64U 20/87* (2023.01); *B64U 30/293* (2023.01);
(Continued)

(58) Field of Classification Search
CPC ........ B64C 2201/123; B64C 2201/127; B64D 47/02; B64U 2101/30; B64U 2101/31; B64U 2101/32; B64U 2201/10
(Continued)

(56) References Cited

U.S. PATENT DOCUMENTS

| 2,674,422 | A | | 4/1954 | Pellarini | |
| 3,676,736 | A | * | 7/1972 | Starer | ................ H05B 41/34 315/241 R |

(Continued)

FOREIGN PATENT DOCUMENTS

| CN | 101133283 A | * | 2/2008 | ............ B64D 47/06 |
| CN | 206407117 U | | 8/2017 | |

(Continued)

OTHER PUBLICATIONS

37 CFR §107.29; "Operation at night"; Mar. 21, 2024. (Year: 2024).*

(Continued)

*Primary Examiner* — Joshua J Michener

(57) ABSTRACT

Autonomous aerial vehicle technology and, more specifically, environmental illumination for autonomous unmanned aerial vehicles involves, in some embodiments, a UAV including upward-facing image capture devices, downward-facing image capture devices, one or more illumination sources, and a computer system. The computer system is configured to direct the one or more illumination sources to selectively emit light into a surrounding physical environment while the UAV is in flight, process images (Continued)

captured by any one or more of the plurality of upward-facing image capture devices or the plurality of downward-facing image capture devices to estimate a position and/or orientation of the aerial vehicle, generate a planned trajectory for the aerial vehicle through a physical environment based on the processing of the images, and control a propulsion system and/or flight surface of the aerial vehicle to cause the aerial vehicle to autonomously maneuver along the planned trajectory.

10 Claims, 39 Drawing Sheets

Related U.S. Application Data

(60) Provisional application No. 62/960,592, filed on Jan. 13, 2020.

(51) Int. Cl.
   | | | |
   |---|---|---|
   | *B64U 20/87* | (2023.01) | |
   | *B64U 30/293* | (2023.01) | |
   | *B64U 60/20* | (2023.01) | |
   | *B64U 60/50* | (2023.01) | |
   | *B64U 101/30* | (2023.01) | |

(52) U.S. Cl.
   CPC ............ *B64U 60/20* (2023.01); *B64U 60/50* (2023.01); *B64U 2101/30* (2023.01); *B64U 2201/104* (2023.01); *B64U 2201/20* (2023.01)

(58) Field of Classification Search
   USPC .................................................. 701/301, 523
   See application file for complete search history.

(56) References Cited

U.S. PATENT DOCUMENTS

| | | | |
|---|---|---|---|
| 4,044,364 A | 8/1977 | Prinzo | |
| 4,752,791 A | 6/1988 | Allred | |
| 4,825,232 A | 4/1989 | Howdle | |
| 5,426,476 A | 6/1995 | Fussell et al. | |
| 8,436,747 B2* | 5/2013 | Schoepp | B60Q 3/80 |
| | | | 701/301 |
| 8,453,962 B2 | 6/2013 | Shaw | |
| 8,938,160 B2 | 1/2015 | Wang | |
| 9,051,050 B2 | 6/2015 | Achtelik et al. | |
| 9,070,101 B2* | 6/2015 | Abhyanker | G06Q 10/0832 |
| 9,178,241 B2* | 11/2015 | Davidson | D07B 1/14 |
| 9,561,870 B2 | 2/2017 | Zhou et al. | |
| 9,720,413 B1* | 8/2017 | Lema | G05D 1/0088 |
| 10,015,412 B2* | 7/2018 | Marcellin | H04N 5/2621 |
| 10,056,001 B1* | 8/2018 | Harris | G06V 10/56 |
| 10,099,783 B1 | 10/2018 | Nilson | |
| 10,455,155 B1 | 10/2019 | Kalinowski et al. | |
| 10,508,683 B2 | 12/2019 | Chen et al. | |
| 10,571,933 B2* | 2/2020 | Russell | G08G 5/0069 |
| 10,625,855 B2 | 4/2020 | Deng et al. | |
| 10,710,701 B2 | 7/2020 | Tian et al. | |
| 10,793,267 B2 | 10/2020 | Lee et al. | |
| 10,996,543 B2* | 5/2021 | Tolan | F21V 21/406 |
| 2005/0031335 A1 | 2/2005 | Itzkowitz | |
| 2013/0115544 A1* | 5/2013 | Davidson | H02K 7/1807 |
| | | | 290/1 A |
| 2013/0344417 A9* | 12/2013 | Davidson | F02C 6/00 |
| | | | 290/1 A |
| 2014/0037278 A1 | 2/2014 | Wang | |
| 2014/0180914 A1* | 6/2014 | Abhyanker | G05D 1/102 |
| | | | 705/332 |
| 2015/0097950 A1 | 4/2015 | Wang et al. | |
| 2015/0259066 A1 | 9/2015 | Johannesson et al. | |
| 2015/0285429 A1 | 10/2015 | Le | |
| 2016/0043807 A1* | 2/2016 | Davidson | H01M 8/22 |
| | | | 60/722 |
| 2016/0152345 A1* | 6/2016 | Molnar | B64C 27/08 |
| | | | 244/39 |
| 2016/0176520 A1 | 6/2016 | Goldstein | |
| 2016/0229556 A1 | 8/2016 | Zhou et al. | |
| 2016/0344981 A1* | 11/2016 | Lunt | G08G 5/0026 |
| 2017/0176575 A1* | 6/2017 | Smits | G01S 7/4808 |
| 2017/0221394 A1* | 8/2017 | Garcia Morchon | G09F 19/18 |
| 2017/0313400 A1 | 11/2017 | Zhydanov | |
| 2018/0070024 A1* | 3/2018 | Marcellin | H04N 23/671 |
| 2018/0105254 A1 | 4/2018 | Tian et al. | |
| 2018/0113462 A1 | 4/2018 | Fenn et al. | |
| 2018/0149949 A1 | 5/2018 | Kim et al. | |
| 2018/0155024 A1 | 6/2018 | Lee et al. | |
| 2018/0297716 A1 | 10/2018 | Ni | |
| 2018/0312251 A1 | 11/2018 | Petrov | |
| 2018/0327092 A1 | 11/2018 | Deng et al. | |
| 2018/0346148 A1 | 12/2018 | Zhang | |
| 2018/0373127 A1 | 12/2018 | Peng et al. | |
| 2019/0187726 A1* | 6/2019 | Russell | G08G 5/04 |
| 2019/0329903 A1* | 10/2019 | Thompson | G06V 20/17 |
| 2020/0003357 A1 | 1/2020 | Su et al. | |
| 2020/0070974 A1 | 3/2020 | Peng et al. | |
| 2020/0191225 A1 | 6/2020 | Chen et al. | |
| 2020/0271269 A1 | 8/2020 | Liu et al. | |
| 2020/0284392 A1 | 9/2020 | Su et al. | |
| 2021/0003905 A1* | 1/2021 | Tolan | H05B 47/19 |
| 2021/0004003 A1* | 1/2021 | Gury | G01S 17/933 |
| 2021/0214067 A1* | 7/2021 | West | B64C 39/024 |
| 2021/0214068 A1* | 7/2021 | Bry | B64C 1/30 |
| 2022/0315220 A1* | 10/2022 | Bachrach | G06V 20/17 |

FOREIGN PATENT DOCUMENTS

| | | | | |
|---|---|---|---|---|
| CN | 107719660 A | 2/2018 | | |
| CN | 207045662 U | 2/2018 | | |
| CN | 207045678 U | 2/2018 | | |
| CN | 207078311 U | 3/2018 | | |
| CN | 108248815 A | 7/2018 | | |
| EP | 3210658 A1 | 8/2017 | | |
| EP | 3225539 A1 | 10/2017 | | |
| JP | 2017-197169 A | 11/2017 | | |
| KR | 10-1527544 B1 | 6/2015 | | |
| KR | 10-2017-0058523 A | 5/2017 | | |
| WO | WO-2012013950 A2 * | 2/2012 | | B64B 1/50 |
| WO | 2017/020225 A1 | 2/2017 | | |
| WO | 2019084815 A1 | 5/2019 | | |
| WO | 2019/143255 A1 | 7/2019 | | |
| WO | WO-2020008962 A1 * | 1/2020 | | G01S 17/10 |

OTHER PUBLICATIONS

Deiterich, Chuck; "Two Flash or Not Two Flash"; Mar. 15, 2019; KitPlanes.com; <https://www.kitplanes.com/two-flash-or-not-two-flash/>. (Year: 2019).*

Rupprecht, Jonathan; "Ultimate Guide-Drone Anti-Collision Lights for Night Flying"; Jun. 30, 2017; Rupprecht Law P.A.; <https://jrupprechtlaw.com/drone-anti-collision-lights/>. (Year: 2017).*

International Application No. PCT/US2021/013255, International Search Report & Written Opinion, 14 pages, Mar. 26, 2021.

Japanese Patent Application No. 2022-542981, Office Action, 13 pages, Jul. 25, 2023.

European Patent Application No. 21741368.1, Extended European Search Report, 14 pages, Dec. 22, 2023.

Japanese Patent Application No. 2022-542981, Final Office Action, 11 pages, Apr. 23, 2024.

* cited by examiner

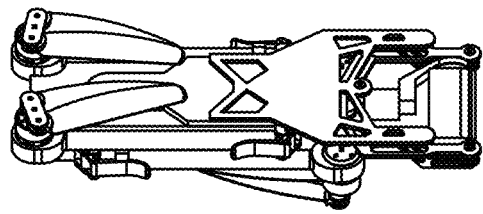
391a
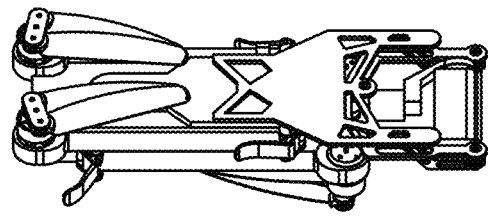
391b
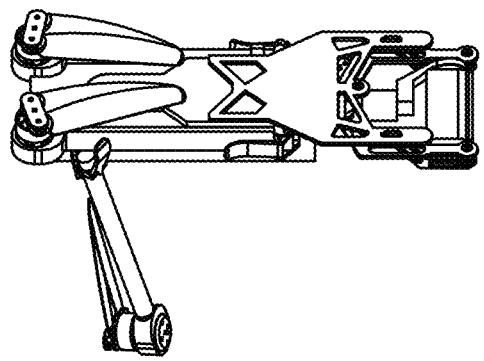
391c
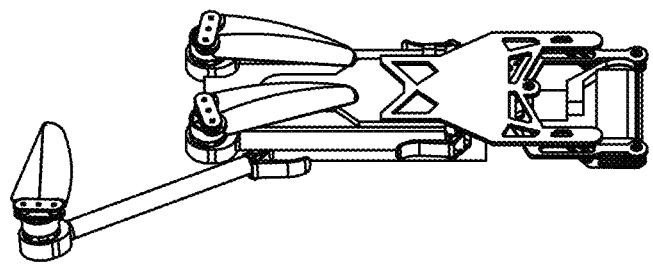
391d
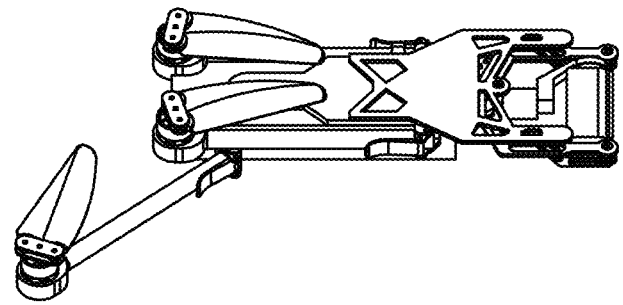
391e
FIG. 3L

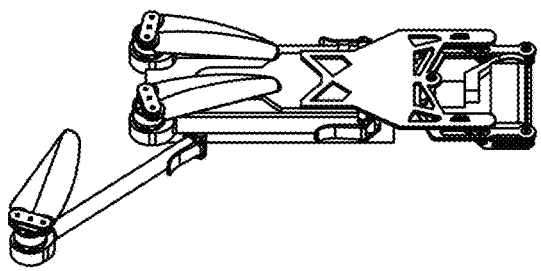
392a
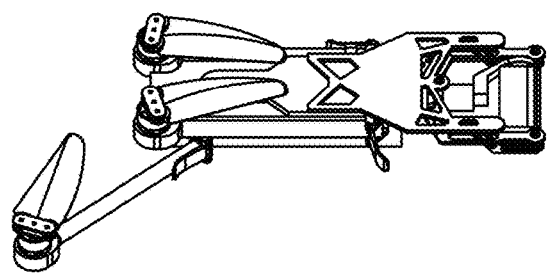
392b
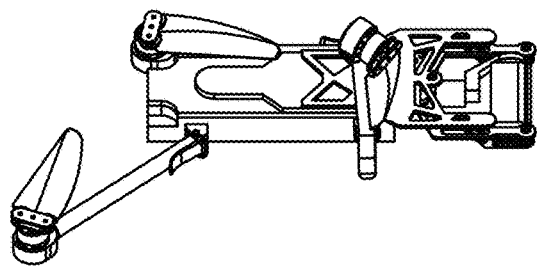
392c
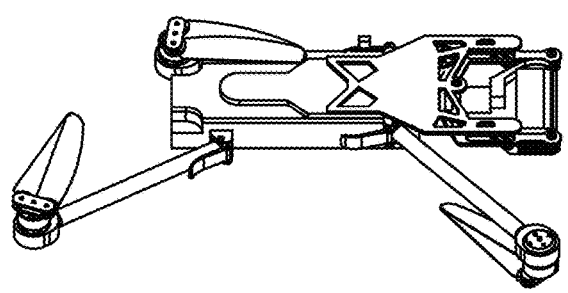
392d
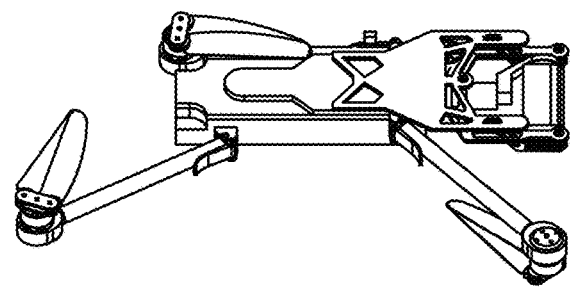
392e
FIG. 3M

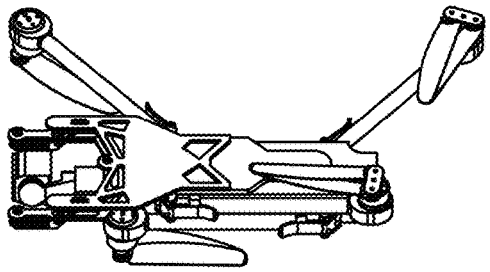
393a
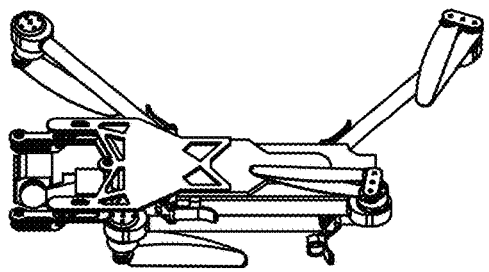
393b
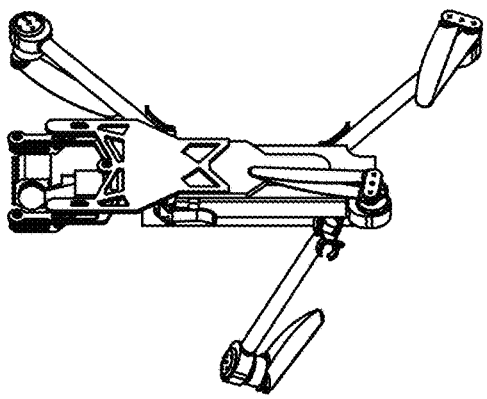
393c
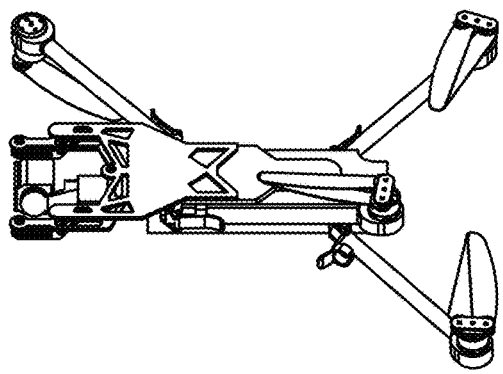
393d
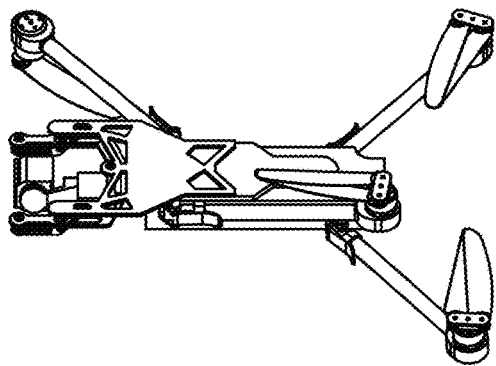
393e
FIG. 3N

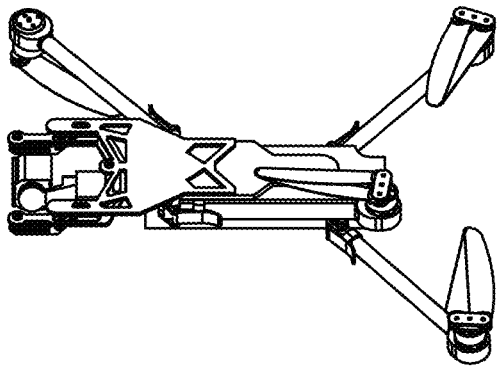
394a
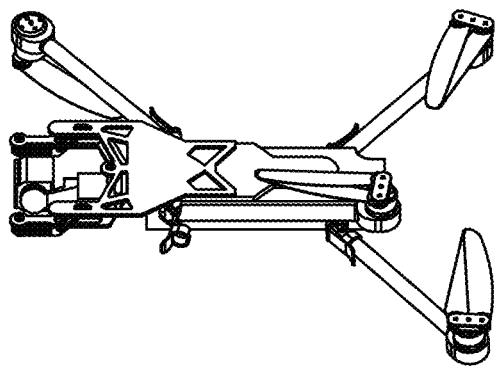
394b
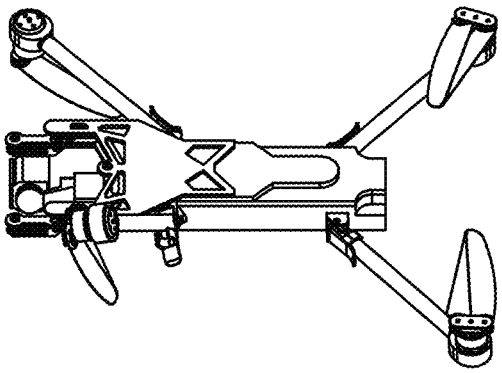
394c
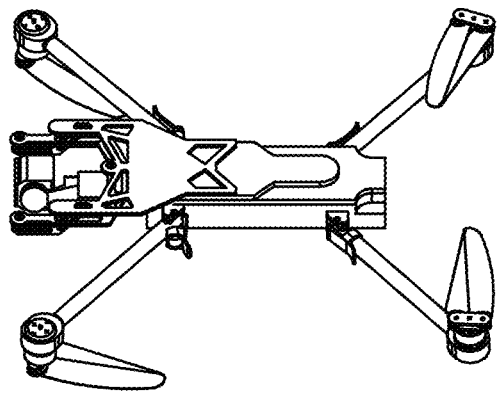
394d
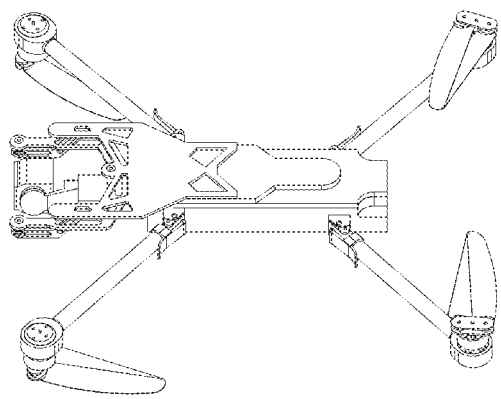
394e
FIG. 3O

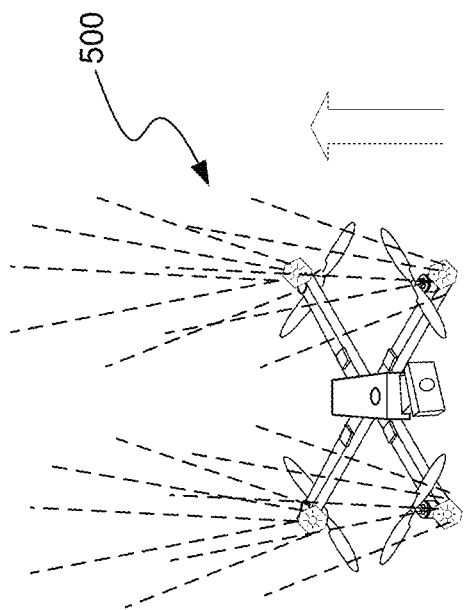
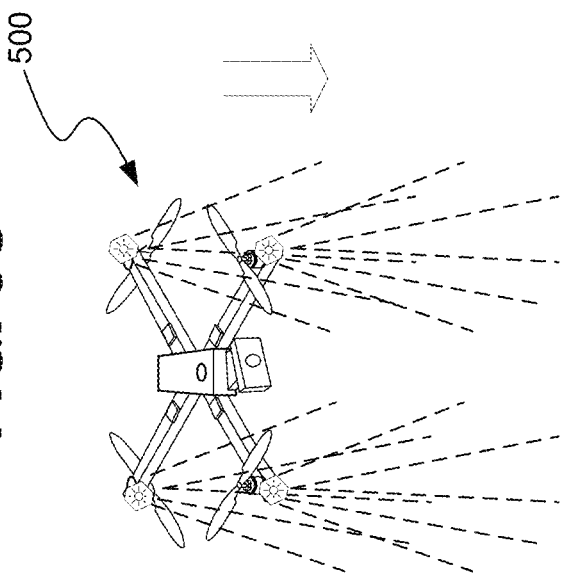
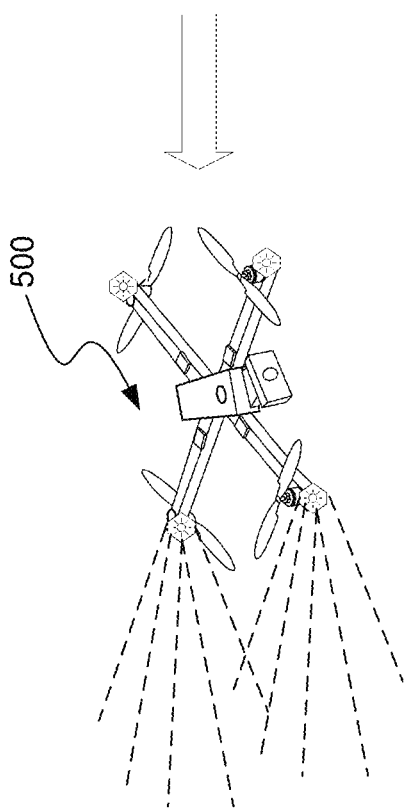
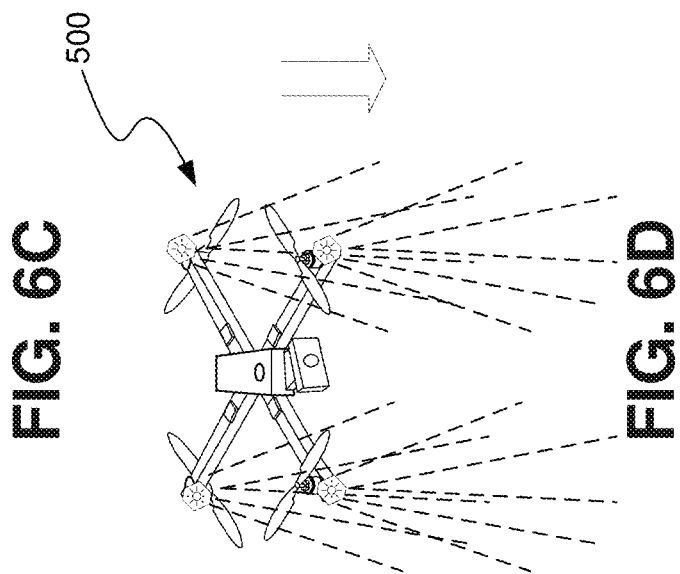

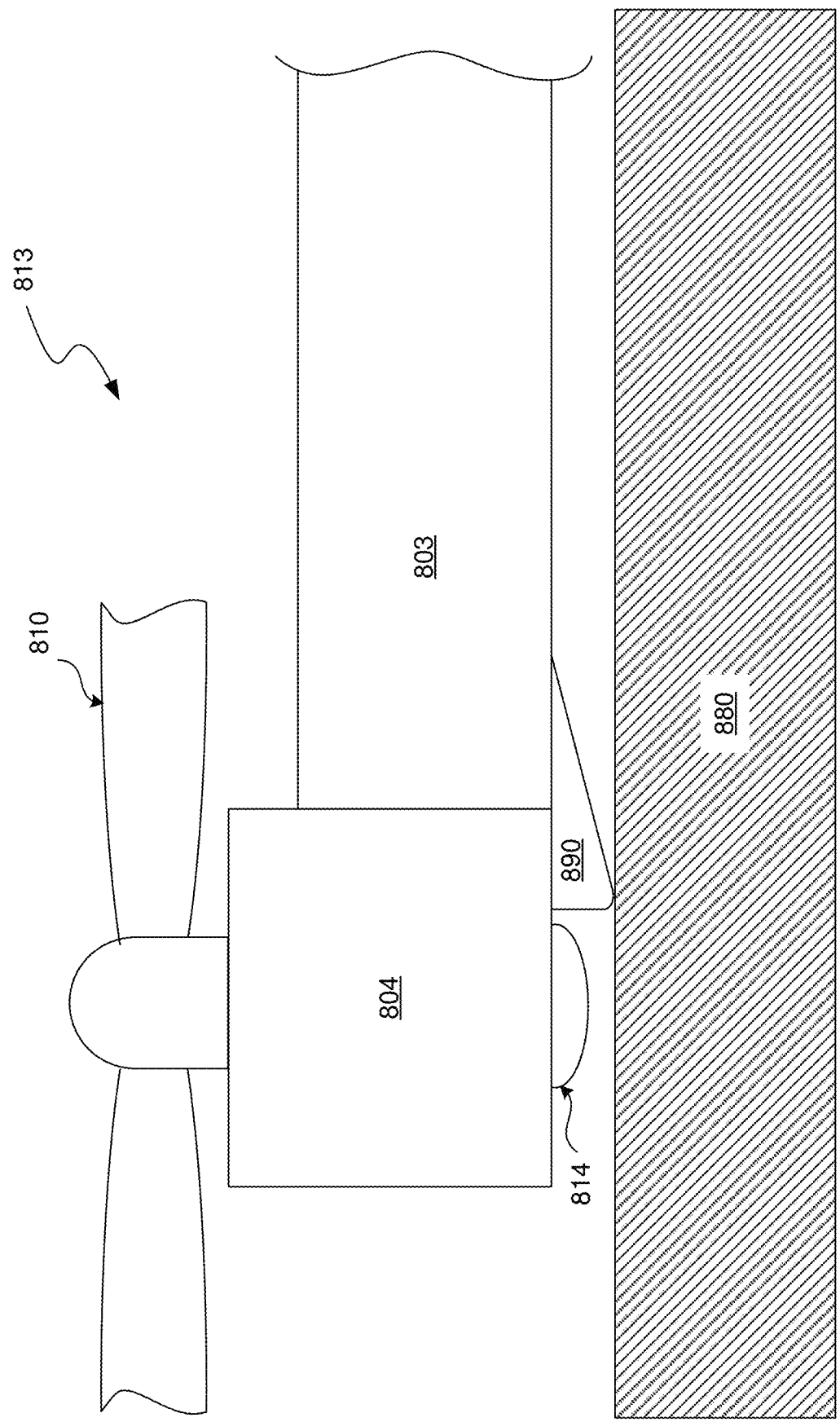

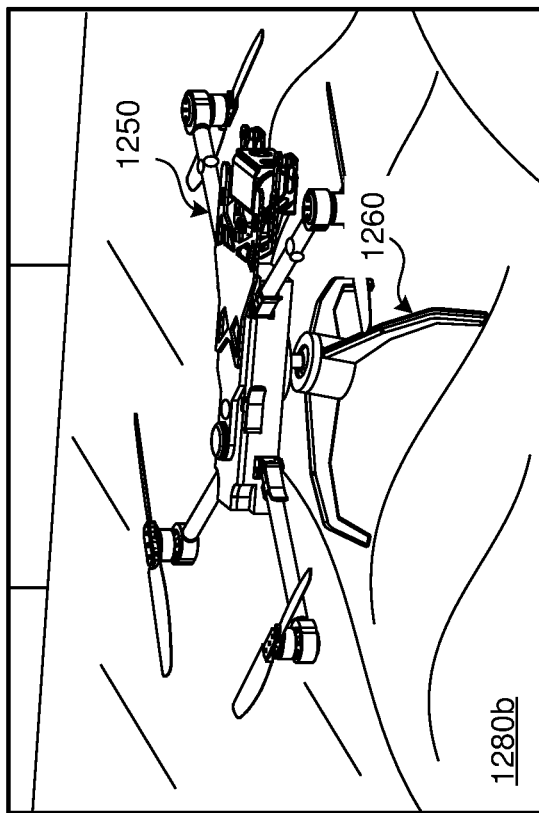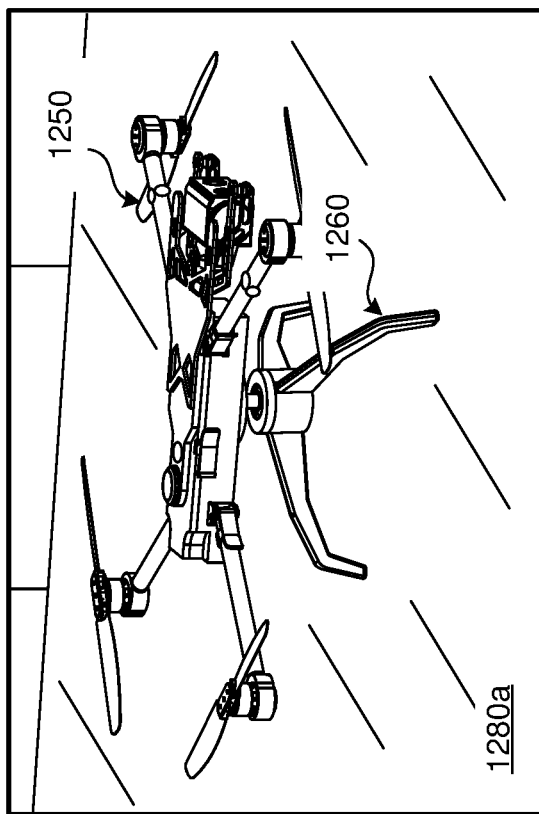
FIG. 12B

ENVIRONMENT ILLUMINATION FOR AUTONOMOUS AERIAL VEHICLES

CROSS REFERENCE TO RELATED APPLICATION

This application is a continuation of U.S. patent application Ser. No. 17/148,107, filed on Jan. 13, 2021, titled "Autonomous Unmanned Aerial Vehicle With Folding Collapsible Arms," which claims priority to and benefit from U.S. Provisional Patent Application Ser. No. 62/960,592, filed on Jan. 13, 2020, titled "Unmanned Aerial Vehicle"; both of which are expressly incorporated by reference herein.

BACKGROUND

Vehicles can be configured to autonomously navigate a physical environment. For example, an autonomous vehicle with various onboard sensors can be configured to generate perception inputs based on the surrounding physical environment that are then used to estimate positions and/or orientations of the autonomous vehicle within the physical environment. In some cases, the perception inputs may include images of the surrounding physical environment captured by cameras on board the vehicle. An autonomous navigation system can then utilize these position and/or orientation estimates to guide the autonomous vehicle through the physical environment.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 6A-6D show a series of depictions of an example UAV with illumination sources that illustrate selective illumination based on the motion of the UAV in accordance with some embodiments.

FIG. 8A shows a side view of an example protective structural element for an image capture device in accordance with some embodiments.

FIGS. 12B-12E show various view of an example self-leveling landing gear for a UAV in accordance with some embodiments.

Figure 1:
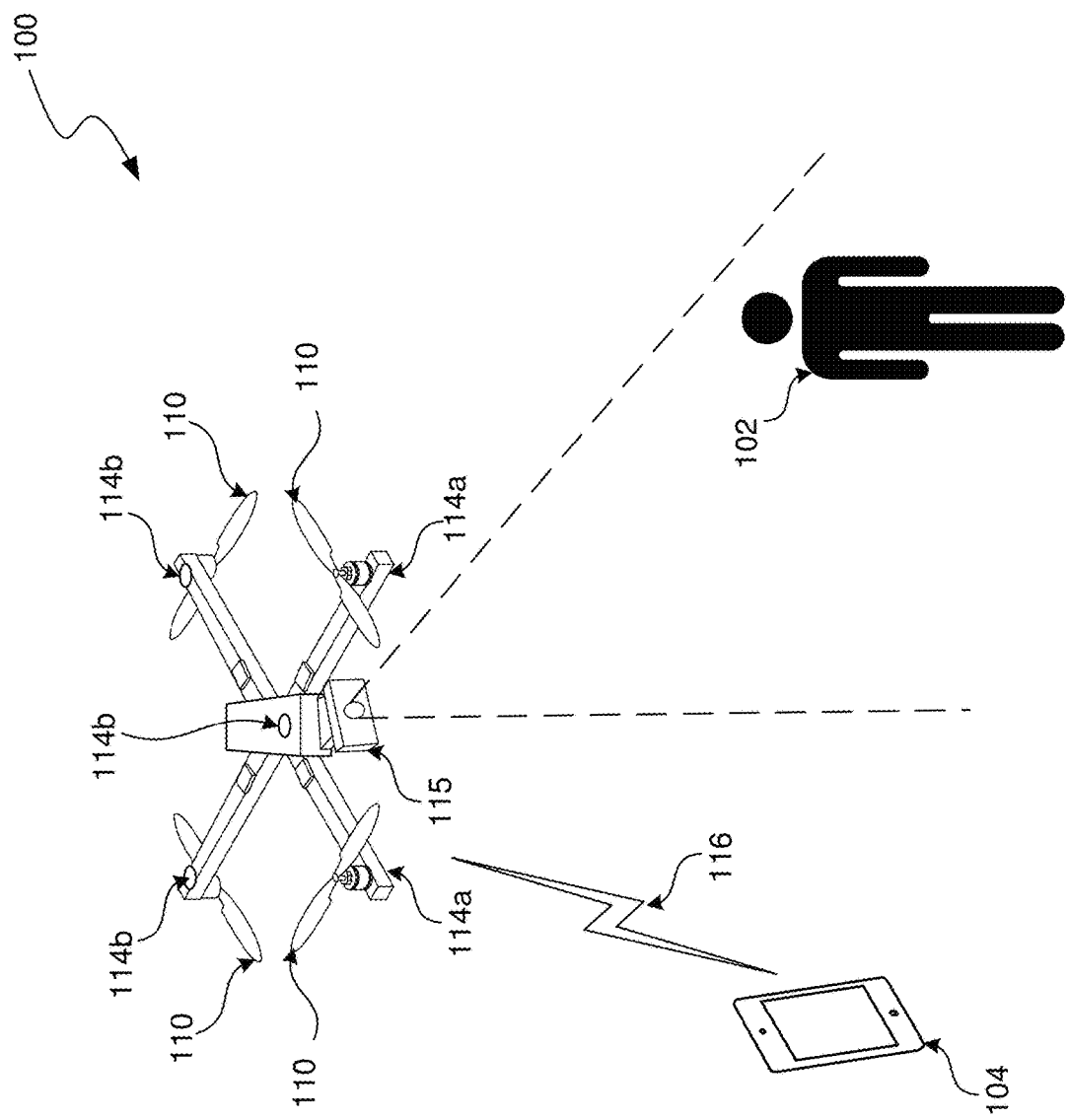
FIG. 1 shows an example implementation of an autonomous unmanned aerial vehicle (UAV) in accordance with some embodiments.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

There is considerable interest in using aerial vehicles to facilitate aerial reconnaissance, mapping and inspection of buildings and other structures, assisting in public safety and law enforcement operations, and assisting in many other commercial applications including: aerial photography (e.g., for real estate, marketing, etc.), high-resolution photogrammetry (e.g., for structural inspection), scanning (e.g., for inventory management), mapping for augmented reality, inspection for damage, repair, certification, etc. of physical infrastructure (e.g., roofs, bridges, communications infrastructure, etc.).

Autonomous unmanned aerial vehicles (UAVs), for example as offered by Skydio™, are uniquely positioned in this space owing to their high level of autonomy. Conventional UAVs typically require manual operation or offer quasi-autonomous functionality such as pre-planned scanning patterns with little to no obstacle avoidance. Such existing UAVs require a skilled human operator which increases operating costs. The lack of effective obstacle avoidance and smart motion planning mechanisms in conventional UAVs may also increase the potential liability of the operators of such UAVs. By comparison, embodiments of an UAV are described herein that provide advanced autonomous functionality such as: reliable obstacle avoidance (which reduces risk to personnel and property), high-level autonomous motion planning (which mitigates the need for skilled operators and enables capturing viewpoints inaccessible to other vehicles), vision-based position and/or motion estimation (which allows a level of precision not available on other products), and an intuitive and powerful UX that is tightly coupled with autonomy capabilities (which enables intuitive specification of complex tasks by new users).

Example Implementation of an Autonomous Aerial Vehicle

FIG. 1 shows an example implementation of autonomous aerial vehicle that can be configured according to the introduced technique. Specifically, FIG. 1 shows an example implementation of an unmanned aerial vehicle (UAV) 100 in the form of a rotor-based aircraft such as a "quadcopter." The example UAV 100 includes propulsion and control actuators 110a-b (e.g., powered rotors and/or aerodynamic control surfaces) for maintaining controlled flight, and one or more image capture devices 114a-c and 115 for capturing images of the surrounding physical environment while in flight. "Images," in this context, include both still images and captured video. Although not shown in FIG. 1, UAV 100 may also include other sensors (e.g., audio sensors, proximity sensors, etc.) and systems for communicating with other devices (e.g., a mobile device 104) via a wireless communication channel 116.

In the example depicted in FIG. 1, the image capture devices 114a-c and/or 115 are depicted capturing images of an object 102 in the physical environment that happens to be a person. In some cases, the image capture devices 114a-c/115 may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices 114a-c/115. While in autonomous flight, UAV 100 can also capture images using any one or more image capture devices that can be displayed in real time and/or recorded for later display at other devices (e.g., mobile device 104).

FIG. 1 shows an example configuration of a UAV 100 with multiple image capture devices configured for different purposes. In the example configuration shown in FIG. 1, the UAV 100 includes multiple image capture devices 114a-c arranged at various locations around a body of the UAV 100. For example, as depicted in FIG. 1, UAV 100 includes one or more downward facing image capture devices 114a that are arranged along a bottom surface of a rotor arm and/or a bottom surface of a central body of the UAV 100. UAV 100 also includes one or more upward facing image capture devices 114b that are arranged along a top surface of a rotor arm and/or a top surface of the body of the UAV 100. In the example depicted in FIG. 1, UAV 100 includes three downward facing image capture devices 114a and three upward facing image capture devices that are configured to provide stereoscopic image capture up to a full 360 degrees around the UAV 100. The UAV 100 depicted in FIG. 1 is just an example provided for illustrative purposes. In other embodiments, such image capture devices may instead be arranged about a perimeter of the UAV 100. In any case, the image capture devices 114a-b may be configured to capture images for use by a visual navigation system in guiding autonomous flight by the UAV 100 and/or a tracking system for tracking other objects in the physical environment (e.g., as described with respect to FIG. 2).

In addition to the array of image capture devices 114, the UAV 100 depicted in FIG. 1 also includes another image capture device 115 configured to capture images that are to be displayed, but not necessarily used, for autonomous navigation. In some embodiments, the image capture device 115 may be similar to the image capture devices 114a-b except in how captured images are utilized. However, in other embodiments, the image capture devices 115 and 114a-b may be configured differently to suit their respective roles.

In many cases, it is generally preferable to capture images that are intended to be viewed at as high a resolution as possible given hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., above 3840× 2160) color images, while the image capture devices 114a-b may be configured to capture relatively low resolution (e.g., below 320×240) grayscale images. Again, these configurations are examples provided to illustrate how image capture devices 114a-b and 115 may differ depending on their respective roles and constraints of the system. Other implementations may configure such image capture devices differently.

The UAV 100 can be configured to track one or more objects such as a human subject 102 through the physical environment based on images received via the image capture devices 114a-b and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

The mobile device 104 depicted in both FIG. 1 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
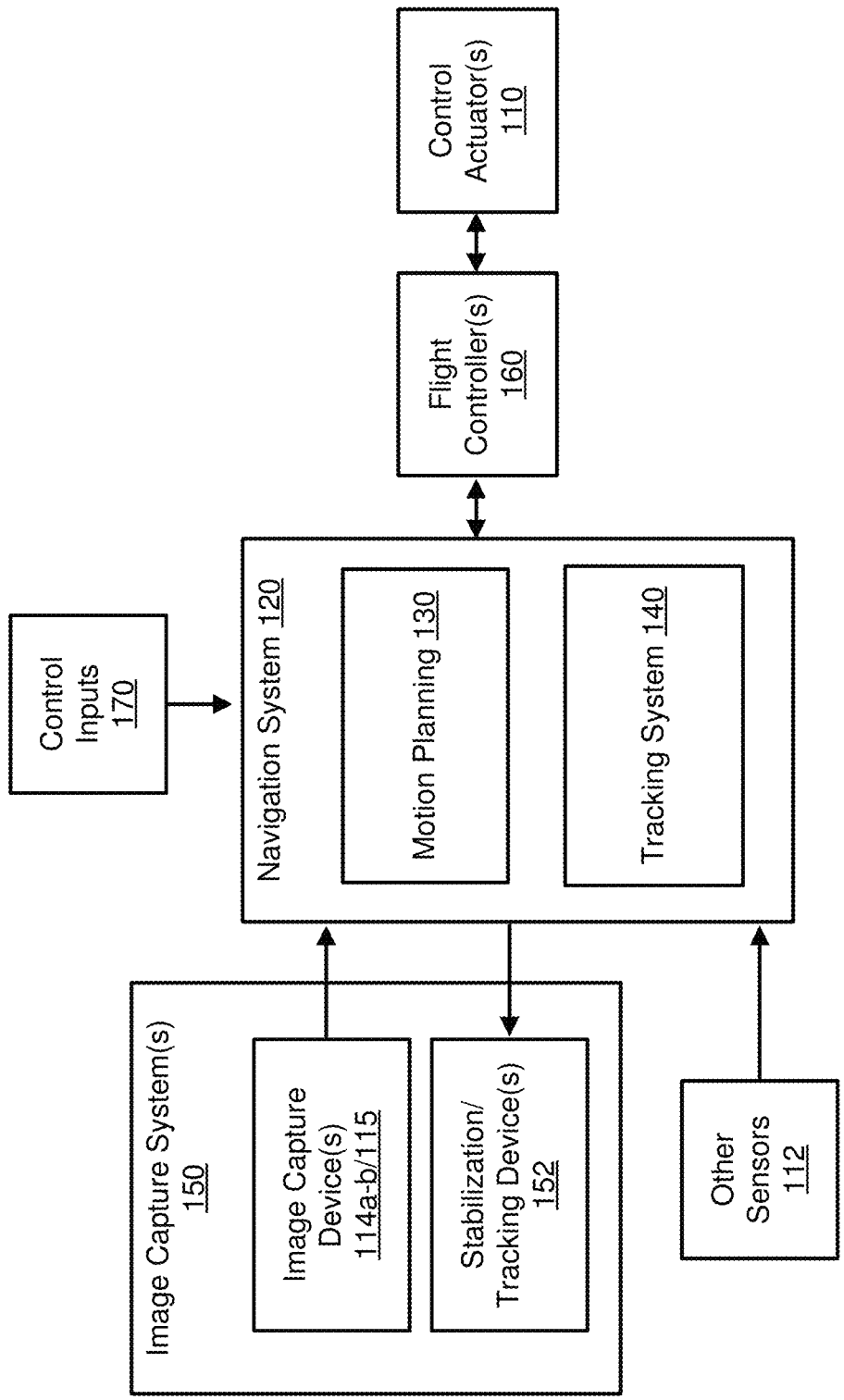
FIG. 2 is a block diagram that illustrates an example navigation system that may be implemented as part of a UAV in accordance with some embodiments.

FIG. 2 is a block diagram that illustrates an example navigation system 120 that may be implemented as part of the example UAV 100. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment and a tracking system 140 for tracking one or more objects in the physical environment. Note that the arrangement of systems shown in FIG. 2 is an example provided for illustrative purposes and is not to be construed as limiting. For example, in some embodiments, the tracking system 140 may be separate from the navigation system 120. Further, the subsystems making up the navigation system 120 may not be logically separated as shown in FIG. 2 and instead may effectively operate as a single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114*a-b* and/or 115, data from other sensors 112 (e.g., IMU, GPS, proximity sensors, etc.), and/or one or more control inputs 170. Control inputs 170 may be from external sources such as a mobile device operated by a user or may be from other systems onboard the UAV 100.

In some embodiments, the navigation system 120 may generate control commands configured to cause the UAV 100 to maneuver along the planned trajectory generated by the motion planner 130. For example, the control commands may be configured to control one or more control actuators 110 (e.g., powered rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of the UAV 100 itself and of other objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause one or more stabilization/tracking devices 152 to adjust an orientation of any image capture devices 114*a-b*/115 relative to the body of the UAV 100 based on the tracking of one or more objects. Such stabilization/tracking devices 152 may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion. The image capture devices 114*a-b*/115 and associated stabilization/tracking devices 152 are collectively depicted in FIG. 2 as an image capture system 150.

In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain or all built-in objectives or embodiments described herein, such as obstacle avoidance and vehicle dynamic limits, can be combined with other input objectives (e.g., a landing objective) or embodiments as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands (usable by control actuators 110) that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

Folding Rotor Arms

Examples discussed herein relate to autonomous aerial vehicle technology and, more specifically, to autonomous unmanned aerial vehicles with folding collapsible arms.

In some embodiments, the rotor arms of a UAV may be foldable. Specifically, the rotor arms may include a mechanism that allows the rotor arms to move between a folded state (or position) and an extended state (or positions) for flight. Foldable rotor arms provide several benefits over non-foldable rotor arms including, for example, improved portability, improved storage efficiency, reduced likelihood of damage to rotors and arm-mounted cameras during non-operation, etc.

FIGS. 3A-3H show various views of an example UAV 300 with foldable rotor arms, according to some implementations. UAV 300 may be similar to the UAV 100 depicted in FIG. 1, except that the arms are foldable or collapsible.

Figure 3B:
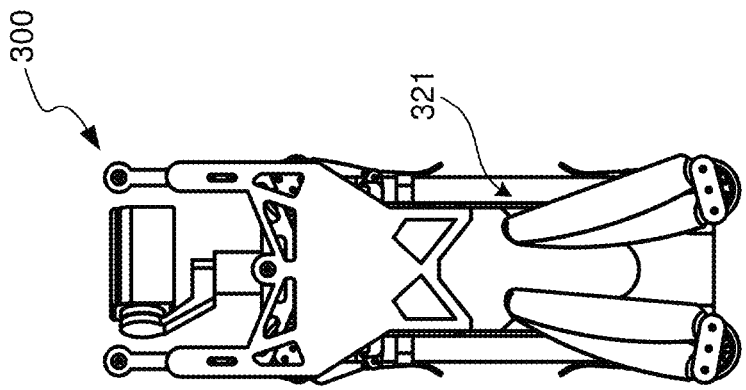
FIGS. 3A-3O show various views of an example UAV with foldable rotor arms in accordance with some embodiments.
Figure 3A:
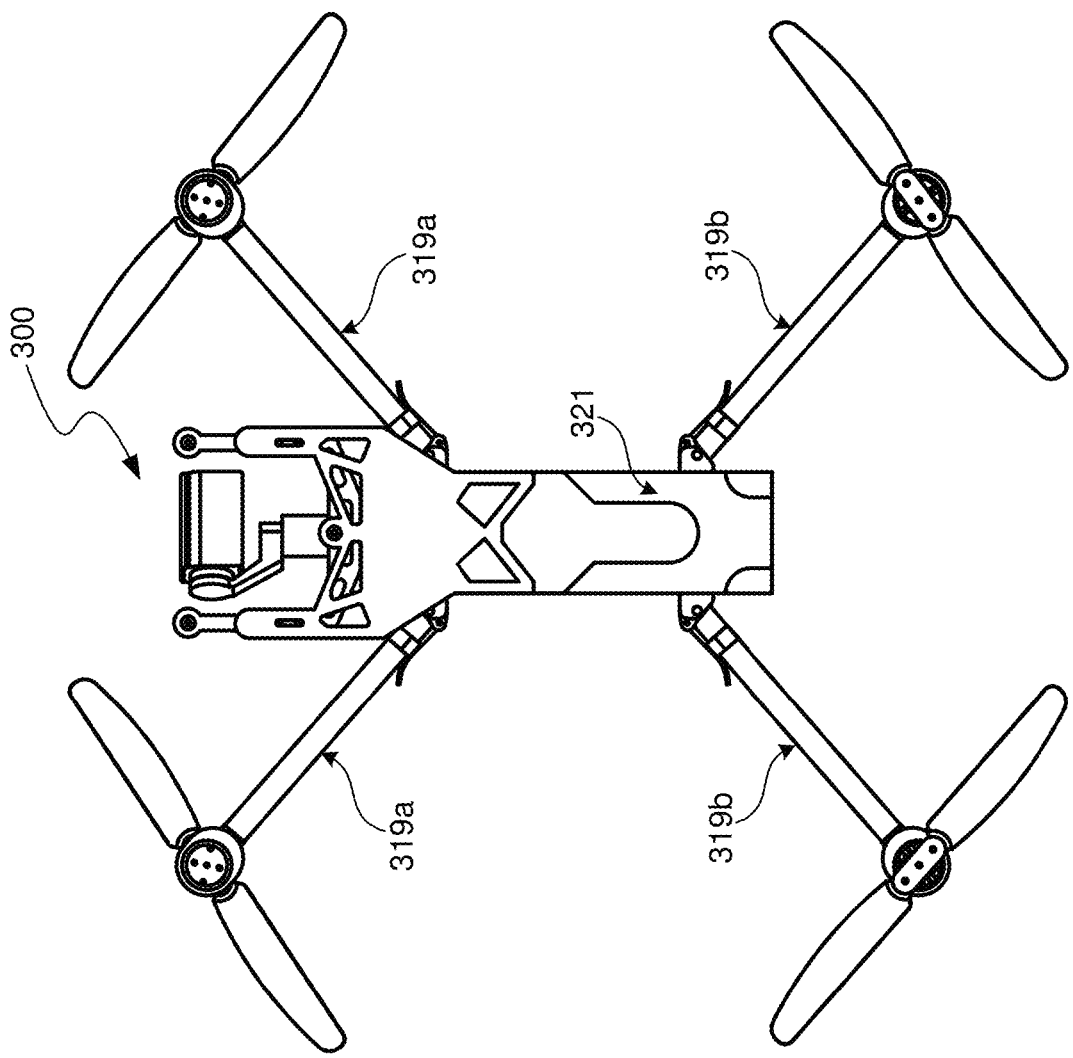

FIG. 3A shows a top view of UAV 100 in which the multiple rotor arms 319a-b are extended in an operational flight configuration, and FIG. 3B shows a top view of the UAV 100 in which the multiple rotor arms 319a-b are folded in a non-operation configuration. As indicated in FIGS. 3A-3B, when folded, the arms 319a-b of the UAV 300 may align substantially flush with a side wall of a central body 321 of the UAV 300 such that, when in a folded state, the overall size and shape of the UAV 300 is not substantially greater than the size and shape of the central body 321 of the UAV 300.

Figure 3C:
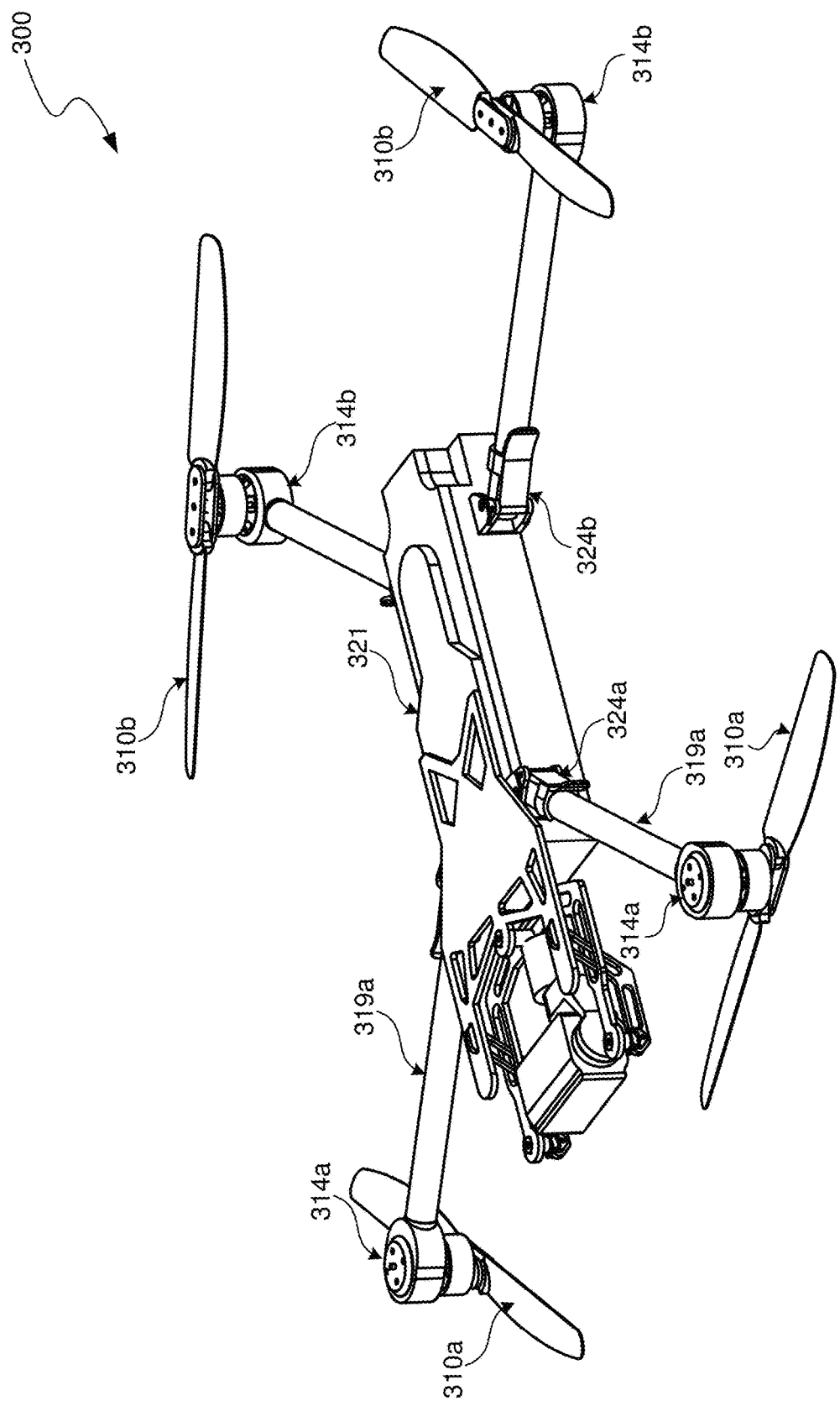

FIG. 3C shows a perspective view of the UAV 300 with the arms 319a in an extended state. As shown in FIG. 3A, in the extended state, downward facing rotors 310a and upward facing image capture device 314a are coupled to arms 319a. Similarly, upward facing rotors 310b and downward facing image capture devices 314b are coupled to arms 319b. Rotors 310a-b may correspond with the rotors 110 of UAV 100 and image capture devices 314a-b may correspond with image capture devices 114a-b of UAV 100. In other words, image capture devices 314a-b may be utilized for capturing images of an environment surrounding UAV 300 that are used for the autonomous navigation of the UAV 300.

Figure 3D:
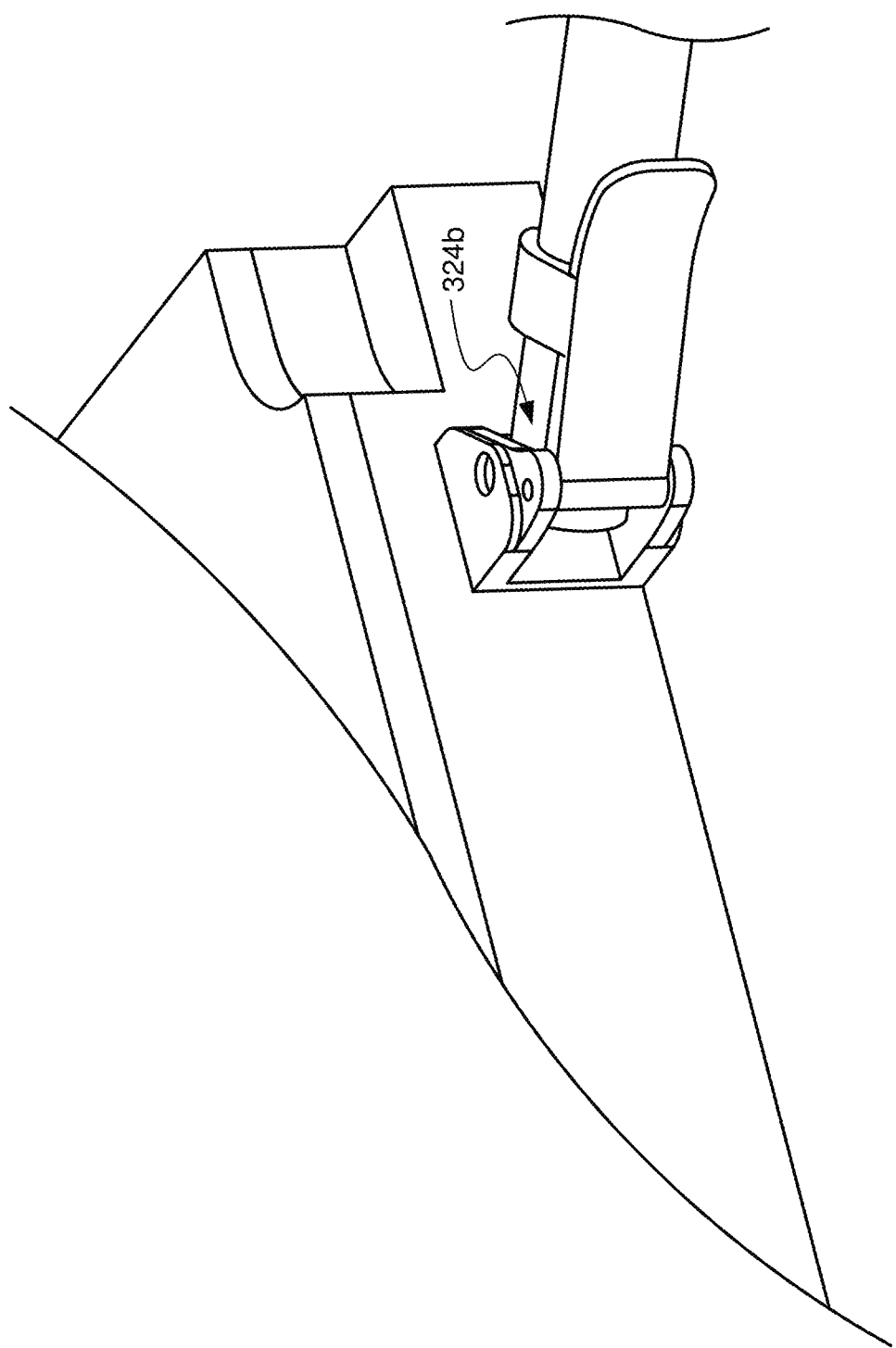

The rotor arms 319a-b are dynamically coupled to a central body 321 of the UAV 300 by respective hinge mechanisms 324a-b. FIG. 3D shows a detail view of one of the example hinge mechanisms 324b. The hinge mechanisms 324a-b are configured to move the respective rotor arms 319a-b between an extended state (as shown in FIG. 3C) and a folded state (e.g., as shown in FIG. 3B).

Notably, when in the extended state, each hinge mechanism 324a-b is configured to rigidly lock the respective rotor arm 319a-b in place such that any coupled image capture devices 314a-b do not substantially move relative to each other or to the central body 321 of the UAV 300. Preventing any substantial relative motion between the multiple image capture devices 314a-b is particularly important where the images taken from the devices 314a-b are used as perception inputs by an autonomous navigation system (e.g., autonomous navigation system 120) to guide the autonomous behavior of the UAV 300.

Figure 3E:
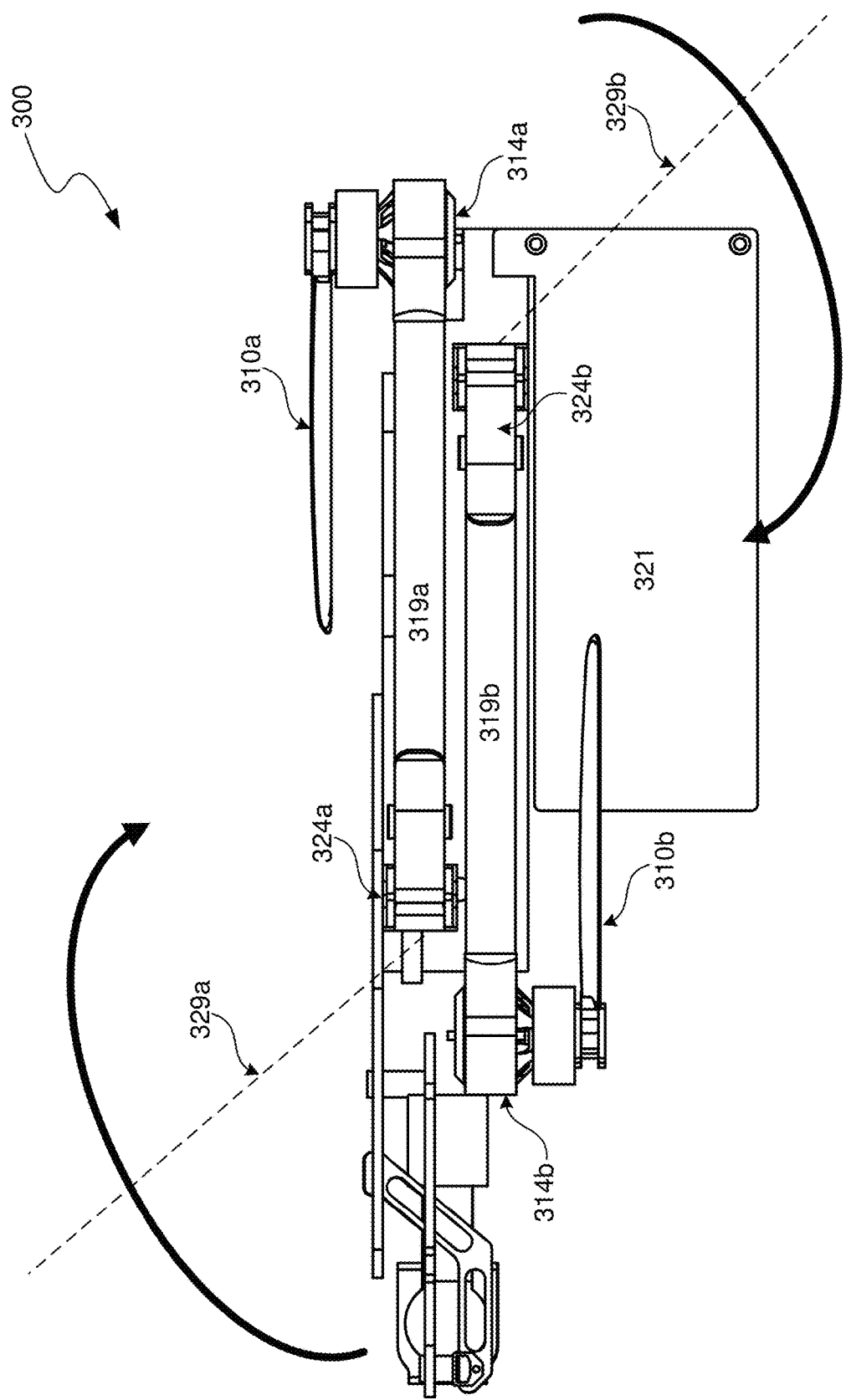
Figure 3F:
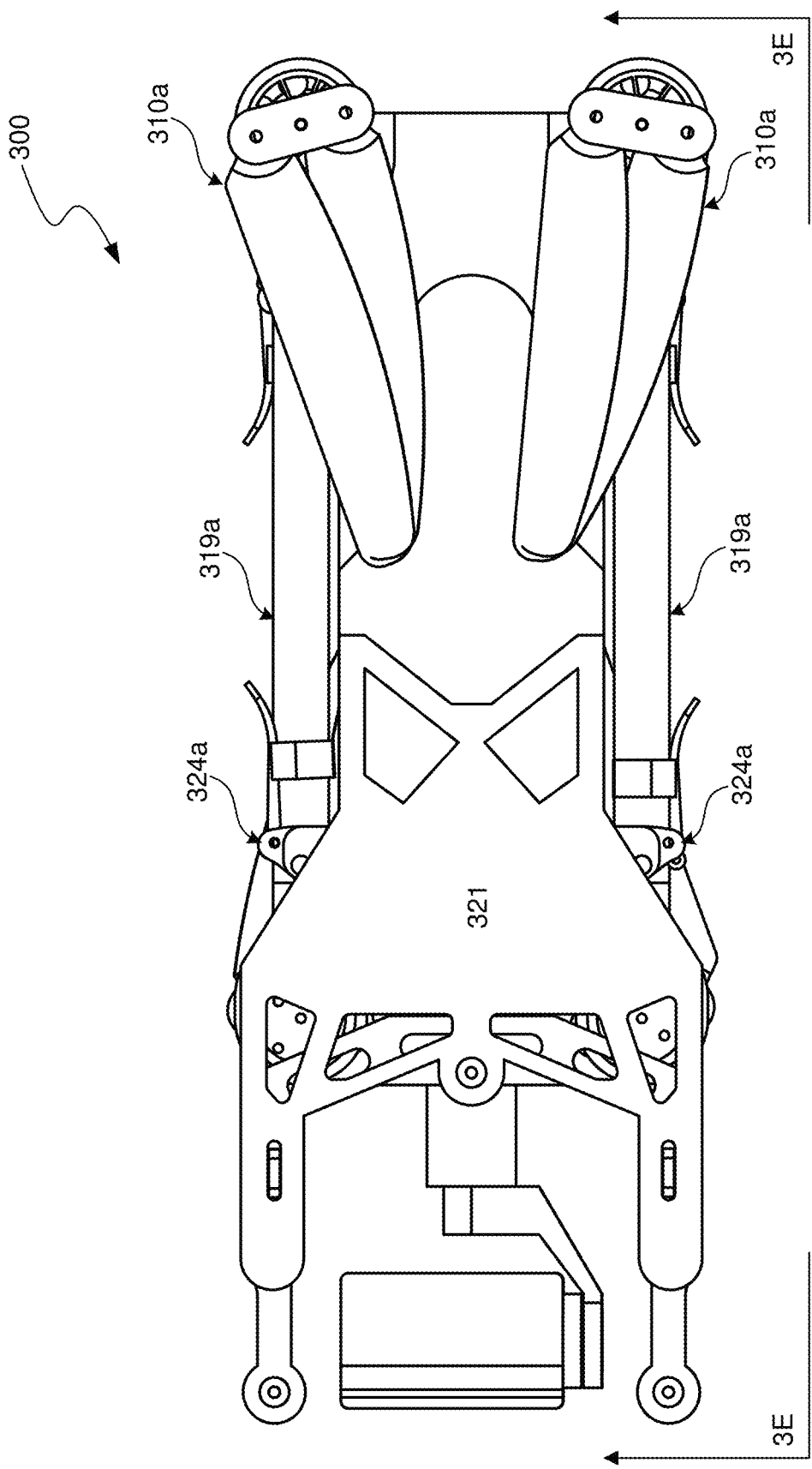
Figure 3G:
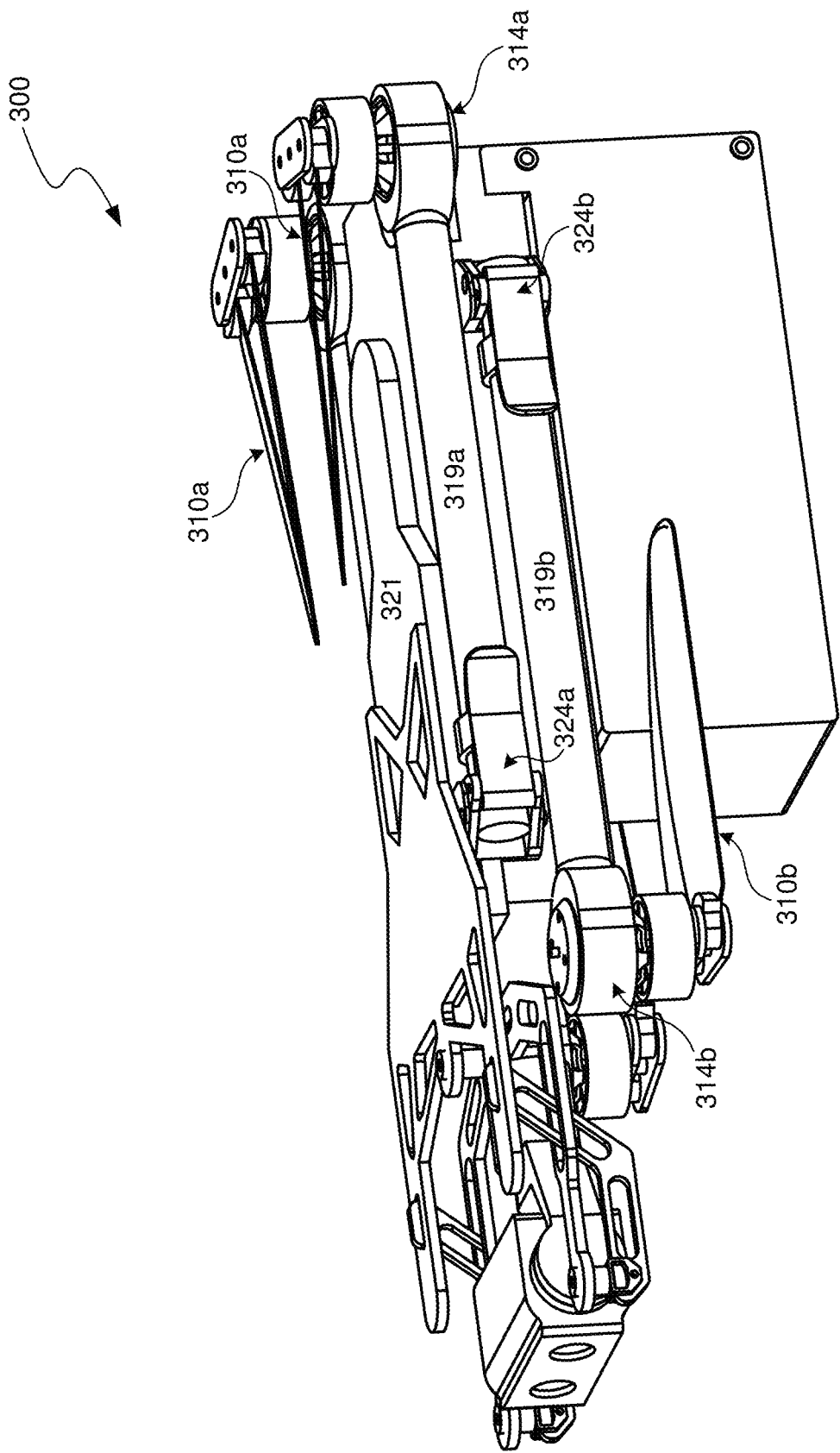

In some embodiments, the hinge mechanisms 324a-b are configured to rotate the respective arms 319a-b about an axis of rotation that is at an oblique angle relative to the central body 321 of the UAV 300. FIG. 3E shows a side view of the UAV 300 that illustrates an example folding configuration. As shown in FIG. 3E, a first hinge mechanism 324a is configured to rotate the rotor arm 310a about a first axis or rotation 329a that is at an oblique angle (e.g., ~45 degrees off an x, y, and/or z axis) relative to a central body 321 of the UAV 300. Accordingly, when in a folded state, the arm 319a is oriented such that rotor 310a is facing upwards and image capture device 314a is facing downwards. This is in contrast to the extended state of the same arm 319a, depicted in FIG. 3C, which shows the rotor 310a facing downwards and the image capture device 314a facing upwards. Similarly, a second hinge mechanism 324b is configured to rotate the rotor arm 310b about a second axis of rotation 329b that is also at an oblique angle (e.g., ~45 degrees off an x, y, and/or z axis) relative to a central body 321 of the UAV 300. Accordingly, when in a folded state, the arm 319b is oriented such that rotor 310ab is facing downwards and image capture device 314b is facing upwards. This is in contrast to the extended state of the same arm 319b, depicted in FIG. 3C, which shows the rotor 310b facing upwards and the image capture device 314b facing downwards. A top view of the UAV 300 showing the rotor arms in the folded state is depicted in FIG. 3F, and a perspective view of the UAV 300 showing the rotor arms in the folded state is depicted in FIG. 3G.

Figure 3H:
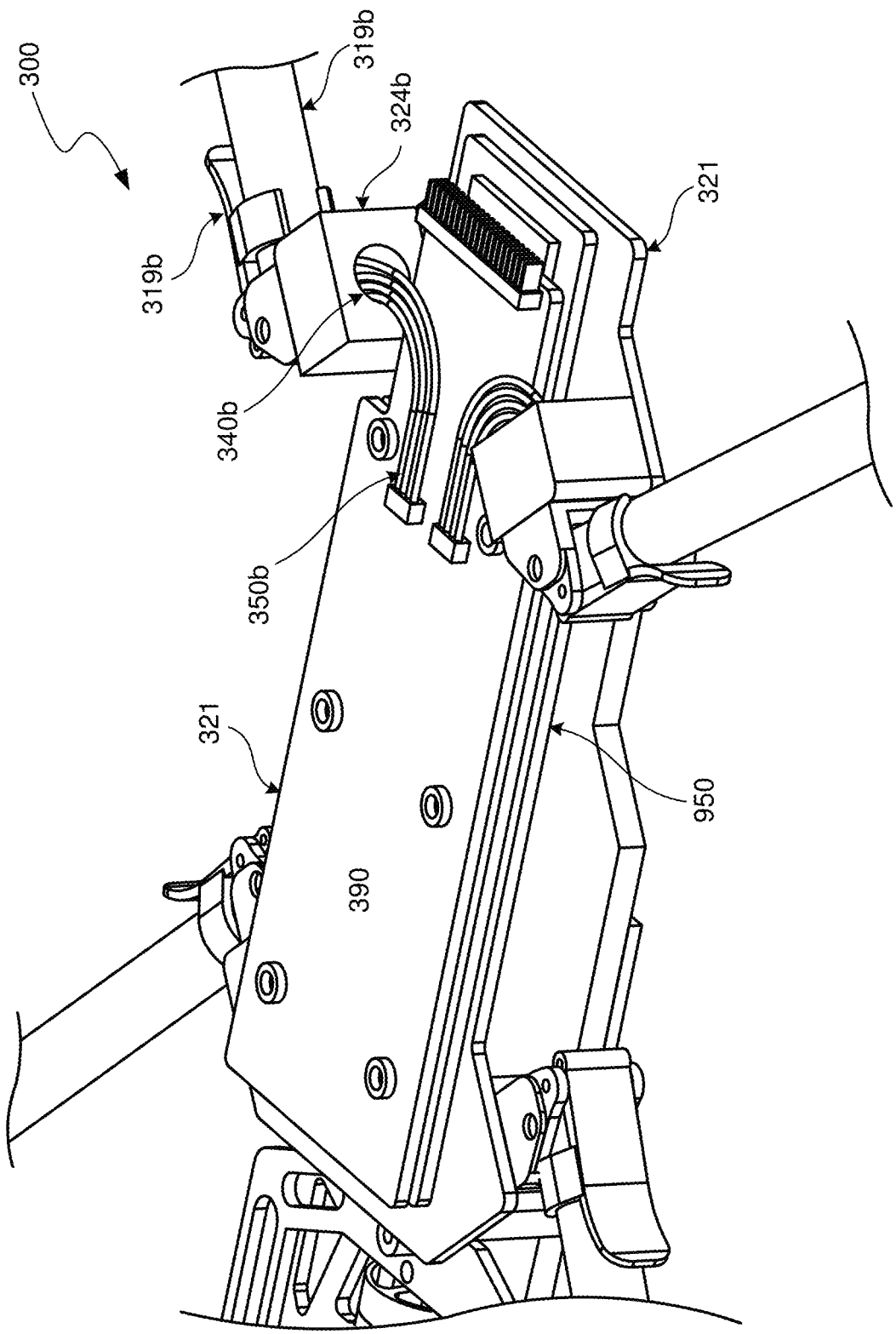

In some embodiments, each of the one or more hinge mechanisms 324a-b may be configured to allow one or more signal carrying media (e.g., copper cable, fiber optic cable, etc.) between one or more components that are coupled to a respective rotor arm 319a-b and computing and/or power systems onboard the UAV 300. FIG. 3H shows a perspective view of an underside of the example UAV 300. As shown in FIG. 3H, a particular hinge mechanism 324b may include an internal opening 340b configured to allow one or more signal and/or power cables 350b to pass from the body 321 of the UAV 300 to the rotor arm 319b. In particular the cables 350b may pass from signal/power transmission board 390 (e.g., a printed circuit board) structurally coupled to or part of the body 321 of the UAV 300 to an internal space of the rotor arm 319b. The cables 350b may run along within the internal space of the rotor arm 319b to any of an electrical motor (e.g., a brushless DC electric motor) associated with rotor 310b or an image capture device 314b, thereby communicatively and/or electronically coupling the electrical motor and/or image capture device 314b to the signal/power transmission board 390. Hinge mechanisms 324a associated with rotor arms 319a may be similarly configured to enable the associated rotors 310a and image capture devices 314a to be communicatively and/or electronically coupled to the signal/power transmission board 390.

Figure 3I:
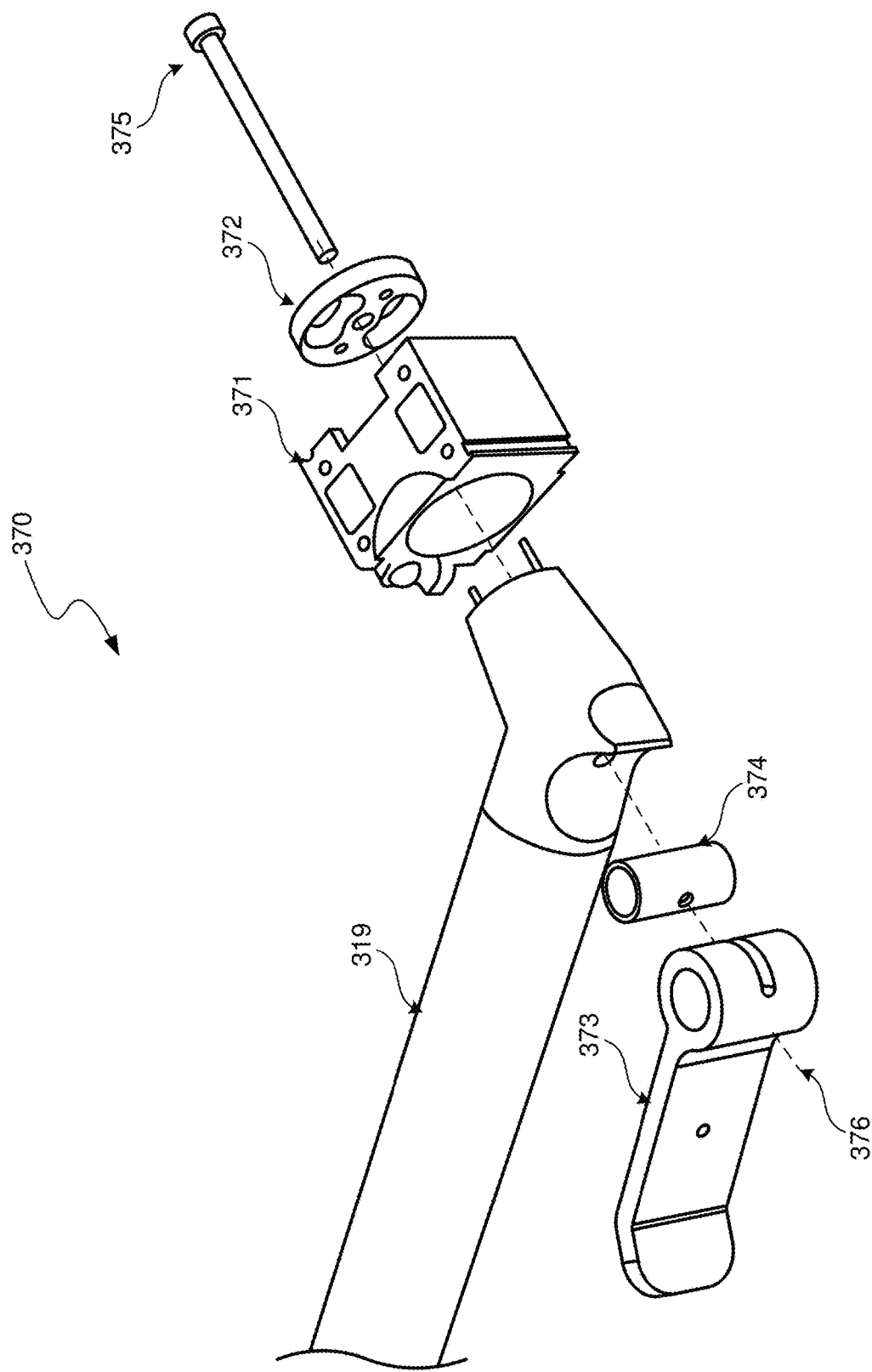

FIG. 3I shows an exploded view of an example rotatable arm assembly 370. The rotatable arm assembly 370 may comprise a rotor arm 319 (e.g., similar to any of rotor arms 319a-b) and various components associated with a hinge mechanism (e.g., similar to hinge mechanism 324a-b) that is operable to rotate the rotor arm 319 from a folded position to an extended position. As shown in FIG. 3I, the hinge mechanism may include a hinge housing 371, a hinge bearing/motor 372, a locking arm 373, a locking arm bearing/motor 374, and a coupling pin 375.

The coupling pin 375 may structurally couple the various components of the rotatable arm assembly 370 together. For example, the coupling pin 375 rotatable couples the rotor arm 319 to the hinge housing 371 and hinge bearing/motor 372. In some embodiments, element 372 includes a motor (e.g., a brushless DC electric motor) or some other type of drive mechanism capable of rotating the rotor arm 319 about an axis of rotation 376 that is in line with the coupling pin 375. In other embodiments, element 372 may just comprise a bearing element with a drive motor located elsewhere.

Figure 3J:
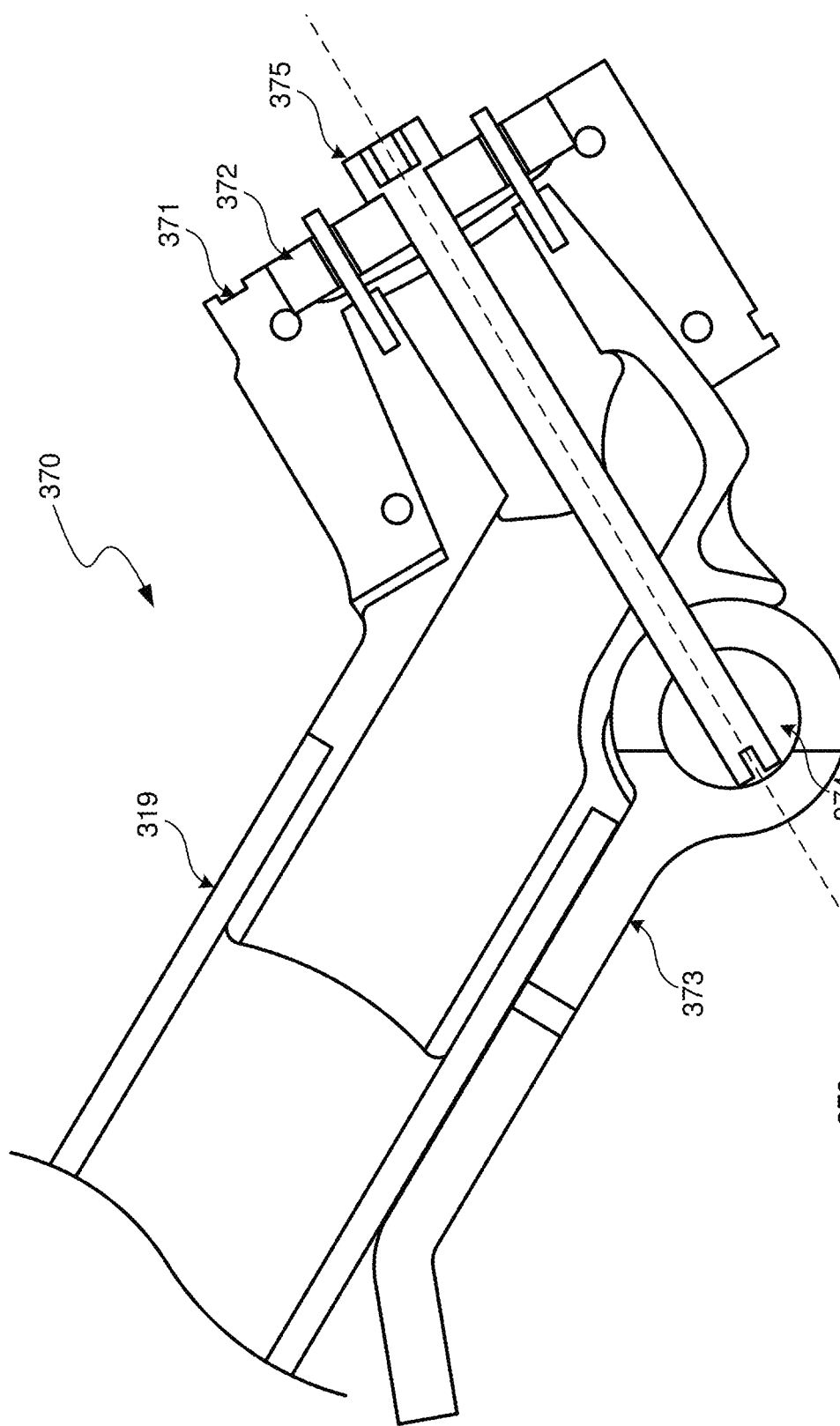
Figure 3K:
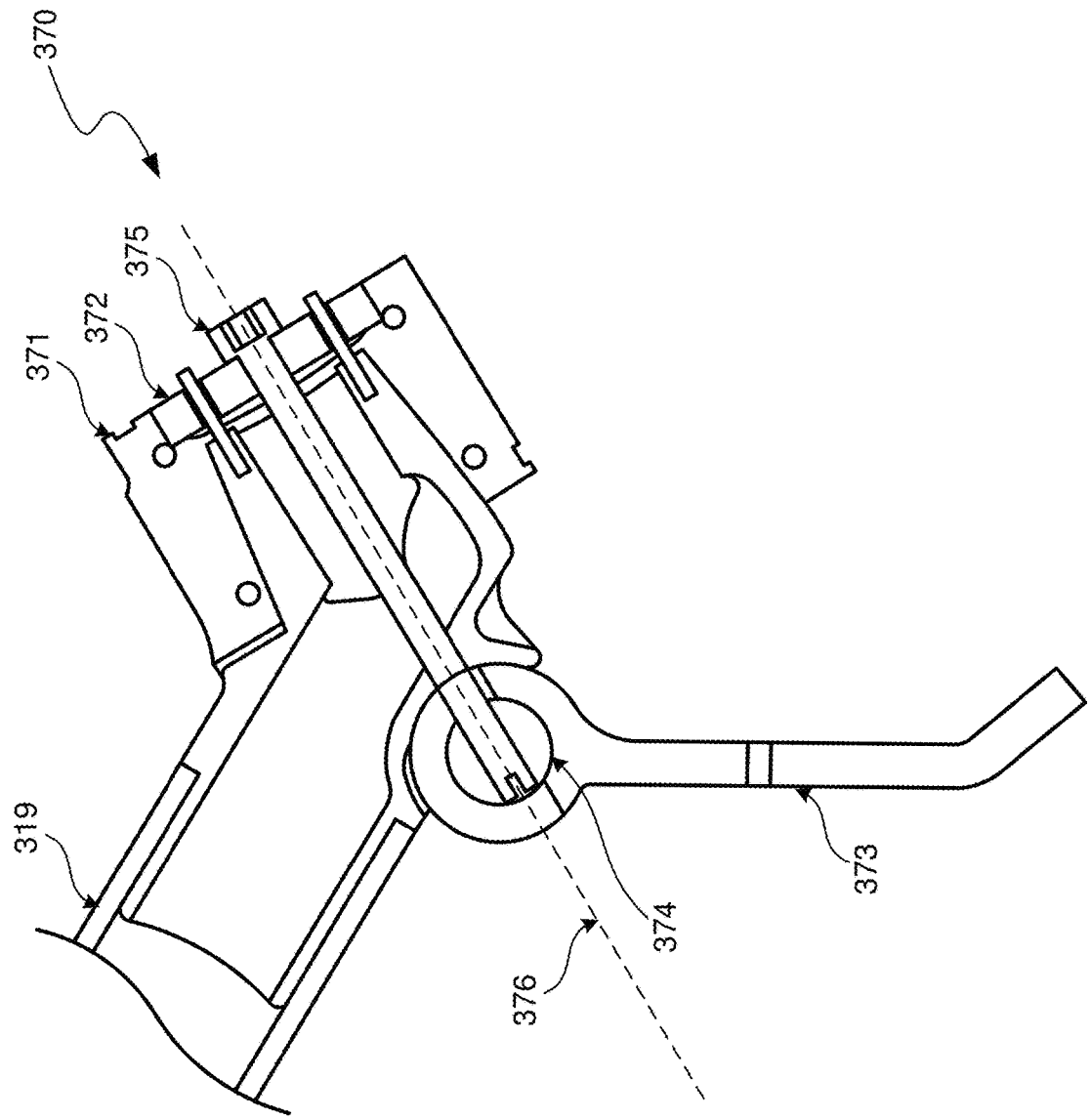

The locking arm 373 is configured to rotate between a locked position and an unlocked position. For example, FIG. 3J shows a top section view of the rotatable arm assembly 370 with the locking arm 373 in a locked position and FIG. 3K. When in a locked position (e.g., as shown in FIG. 3J), the locking arm 373 is operable to hold the rotor arm 319 rigidly in place relative to the body 321 of the UAV 300. In some embodiments, element 374 includes a motor (e.g., a brushless DC electric motor) or some other type of drive mechanism capable of rotating the locking mechanism 373 about an axis of rotation between the locked position and the unlocked position. In other embodiments, element 374 may just comprise a bearing element with a drive motor located elsewhere.

FIG. 3L shows a sequence of images depicting a first rear rotor arm (e.g., rotor arm 319b) rotating from a folded position to an extended position. State 391a depicts the first rear rotor arm in a folded position with the associated locking arm in a locked position. State 391b depicts the first rear rotor arm in a folded position with the associated locking arm in an unlocked position to enable rotation. State 391c depicts the first rear rotor arm in an intermediate position during the rotation from the locked position. State 391d depicts the first rear rotor arm in an extended position with the associated locking arm in an unlocked position. State 391e depicts the first rear rotor arm in an extended position with the associated locking arm in a locked position to hold the first rear rotor arm rigidly in place in the extended position.

FIG. 3M shows a sequence of images depicting a first forward rotor arm (e.g., rotor arm 319a) rotating from a folded position to an extended position. State 392a depicts the first forward rotor arm in a folded position with the associated locking arm in a locked position. State 392b depicts the first forward rotor arm in a folded position with the associated locking arm in an unlocked position to enable rotation. State 392c depicts the first forward rotor arm in an intermediate position during the rotation from the locked position. State 392d depicts the first forward rotor arm in an extended position with the associated locking arm in an unlocked position. State 392e depicts the first forward rotor arm in an extended position with the associated locking arm in a locked position to hold the first forward rotor arm rigidly in place in the extended position.

FIG. 3N shows a sequence of images depicting a second rear rotor arm (e.g., rotor arm 319b) rotating from a folded position to an extended position. State 393a depicts the second rear rotor arm in a folded position with the associated locking arm in a locked position. State 393b depicts the second rear rotor arm in a folded position with the associated locking arm in an unlocked position to enable rotation. State 393c depicts the second rear rotor arm in an intermediate position during the rotation from the locked position. State 393d depicts the second rear rotor arm in an extended position with the associated locking arm in an unlocked position. State 393e depicts the second rear rotor arm in an extended position with the associated locking arm in a locked position to hold the second rear rotor arm rigidly in place in the extended position.

FIG. 3O shows a sequence of images depicting a second forward rotor arm (e.g., rotor arm 319a) rotating from a folded position to an extended position. State 394a depicts the second forward rotor arm in a folded position with the associated locking arm in a locked position. State 394b depicts the second forward rotor arm in a folded position with the associated locking arm in an unlocked position to enable rotation. State 394c depicts the second forward rotor arm in an intermediate position during the rotation from the locked position. State 394d depicts the second forward rotor arm in an extended position with the associated locking arm in an unlocked position. State 394e depicts the second forward rotor arm in an extended position with the associated locking arm in a locked position to hold the first forward rotor arm rigidly in place in the extended position.

FIGS. 3L-3O depict each of the arms rotating from a folded position to an extended position sequentially. For example, as depicted, the first forward rotor arm rotates after the first rear rotor arm has completed rotation and is locked in the extended position. This is for illustrative clarity and is not to be construed as limiting. In other embodiments, the multiple rotor arms may rotate at the same time or may rotate in a different sequence than is depicted in FIGS. 3L-3O.

Examples

The technology described herein relates to autonomous aerial vehicle technology and, more specifically, to an autonomous unmanned aerial vehicle with folding collapsible arms. In some embodiments, a UAV including a central body, a plurality of rotor arms, and a plurality of hinge mechanisms is disclosed. The plurality of rotor arms each include a rotor unit at a distal end of the rotor arm. The rotor units are configured to provide propulsion for the UAV. The plurality of hinge mechanisms mechanically attach (or couple) proximal ends of the plurality of rotor arms to the central body. Each hinge mechanism is configured to rotate a respective rotor arm of the plurality of rotor arms about an axis of rotation that is at an oblique angle relative to a vertical median plane of the central body to transition between an extended state and a folded state.

In some embodiments, in the folded state, a rotor arm of the plurality of rotor arms extends transversely along the central body such that the rotor arm aligns substantially flush with a side wall of the central body.

In some embodiments, the UAV is configured in an operational configuration for flight when each of the plurality of rotor arms are in the extended state. In some embodiments, the UAV is configured in a non-operational collapsed configuration when each of the plurality of rotor arms are in the folded state. In some embodiments, in the non-operational collapsed configuration, an overall size and shape of the UAV is not substantially greater than the size and shape of the central body.

In some embodiments, each of the plurality of rotor arms further include an image capture device. In some embodiments, each hinge mechanism of the plurality of hinge mechanisms is further configured to rigidly lock the respective rotor arm in place such that the image capture devices do not substantially move relative to each other or to the central body.

In some embodiments, the plurality of rotor arms include two front rotor arms and two rear rotor arms. In some embodiments, the plurality of hinge mechanisms include front hinge mechanisms configured to rotate the front rotor arms about an axis of rotation in a first direction upward or downward relative to a horizontal median plane of the central body, and rear hinge mechanisms configured to rotate the rear rotor arms about an axis of rotation in a second direction opposite the first direction upward or downward relative to the horizontal median plane of the central body. In some embodiments, the rotor units at the distal ends of the front rotor arms are downward facing and the rotor units at the distal ends of the rear rotor arms are upward facing.

In some embodiments, a UAV includes a central body, a plurality of rotor arms, and a plurality of hinge mechanisms. In some embodiments, the plurality of rotor arms including a front set of rotor arms and a rear set of rotor arms. The front set of rotor arms each include a downward facing rotor unit and an upward facing image capture device oriented at a distal end of the rotor arm. The rear set of rotor arms each include an upward facing rotor unit and a downward facing image capture device oriented at a distal end of the rotor arm. The plurality of hinge mechanisms are operable to transition the plurality of rotor arms between folded and extended positions. The plurality of hinge mechanisms include a first set of hinge mechanisms and a second set of hinge mechanisms. The first set of hinge mechanisms mechanically couples proximal ends of the first set of rotor arms to a front portion of the central body. Each hinge mechanism is configured to rotate a respective rotor arm of the first set of rotor arms about an axis of rotation at a first oblique angle relative to a vertical median plane of the central body and upward relative to a horizontal median plane of the central body. The second set of hinge mechanisms mechanically couples proximal ends of the second set of rotor arms to a rear portion of the central body. Each hinge mechanism is configured to rotate a respective rotor arm of the second set of rotor arms about an axis of rotation at a second oblique angle relative to the vertical median plane of the central body and downward relative to a to a horizontal median plane of the central body.

In some embodiments, in the folded position, a rotor arm of the plurality of rotor arms extends transversely along the central body such that the rotor arm aligns substantially flush with a side wall of the central body.

In some embodiments, the UAV is configured in an operational configuration for flight when each of the plurality of rotor arms are in the extended position and in a non-operational collapsed configuration when each of the plurality of rotor arms are in the folded position. In some embodiments, in the non-operational collapsed configuration, an overall size and shape of the UAV is not substantially greater than the size and shape of the central body. In some embodiments, in the operational configuration for flight, each hinge mechanism of the plurality of hinge mechanisms is further configured to rigidly lock the respective rotor arm in place such that the image capture devices do not substantially move relative to each other or to the central body.

In some embodiments, the UAV further includes an image capture assembly including an image capture device and one or more motors associated with a mechanical gimbal. In some embodiments, at least one of the plurality of hinge mechanisms includes a hinge housing, a hinge bearing/motor, a locking arm, a locking arm bearing/motor, and a coupling pin.

In some embodiments, a UAV includes a central body and a plurality of rotatable arm assemblies. Each rotatable arm assembly includes a rotor arm and a hinge mechanism. The rotor arm includes a rotor unit at a distal end. The hinge mechanism mechanically couples a proximal end of the rotor arm to the central body. The hinge mechanism is configured to rotate the rotor arm about an axis of rotation that is at an oblique angle relative to a vertical median plane of the central body to transition between an extended state and a folded state. In the folded state, the rotor arm extends transversely along the central body such that the rotor arm aligns substantially flush with a side wall of the central body.

In some embodiments, the UAV is configured in an operational configuration for flight when each of the plurality of rotatable arm assemblies are in the extended state, and the UAV is configured in a non-operational collapsed configuration when each of the plurality of rotatable arm assemblies are in the folded state. In some embodiments, in the non-operational collapsed configuration, an overall size and shape of the UAV is not substantially greater than the size and shape of the central body.

Image Stabilization Assembly

Examples discussed herein relate to autonomous aerial vehicle technology and, more specifically, to image stabilization systems for autonomous unmanned aerial vehicles.

Figure 4A:
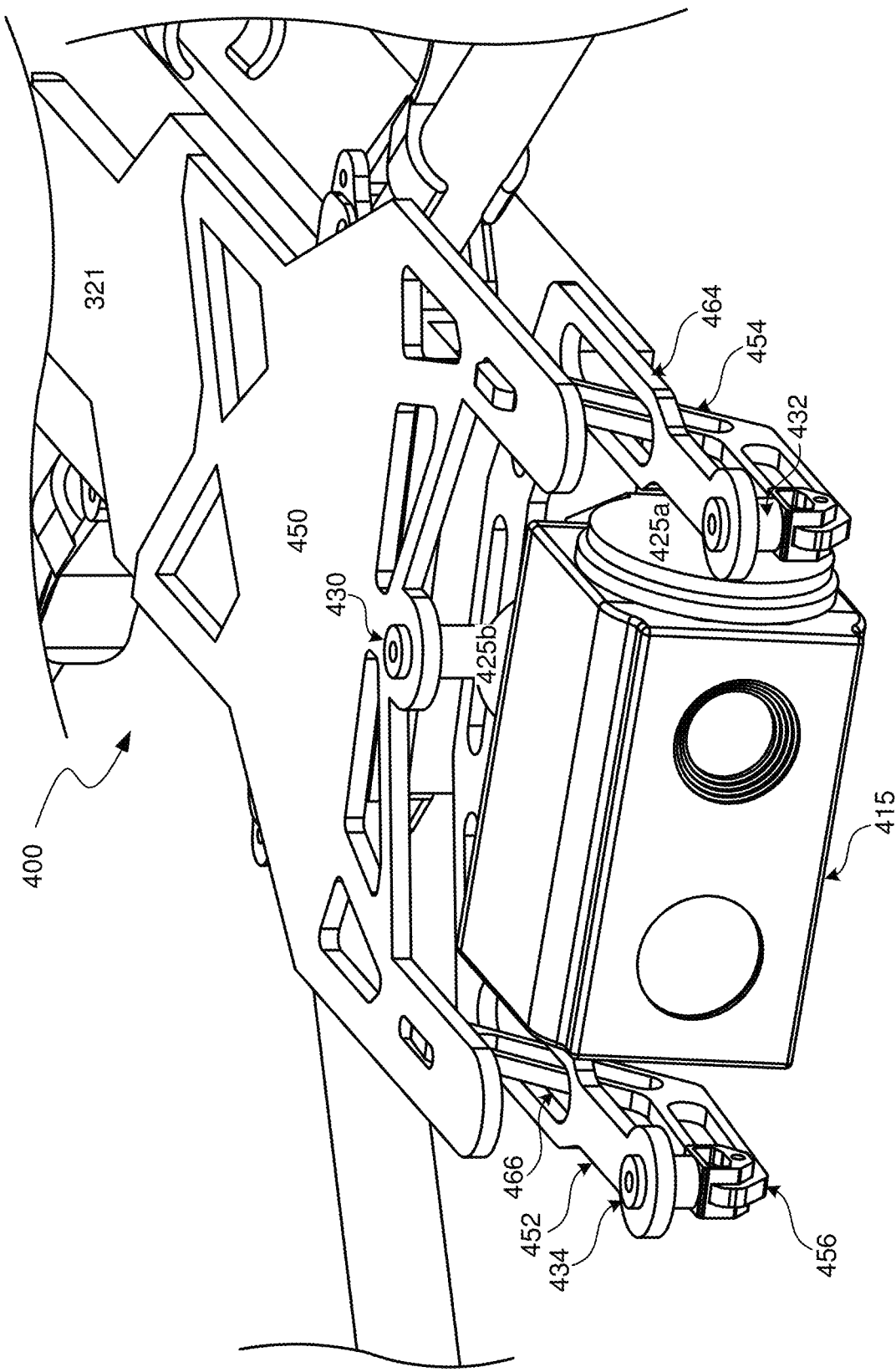
FIG. 4A-4G show various views of an example image stabilization assembly for an example UAV in accordance with some embodiments.
Figure 4B:
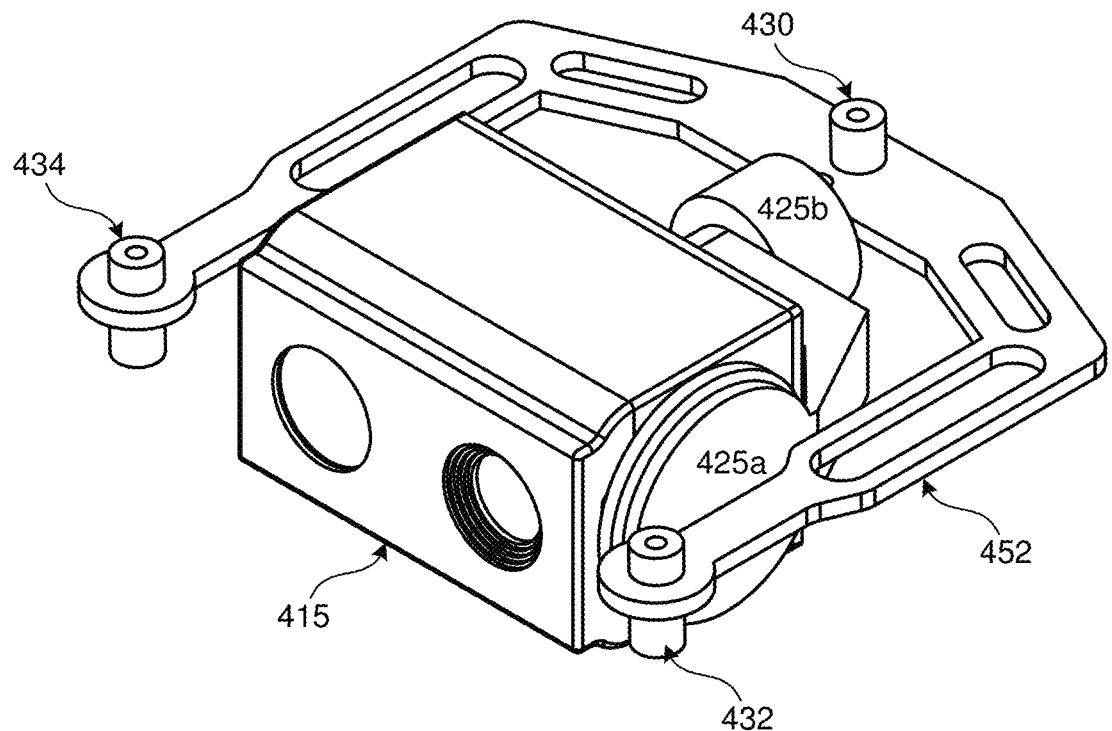

In some embodiments, a UAV may include an image stabilization assembly for actively and/or passively stabilizing an image capture device while the UAV is in flight. FIG. 4A shows a perspective view of an example image stabilization assembly 400 that may be part of, for example, the UAV 300 depicted in FIG. 3C. FIG. 4B shows a perspective view of a dynamic portion of the image stabilization assembly 400 and FIG. 4C shows an exploded view of the dynamic portion of the image stabilization assembly 400 and FIG. 4B.

Figure 4C:
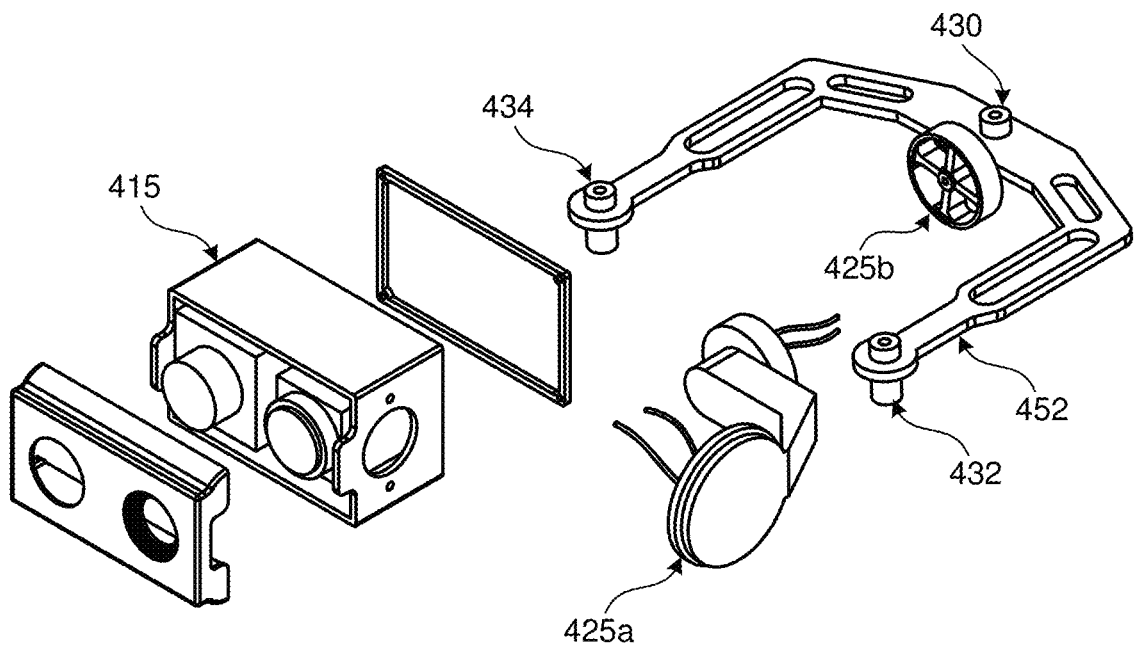

As shown in FIGS. 4A-4C, the image stabilization assembly includes various components for passively isolating an image capture assembly from vibrations and other motion of a central body 321 of the UAV 300 while the UAV 300 is in flight. The image capture assembly may include an image capture device 415 and one or more motors 425a-b associated with a mechanical gimbal. The image capture device 415 may correspond to the image capture device 115 described with respect to FIG. 1 and may include one or more cameras (e.g., a stereoscopic camera). In some embodiments, the image capture device 415 may include one or more visible light cameras as well as one or more forward looking infrared (FLIR) cameras.

Figure 4D:
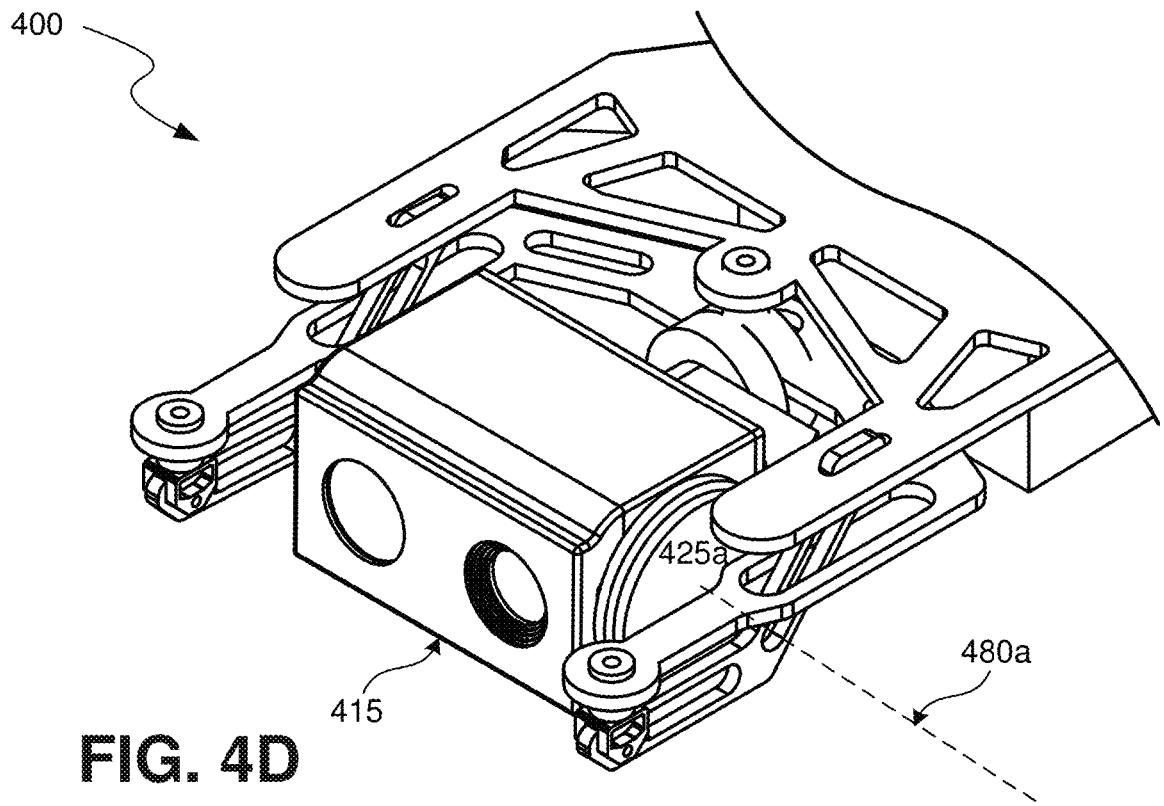
Figure 4E:
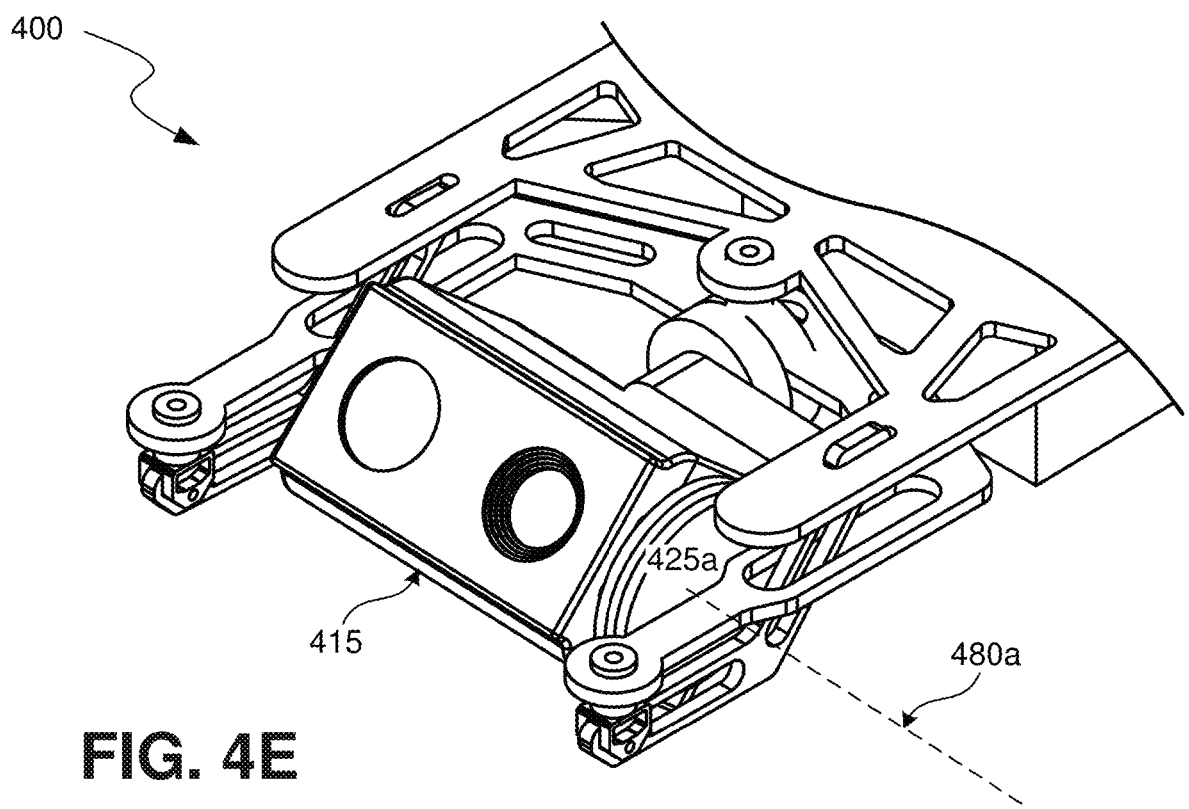
Figure 4F:
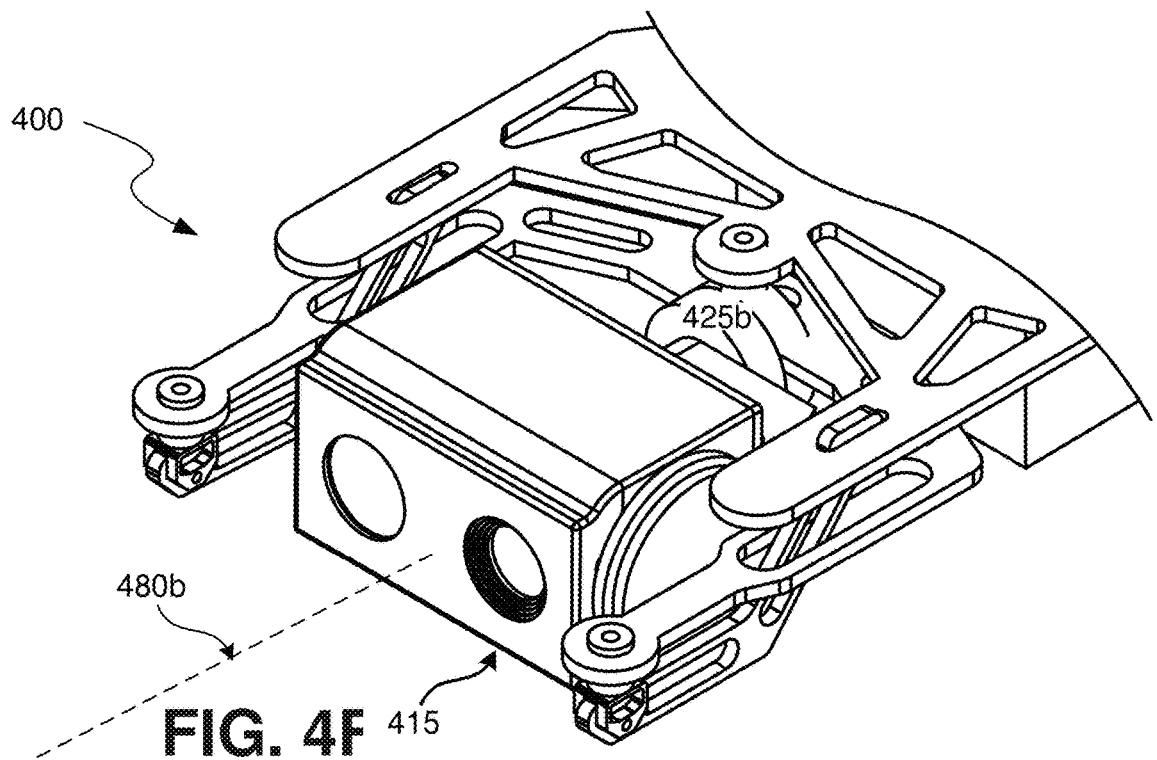
Figure 4G:
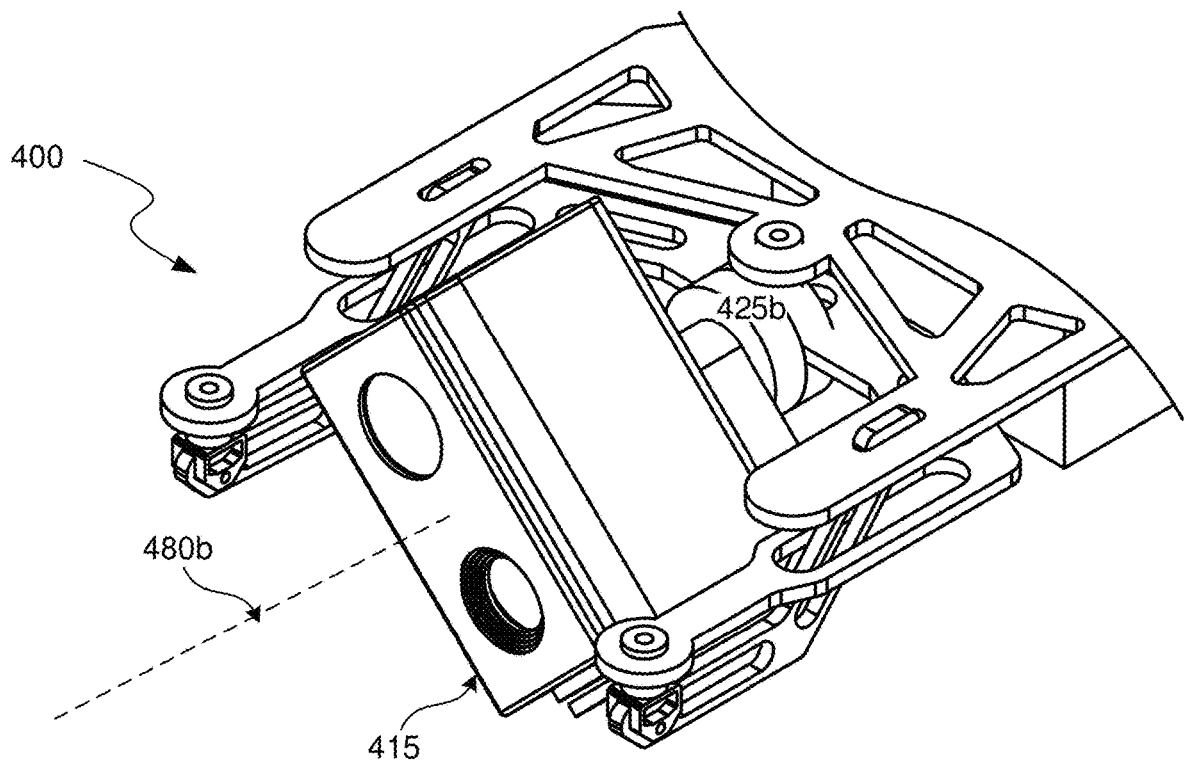

The image capture device 415 may be coupled to a component of the image stabilization assembly (e.g., element 452) via a mechanical gimbal comprising one or more electrical motors (e.g., brushless DC motors) that are configured to rotate the image capture device 415 about one or more axes of rotation. For example, FIGS. 4D and 4E show a sequence of perspective views of the image stabilization assembly 400 that depict the rotation of the image capture device 415 about a first axis 480a (e.g., a pitch axis) using a first motor 425a. Similarly, FIGS. 4F and 4G show a sequence of perspective views of the image stabilization assembly 400 that depict the rotation of the image capture device 415 about a second axis 480b (e.g., a roll axis) using a second motor 425b. Additional motors may be added for additional degrees of freedom of rotation.

The image stabilization assembly comprises a first element 450 coupled to the body 321 of the UAV and a second element 452 coupled to the image capture assembly (i.e., image capture device 415 and associated gimbal). The first element and second element 452 are coupled to each other via one or more isolators (e.g., isolators 430, 432, 434). Each of the one or more isolators 430, 432, 434 may act as a spring damper to isolate the dynamic elements (e.g., element 452) from certain rotational and/or translational motion by UAV 300. For example, in some embodiments, each isolator 430, 432, 434 may act as a spring damper to isolate motion in all of the x, y, and z directions. In some embodiments, each isolator 430, 432, 434 may be formed of an elastomer material (e.g., natural and/or synthetic rubbers). In some implementations, the isolators should be stiff enough to maintain structural protection and support around the image capture assembly, but soft enough to dampen translational motion in the body of the UAV along a range of frequencies.

In the specific example depicted in FIG. 4A, a first element 450 is coupled to a second element 452 at a point substantially along a center line of the UAV 300 using a first isolator 430. Vertical portions 454 and 456 of element 450 are coupled to opposing sides of element 452 using a second isolator 432 and third isolator 434 (respectively). As shown, the second element 452 is shaped to provide an open area within which the image capture assembly resides. The open area partially surrounded by element 452 is shaped and dimensioned to enable free rotation of the image capture device 415 using the one or more motors 425a-b of the mechanical gimbal. In particular, various elements (e.g., 450 and 452) of the image stabilization assembly may be configured to allow the image capture device 415 to pitch/rotate vertically up and down so as to capture images substantially above and below the UAV 300 while in flight.

In some embodiments, the various elements (e.g., 450 and 452) are configured to provide a mechanical lock-out to mechanically restrict motion of the image capture assembly relative to the body 321 of the UAV 300. For example, as shown in FIG. 4A, the second element 452 includes openings through which portions of the first element 450 pass to restrict the relative motion between the two elements. Specifically, a first vertical portion 454 of the first element 450 passes through a first hole 464 on a first side of the second element 452. Similarly, a second vertical portion 456 of the first element 450 passes through a second hole 466 on a second side of the second element 452 (where the first and second sides of the second element 452 are on substantially opposing sides of the image capture assembly).

The image stabilization assembly 400 depicted in FIGS. 4A-4G is just an example provided for illustrative purposes and is not to be construed as limiting. Other embodiments may include more or fewer components than are depicted in FIGS. 4A-4G and/or may arrange the components differently.

Examples

The technology described herein relates to autonomous aerial vehicle technology and, more specifically, to image stabilization for autonomous unmanned aerial vehicles. In some embodiments, a UAV including a central body, an image capture assembly and an image stabilization assembly is disclosed. The image stabilization assembly couples the image capture assembly to the central body and is configured to provide structural protection and support around the image capture assembly while passively isolating the image capture assembly from vibrations and other motion of the central body while the UAV is in flight.

In some embodiments, the image stabilization assembly is configured to provide structural protection and support around the image capture assembly by extending on both sides of the image capture assembly.

In some embodiments, the image stabilization assembly comprises a first element coupled to the central body of the UAV and a second element coupled to the image capture assembly. In some embodiments, the first element and the second element are coupled to each other via one or more isolators, the one or more isolators configured to isolate the second element from at least some rotational and/or translational motion of the UAV. In some embodiments, the first element is coupled to the second element at a point substantially along a center line of the UAV using a first isolator. In some embodiments, vertical portions of the first element are coupled to opposing sides of the second element using a second isolator and third isolator.

In some embodiments, the image capture assembly includes an image capture device, a mechanical gimbal and one or more motors associated with the mechanical gimbal. The one or more motors are configured to rotate the image capture device about one or more axes of rotation. In some embodiments, the second element is shaped to provide an open area within which the image capture assembly resides, and wherein the open area is partially surrounded by the second element and is shaped and dimensioned to enable free rotation of the image capture device using the one or more motors of the mechanical gimbal.

In some embodiments, the image capture device includes one or more visible light cameras and one or more forward looking infrared (FLIR) cameras.

In some embodiments, the first element and the second element are configured to provide a mechanical lock-out to mechanically restrict motion of the image capture assembly relative to the central body. In some embodiments, the second element includes openings through which portions of the first element pass to restrict the motion of the image capture assembly relative to the central body. In some embodiments, a first vertical portion of the first element passes through a first hole on a first side of the second element, and a second vertical portion of the first element passes through a second hole on a second side of the second element, wherein the first and second sides of the second element are on substantially opposing sides of the image capture assembly.

In some embodiments, a UAV capable of capturing stabilized images of a surrounding environment while in flight is disclosed. The UAV includes a central body, an image capture assembly, and an image stabilization assembly. The image capture assembly includes an image capture device and an image stabilization assembly coupling the image capture assembly to the central body. The image stabilization assembly includes a first element, a second element and one or more isolators. The first element is coupled to the central body of the UAV. The second element is coupled to the image capture assembly. The one or more isolators are configured to isolate the second element from at least some rotational and/or translational motion of the UAV, wherein the first element and the second element are coupled to each other via the one or more isolators.

In some embodiments, the image stabilization assembly is further configured to provide structural protection and support around the image capture assembly while passively isolating the image capture assembly from vibrations and other motion of the central body while the UAV is in flight.

In some embodiments, the first element is coupled to the second element at a point substantially along a center line of the UAV using a first isolator, and wherein vertical portions of the first element are coupled to opposing sides of the second element using a second isolator and third isolator.

In some embodiments, the image capture assembly further includes a mechanical gimbal and one or more motors associated with the mechanical gimbal, wherein the one or more motors are configured to rotate the image capture device about one or more axes of rotation.

In some embodiments, the second element is shaped to provide an open area within which the image capture assembly resides, and wherein the open area is partially surrounded by the second element and is shaped and dimensioned to enable free rotation of the image capture device using the one or more motors of the mechanical gimbal.

In some embodiments, the image capture device includes one or more visible light cameras and one or more forward looking infrared (FLIR) cameras.

In some embodiments, a system for isolating an image capture assembly from vibration of a central body of an unmanned aerial vehicle (UAV) is disclosed. The system includes a first element, a second element, and one or more isolators. The first element coupled to the central body of the UAV. The second element coupled to the image capture assembly. The one or more isolators configured to isolate the second element from at least some rotational and/or translational motion of the UAV, wherein the first element and the second element are coupled to each other via the one or more isolators.

In some embodiments, the image stabilization assembly is further configured to provide structural protection and support around the image capture assembly while passively isolating the image capture assembly from vibrations and other motion of the central body while the UAV is in flight.

Environmental Illumination

As previously discussed, an autonomous UAV such as UAV 100 may rely, at least in part, on images captured using one or more image capture devices (e.g., device 114a-b) to estimate its position/orientation, generate planned trajectories, avoid obstacles, etc. This presents a challenge when operating in low light levels, for example, at night or indoors. To address this challenge, an autonomous UAV can be configured to include one or more powered illumination sources such as LEDs or other light emitting devices that can emit light into the surrounding environment while the UAV is in flight. The emitted light from the one or more illumination sources will reflect off objects in the surrounding physical environment thereby improving the quality of images captured of the surrounding physical environment.

Figure 5:
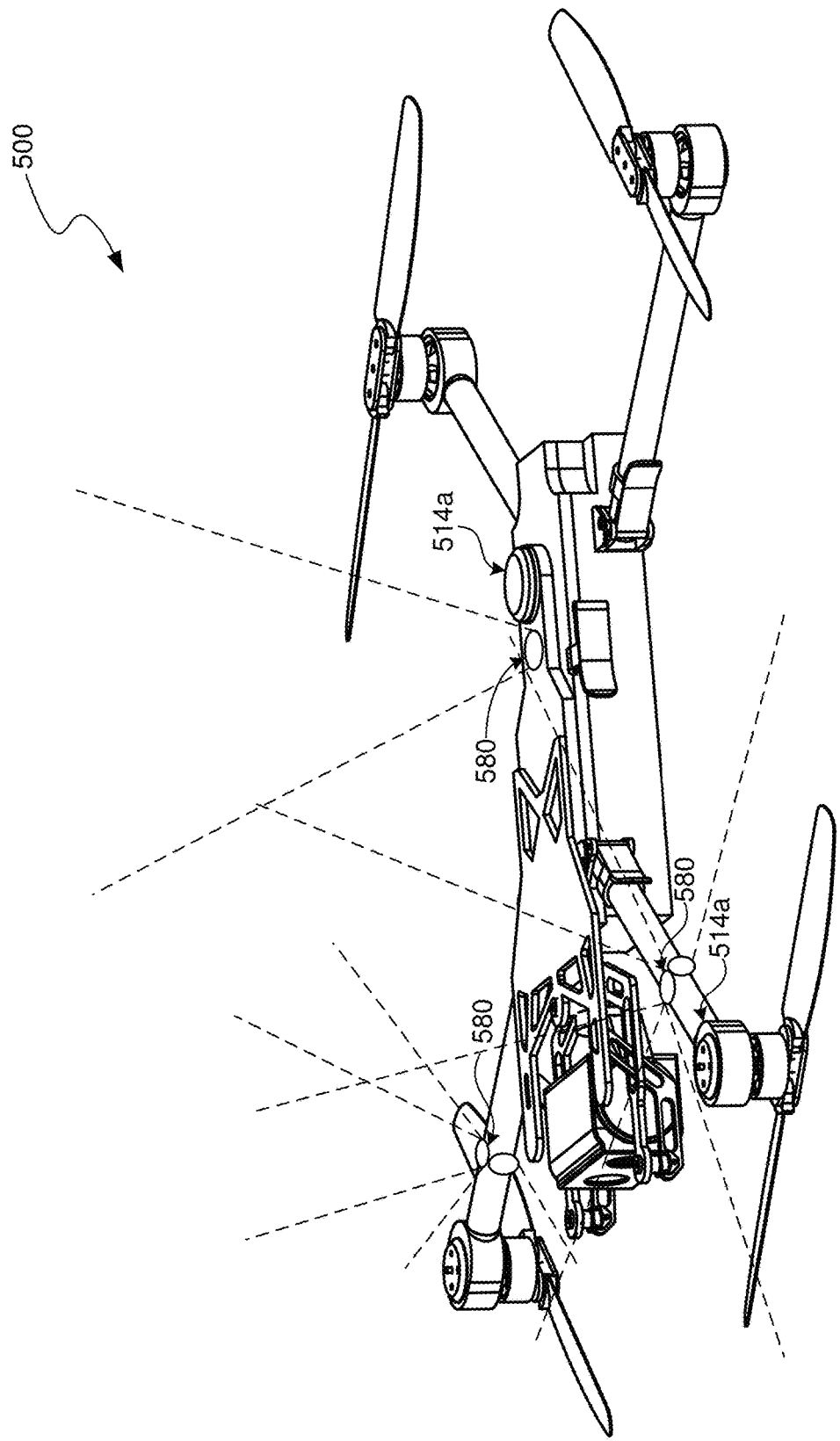
FIG. 5 shows an example UAV that includes one or more illumination sources in accordance with some embodiments.

FIG. 5 shows an example UAV 500 similar to the UAV 300 depicted in FIG. 3 except that it includes one or more illumination sources 580. Each of the one or more illumination sources may include an LED or some other type of light emitting device. In some embodiments, the one or more illumination sources 580 are arranged around the UAV 500 at positions corresponding to one or more image capture devices. For example, as shown in FIG. 5, at least one illumination source is positioned in proximity (e.g., within several inches) of each of the multiple upward facing image capture devices 514a (e.g., similar to image capture devices 114a described with respect to FIG. 1). Although not depicted in FIG. 5, illumination sources may similarly be positioned in proximity to downward facing image capture devices or any other image capture devices (e.g., a forward facing image capture device 115, etc.). The dotted lines in FIG. 5 are intended to depict directions of illumination by the various illumination sources 580, but are not to be construed as limiting as to the arrangement or type of illumination.

In any UAV, particularly a UAV configured for autonomous navigation using captured images, energy consumption can significantly impact flight time. Adding illumination sources (even relatively efficient LEDs) to the list of components drawing energy from onboard batteries may further impact the amount of time the UAV is able to stay airborne. To reduce energy consumption, and thereby increase flight time, certain embodiments may selectively illuminate the one or more illumination sources 580 based on various conditions such as ambient light levels, the type of environment the UAV is in, and/or the current or planned motion of the UAV. For example, in some embodiments, a UAV may selectively turn on one or more of the illumination sources when there is a greater danger of collision with an obstacle, e.g., when indoors or around tall buildings, trees, etc. Conversely, if the UAV is in flight in a generally open area, the UAV may automatically turn off most or all illumination sources to conserve energy since there is little risk of collision with an obstacle and since illumination will have little effect on images captured of distant objects.

In some embodiments, the UAV may selectively illuminate one or more of the light sources based on the direction in which the UAV is moving or planning to move. FIGS. 6A-6D show several representations of UAV 500 that illustrate this concept. As shown in FIG. 6A, UAV 500 may selectively illuminate one or more illumination sources (e.g., LEDs) generally located on a first side of the UAV 500 when the UAV is moving, or planning to move in, a direction corresponding to the first side. Similarly, as shown in FIG. 6B, the UAV 500 may selectively illuminate one or more illumination sources (e.g., LEDs) generally located on a second side opposite the first side when the UAV 500 is moving, or planning to move in, a direction corresponding to the second side. Similarly, as shown in FIG. 6C, the UAV 500 may selectively illuminate one or more illumination sources (e.g., LEDs) generally located on a top side of the UAV 500 when the UAV 500 is moving, or planning to move, upwards. Similarly, as shown in FIG. 6D, the UAV 500 may selectively illuminate one or more illumination sources (e.g., LEDs) generally located on a bottom side of the UAV 500 when the UAV 500 is moving, or planning to move, downwards. By selectively illuminating illumination sources as depicted in FIGS. 6A-6D, the UAV 500 can conserve energy while illuminating a portion of the surrounding physical environment in which a collision is most likely to occur (i.e., in the direction of motion).

Figure 7:
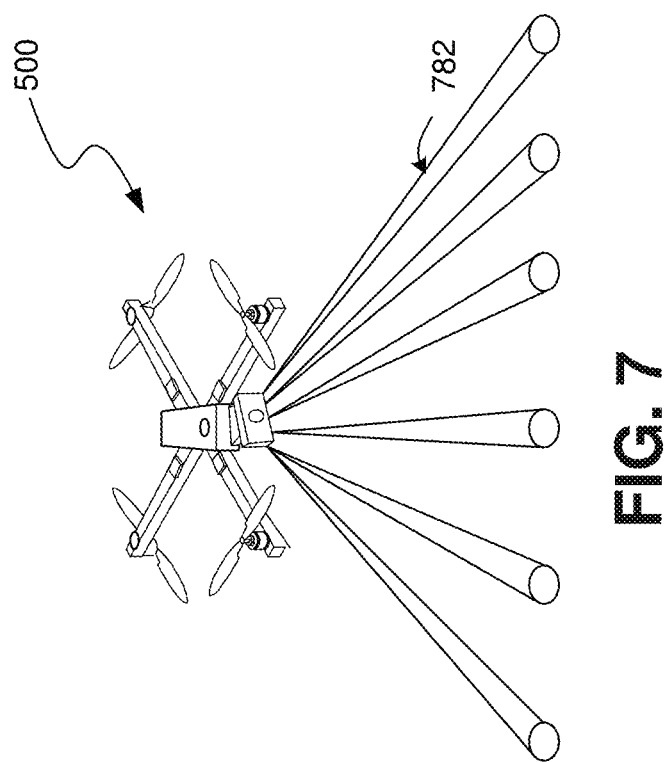
FIG. 7 shows an example illumination pattern from an example UAV in accordance with some embodiments.

In some embodiments, the UAV may be configured to illuminate only portions of the environment using patterns of directed beams of light. For example, as shown in FIG. 7, instead of using diffuse lighting sources configured to illuminate a large area, a UAV 500 may include illumination sources configured to emit one or more directed beams of light 782, e.g., strobing. The directed beams (or strobes) of light may illuminate just enough of the surrounding physical environment to obtain depth measurements using captured images while reducing overall energy consumption. Further, a light source emitting a directed beam of light may tend to illuminate more distant objects than a diffuse light source using an equivalent amount of energy. In some embodiments, strobing the light sources may be utilized.

Examples

The technology described herein relates to autonomous aerial vehicle technology and, more specifically, to environment illumination for autonomous unmanned aerial vehicles. In some embodiments, a UAV include a plurality of upward-facing image capture devices, a plurality of downward-facing image capture devices, one or more illumination sources, and a computer system (or other electronic circuitry) are disclosed. The computer system is communicatively coupled to the plurality of upward-facing image capture devices, the plurality of downward-facing image capture devices and the one or more illumination sources. The computer system is configured to direct the one or more illumination sources to emit light into a surrounding physical environment while the UAV is in flight, process images captured by any one or more of the plurality of upward-facing image capture devices or the plurality of downward-facing image capture devices to estimate a position and/or orientation of the aerial vehicle, generate a planned trajectory for the aerial vehicle through a physical environment based on the processing of the images, and control a propulsion system and/or flight surface of the aerial vehicle to cause the aerial vehicle to autonomously maneuver along the planned trajectory. The emitted light from the one or more illumination sources reflects off objects in the surrounding physical environment to improve the quality of the captured images.

In some embodiments, the one or more illumination sources comprise multiple illumination sources arranged around the UAV at positions corresponding to one or more of the plurality of upward-facing or downward facing image capture devices.

In some embodiments, at least one illumination source is positioned in proximity of each of the multiple upward-facing image capture devices. In some embodiments, at least one illumination source is positioned in proximity of each of the multiple downward-facing image capture devices. In some embodiments, the UAV further includes a forward-facing image capture device, wherein at least one illumination source is positioned in proximity of the forward-facing image capture device. In some embodiments, to direct the one or more illumination sources to emit light, the computer system is configured to selectively illuminate the one or more illumination sources.

In some embodiments, the computer system is configured to selectively illuminate the one or more illumination sources based on environmental conditions and/or UAV parameters. In some embodiments, the environmental conditions and/or UAV parameters comprise one or more of ambient light levels, a type of environment, and current or planned motion or trajectory of the UAV.

In some embodiments, the computer system is configured to selectively illuminate the one or more illumination sources to illuminate only portions of the environment using patterns of directed beams of light. In some embodiments, the directed beams illuminate the surrounding physical environment for a sufficient transient period of time to obtain depth measurements using the captured images. For example, an illumination source can be a strobe light (or moonlight) that emits a bright burst of light with power output in a range of 10 to 1,000 watts.

Protective Structures for Image Capture Devices

Arranging the image capture devices as shown in any one or more of the example UAVs described herein (e.g., UAV 100, 300, 500) can expose the image capture devices to damage due to contact with the ground when the UAV lands or makes contact with other objects while the UAV is in flight. To protect the image capture device from damage, a protective element can be added to offset the image capture device from any surface such as the ground. FIG. 8A shows a side view of an example assembly 813 that includes such a protective element. Specifically, the example assembly 813 includes an arm 803 and rotor housing 804 that houses a rotor 810 and a downward-facing image capture device 814 (e.g., similar to downward facing image capture device 314b of FIG. 3C). The example assembly 813 further includes a protective structural element 890 that is arranged along a surface of the UAV, for example, along a surface of housing 804 and/or rotor arm 803 in proximity to the image capture device 814 such that an outer surface of the image capture device 814 (e.g., a lens) does not contact a surface 880 (e.g., the ground) when the UAV contacts the surface 880.

The protective structural element 890 is depicted in FIG. 8A as having a wedge or fin shape; however, this is an example provided for illustrative purposes and is not to be construed as limiting. The size and shape of the protective structural element will depend on the specifics of the aircraft such as the weight, size, type of image capture devices, etc. Further, similar protective structural elements can be arranged in proximity to other image capture devices that are not on the underside of the vehicle. For example, a similar protective element may be arranged on a top surface of a rotor assembly or a body of a UAV to protect an upward facing image capture device (e.g., upward facing image capture device 314a of UAV 300).

The protective structural element 890 may be manufactured of any material or combination of materials that are suitably durable and lightweight for use in an aerial vehicle. For example, in some embodiments, the protective structural element 890 can be made of plastic, metal (e.g., aluminum), carbon fiber, synthetic fiber, or some sort of composite material such as carbon fiber embedded in an epoxy resin. The actual materials used will depend on the performance requirements of a given embodiment. The protective structural element 890 may be manufactured using any manufacturing process suited for the selected material. For example, in the case of plastic materials, the protective structural element 890 may be manufactured using injection molding, extrusion molding, rotational molding, blow molding, 3D printing, milling, plastic welding, lamination, or any combination thereof. In the case of metal materials, the protective structural element 890 may be manufactured using machining, stamping, casting, forming, metal injection molding, CNC machining, or any combination thereof. These are just example materials and manufacturing processes that are provided for illustrative purposes and are not to be construed as limiting.

In some embodiments, the protective structural element 890 may represent a portion of an exterior surface of a UAV. For example, the walls of any of the rotor housing 804 and/or the rotor arm 803 may be manufactured to include a portion that extends, for example, as depicted in FIG. 8A. Alternatively, in some embodiments, the protective structural element 890 may be manufactured as a separate part and affixed to an exterior surface of a UAV, for example, using mechanical fasteners (e.g., clips, screws, bolts, etc.), adhesives (e.g., glue, tape, etc.), welding, or any other suitable process for affixing parts together.

In some embodiments, a protective structural element similar to element 890 may be arranged proximate to each of one or more image capture devices of a UAV. This may include upward-facing image capture devices to protect such device from contact with the ground, for example, if the UAV lands upside down, or from contact with other surfaces above the UAV, such as a ceiling or the underside of a bridge. In some embodiments, the protective structural element 890 may represent a part of a bezel or frame that is installed flush with a surface associated with the UAV and around a lens of an image capture device.

Figure 8B:
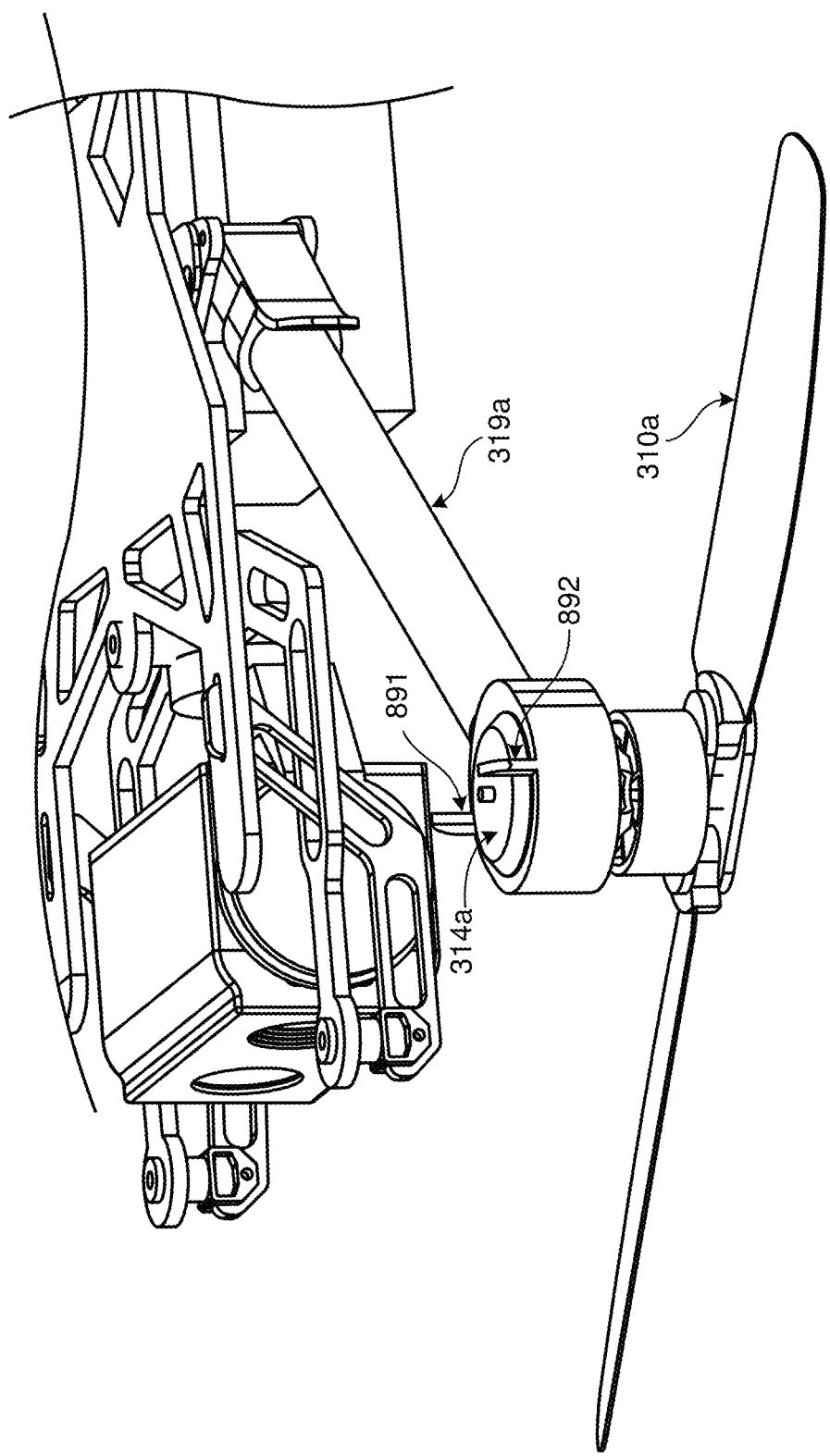
FIG. 8B shows a detail view of an example UAV that includes multiple protective structural elements arranged on opposing sides of a top-facing image capture device in accordance with some embodiments.

In some embodiments, multiple protective structural elements may be arranged at each image capture device. For example, FIG. 8B shows a detail of UAV 300 that depicts a first protective structural element 891 and a second protective structural element 892 arranged on opposing sides of a top-facing image capture device 314a. The actual arrangement of protective structural elements 890 may differ in other embodiments.

Figure 8C:
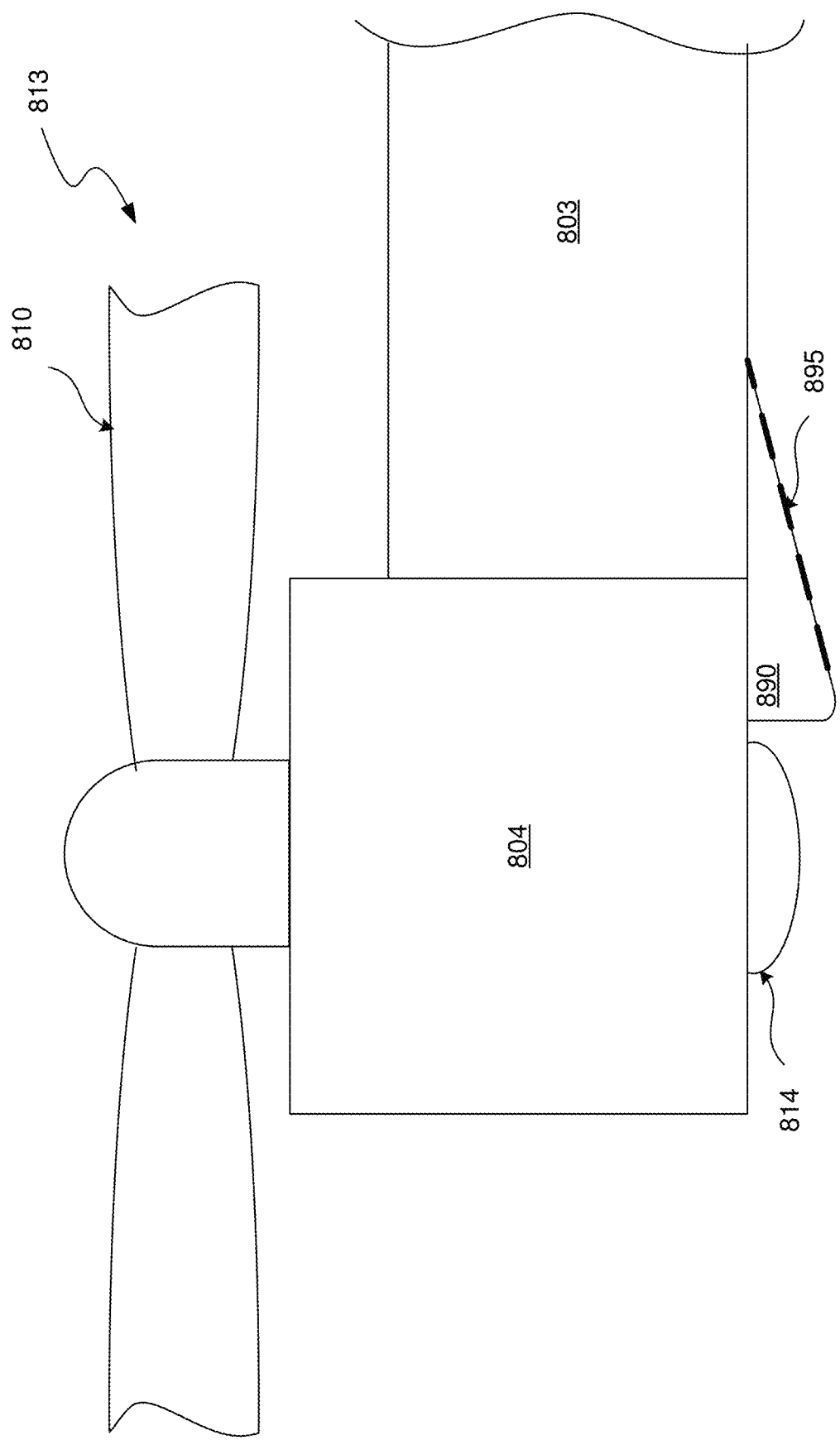
FIG. 8C shows a side view of the example protective structural element of FIG. 8A that includes an antenna in accordance with some embodiments.

In some embodiments, a protective structural element such as the element 890 depicted in FIG. 8A may be used to house an antennae that would otherwise extend from the body of the UAV, potentially obstructing a view of the one or more image capture devices. Specifically, to reduce any obstruction, an antenna can be arranged within the protective structural element or in a blind-spot of the protective structural element. For example, FIG. 8C shows a detail of the assembly 813 depicted in FIG. 8A. As shown in FIG. 8C, an antenna 895 (indicated by the dotted line) may be arranged along a surface that is in a blind spot caused by the protective structural element 890. Since this is already a blind spot caused by the protective structural element 890, adding the antenna 895 does not further obstruct the view by image capture device 814.

Figure 8D:
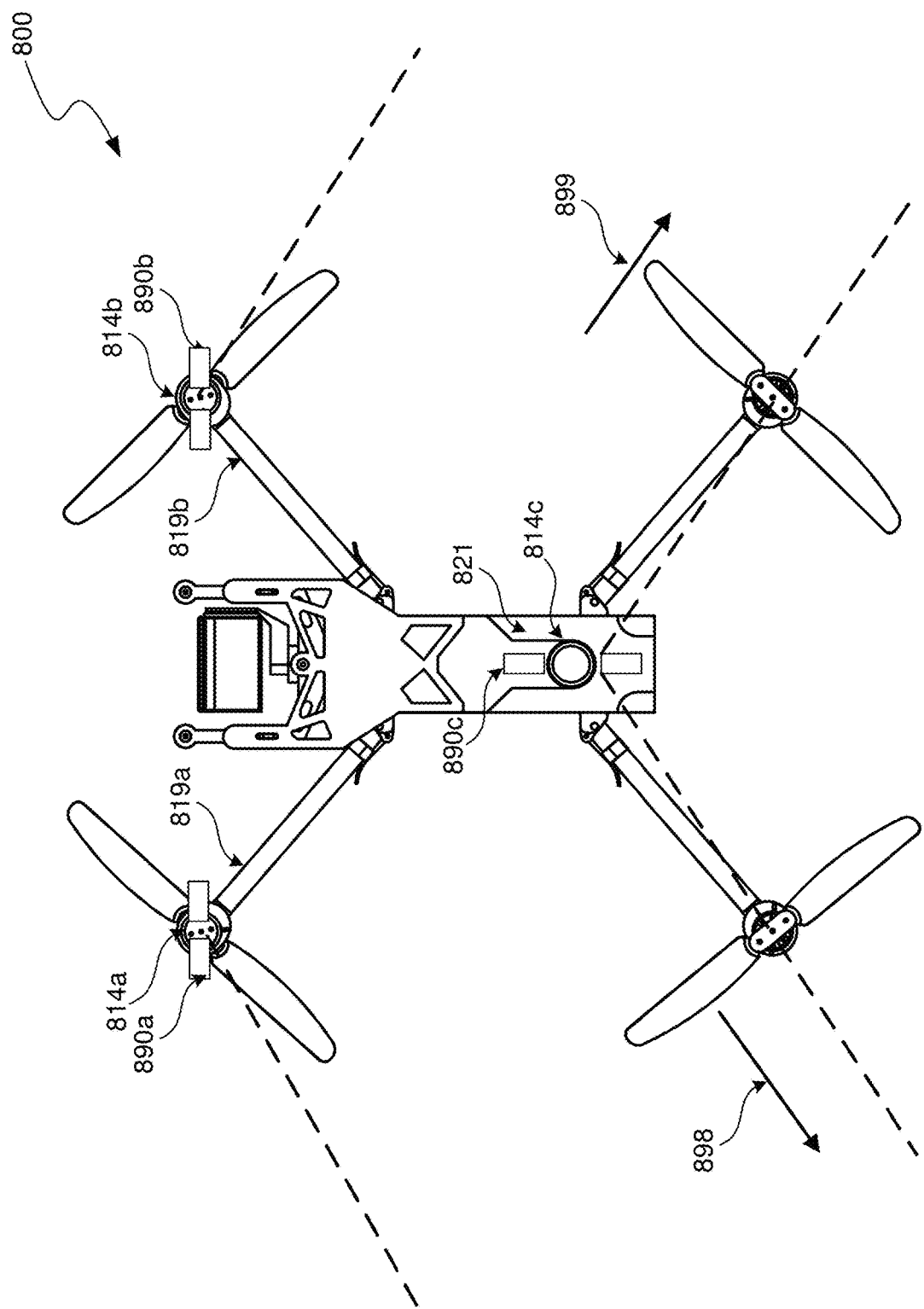
FIG. 8D shows a tip view of an example UAV that illustrates an example arrangement of protective structural elements adjacent to image capture devices in accordance with some embodiments.

In some embodiments, the one or more protective structural elements for each image capture device may be specifically oriented to reduce overall impact on stereoscopic views in multiple directions. For example, in a UAV including at least three upward facing image capture devices and three downward facing image capture devices, one or more of the protective structural elements may be arranged perpendicular to each other so as to enable stereoscopic image capture (i.e., by at least two of the three image capture devices) in multiple directions. FIG. 8D shows a top view of an example UAV 800 that is similar to UAV 300 of FIG. 3A. As shown in FIG. 8D, UAV 800 includes multiple upward facing image capture devices 814a, 814b, and 814c. Image capture device 814a is arranged on a top surface at the end of a first rotor arm 819a, image capture device 814b is arranged on a top surface at the end of a second rotor arm 819b, and image capture device 814c is arranged on a top surface of a central body 821 of the UAV 800. Each image capture device includes a corresponding pair of protective structural elements similar to protective structural element 890 of FIG. 8A. Specifically, a first pair of protective structural elements 890a are arranged proximate to image capture device 814a, a second pair of protective structural elements 890b are arranged proximate to image capture device 814b, and a third pair of protective structural elements 890c are arranged proximate to image capture device 814c.

Notably, the first pair of protective structural elements 890a and second pair of protective structural elements 890b are arranged parallel to each other, while the third pair of protective structural elements 890c are arranged perpendicular to both elements 890a and 890b. A similar arrangement may also be used for protective structural elements in proximity to downward facing image capture devices that are not shown in FIG. 8D. This arrangement enables stereoscopic image capture in multiple directions that would otherwise be obscured if the protective structural elements were arranged differently. For example, image capture devices 814a and 814c can together capture stereoscopic images in direction 898 without any obfuscation. Similarly, image capture devices 814b and 814c can together capture stereoscopic images in direction 899 without any obfuscation. While a certain amount of obstruction may be unavoidable in some directions, the arrangement depicted in FIG. 8D may minimize the amount of obstruction given a limitation of three upward facing image capture devices 814a-c. If a UAV has more or fewer than three upward facing image capture devices, the protective structural elements may be arranged differently than as shown in FIG. 8D.

Structural Heatsink

In some embodiments, an element of the central body of the UAV may be configured and arranged to operate as both a thermal heatsink (to absorb and dissipate heat from computing elements) and from a part of the structure of the body of the UAV.

Figure 9:
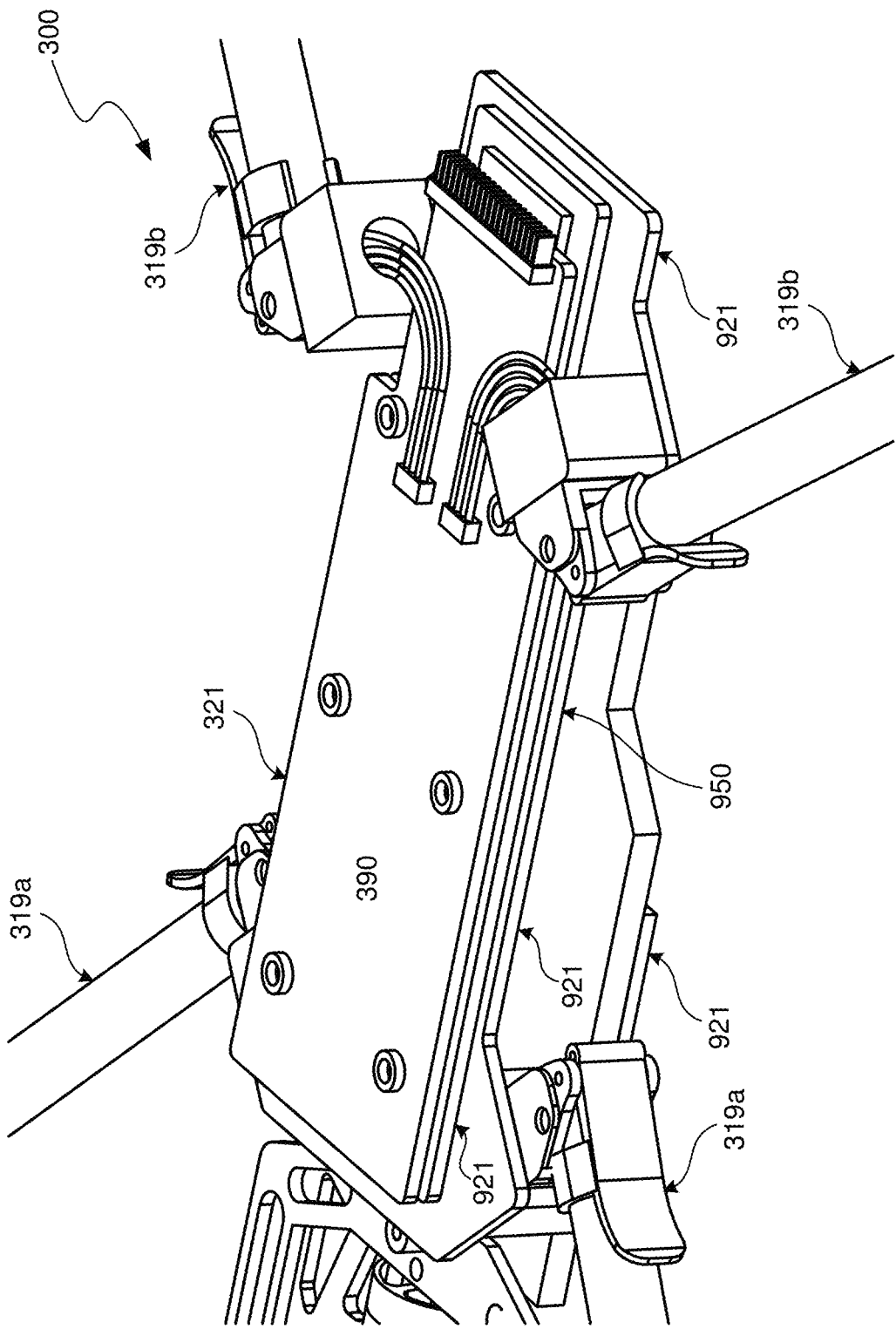
FIG. 9 shows a perspective view of a body of an example UAV that includes a structural heatsink element in accordance with some embodiments.

FIG. 9 shows a perspective view of UAV 300 (e.g., as shown in FIG. 3C). As shown in FIG. 9, the body 321 of the UAV 300 comprises one or more structural elements 921 that are fastened to each other to form the structure of the central body 321. Such structural elements may be made, for example, out of plastic, metal, carbon fiber, or any appropriate material using any appropriate manufacturing process.

Notably, the body 321 of UAV 300 also includes a structural heatsink element 950. In an example embodiment, this structural heatsink element 950 comprises a plate of magnesium or some other material having the necessary thermal properties to conduct generated heat away from computing elements (e.g., that are coupled to board 390).

In an example embodiment, the structural heatsink element 950 couples a first structural element 921 (e.g., a first carbon fiber plate) to a second structural element 921 (e.g., a second carbon fiber plate). In some embodiments, the structural heatsink element 950 is dimensioned to extend to each of the multiple rotor arms 319a-b. In other words, the structural heatsink element 950 may form a rigid slab structurally coupling each of the multiple rotor arms 319a-b (or associated structural elements 921) so as to minimize flex in the body 321 while the UAV 300 is in flight, thereby minimizing any relative motion between the multiple rotor arms 319a-b. Minimizing the relative motion between the multiple rotor arms 319a-b is advantageous where navigation image capture devices 314a-b are coupled to the rotor arms 319a-b as this may prevent errors in depth estimates based on images captured by one or more of the navigation image capture devices 314a-b.

Digital Pan/Zoom in Multiple Directions Based on Multiple Image Capture Devices

As previously discussed with reference to FIG. 1, a UAV 100 may include multiple image capture devices 114a-b that are typically used for capturing images for autonomous navigation purposes and a separate image capture device 115 that is typically used for capturing user images (e.g., live stream video, recorded video, still images, etc.). The multiple image capture devices 114a-b are arranged around the UAV 100 to provide full 360-degree coverage around the UAV 100 while the image capture device 115 has a relatively narrow FOV. In some embodiments, the broader coverage of the navigation image capture devices 114a-b may be leveraged to provide digital pan and/or zoom functionality in multiple directions. In an example embodiment, images captured by user image capture device 115 may be combined with images from one or more of the navigation image capture devices 114a-b to provide digital pan/zoom, from a user's perspective, in any direction around the UAV 100.

For example, a graphical user interface (e.g., presented at mobile device 104), may present images (e.g., video) captured by image capture device 115 while the UAV 100 is in flight. An option is presented in the GUI that enables the user to digitally pan and/or zoom the image in any direction even if the image capture device 115 is not currently capable of pointing in that direction (e.g., due to the orientation of the UAV 100). This can be accomplished by processing images captured by the image capture device 115 with images captured by one or more of the navigation image capture devices 114a-b to produce a composite image of a view in the selected direction.

Removable Battery

Figure 10A:
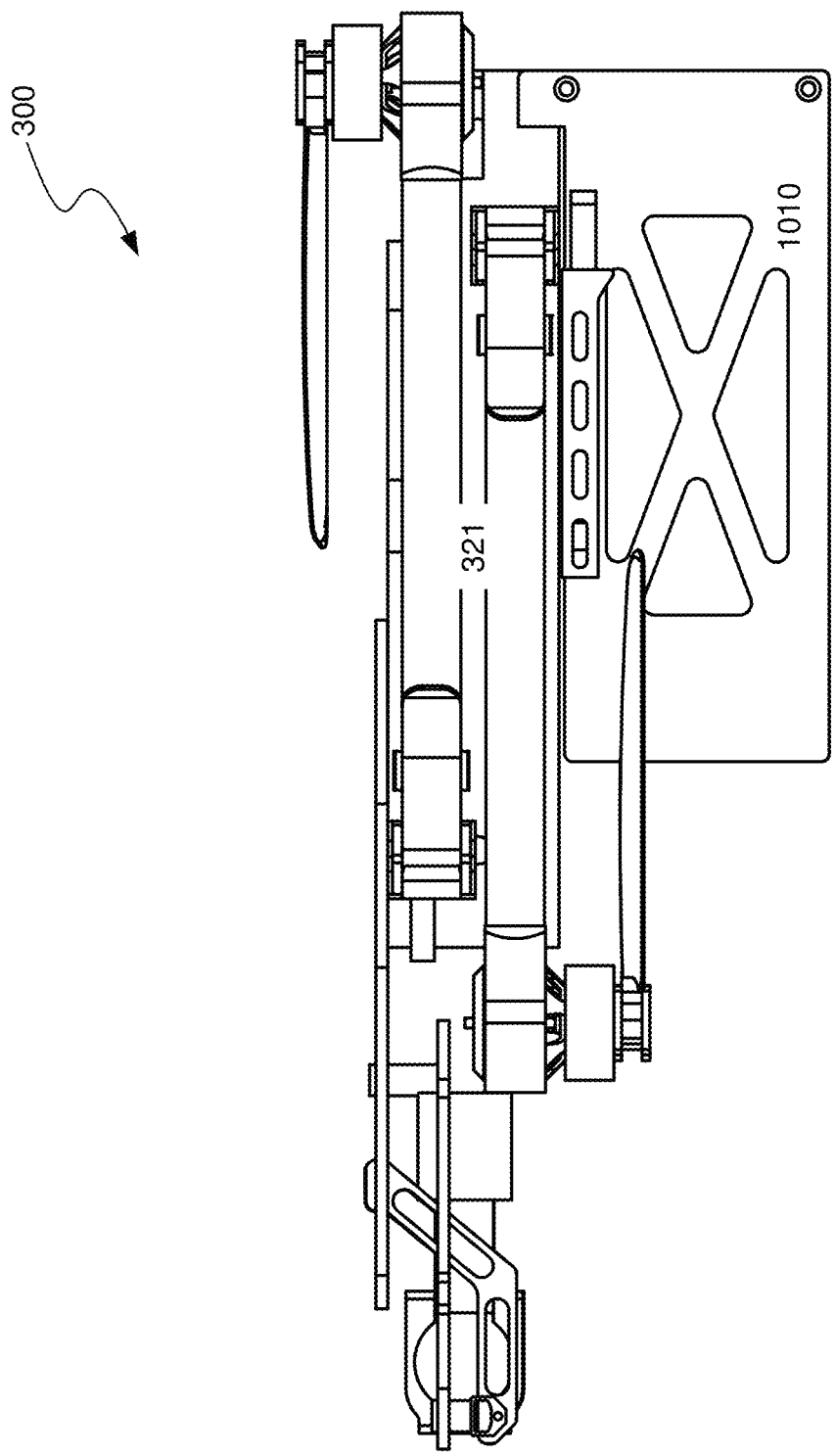
FIG. 10A shows a side view of an example UAV with a removable battery pack in accordance with some embodiments.

In some embodiments, the UAV may include a removable battery pack. FIG. 10A shows a side view of UAV 300 (e.g., similar to as depicted in FIG. 3E) that illustrates a removable battery pack 1010 that is arranged on an underside of the central body 321 of the UAV 300. This is an example configuration and is not to be construed as limiting. Other embodiments may arrange the removeable battery pack at a different location relative the central body 321 (e.g., on top).

Figure 10B:
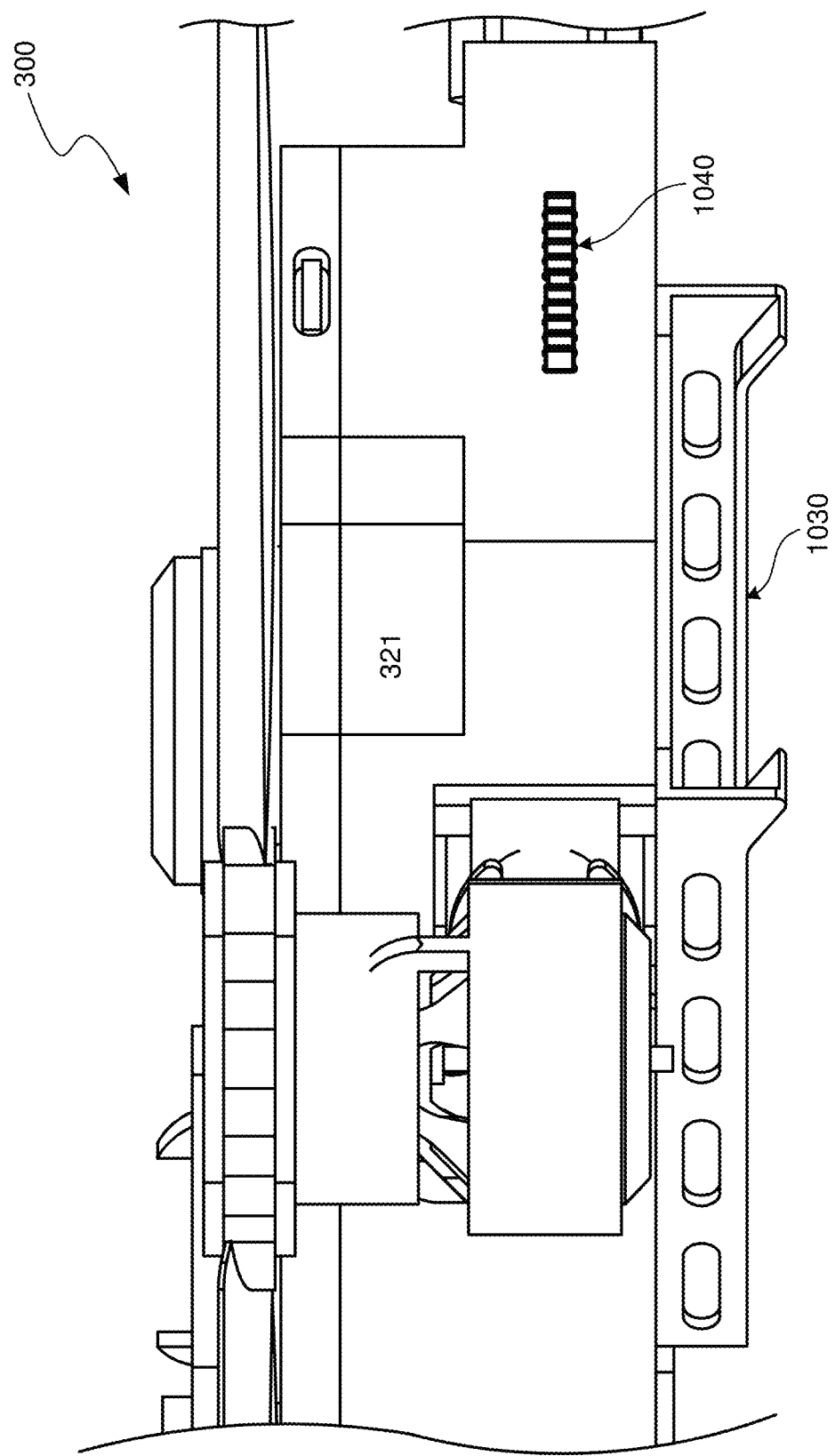
FIG. 10B shows a rear perspective view of the example UAV of FIG. 10A that depicts the battery pack removed in accordance with some embodiments.
Figure 10C:
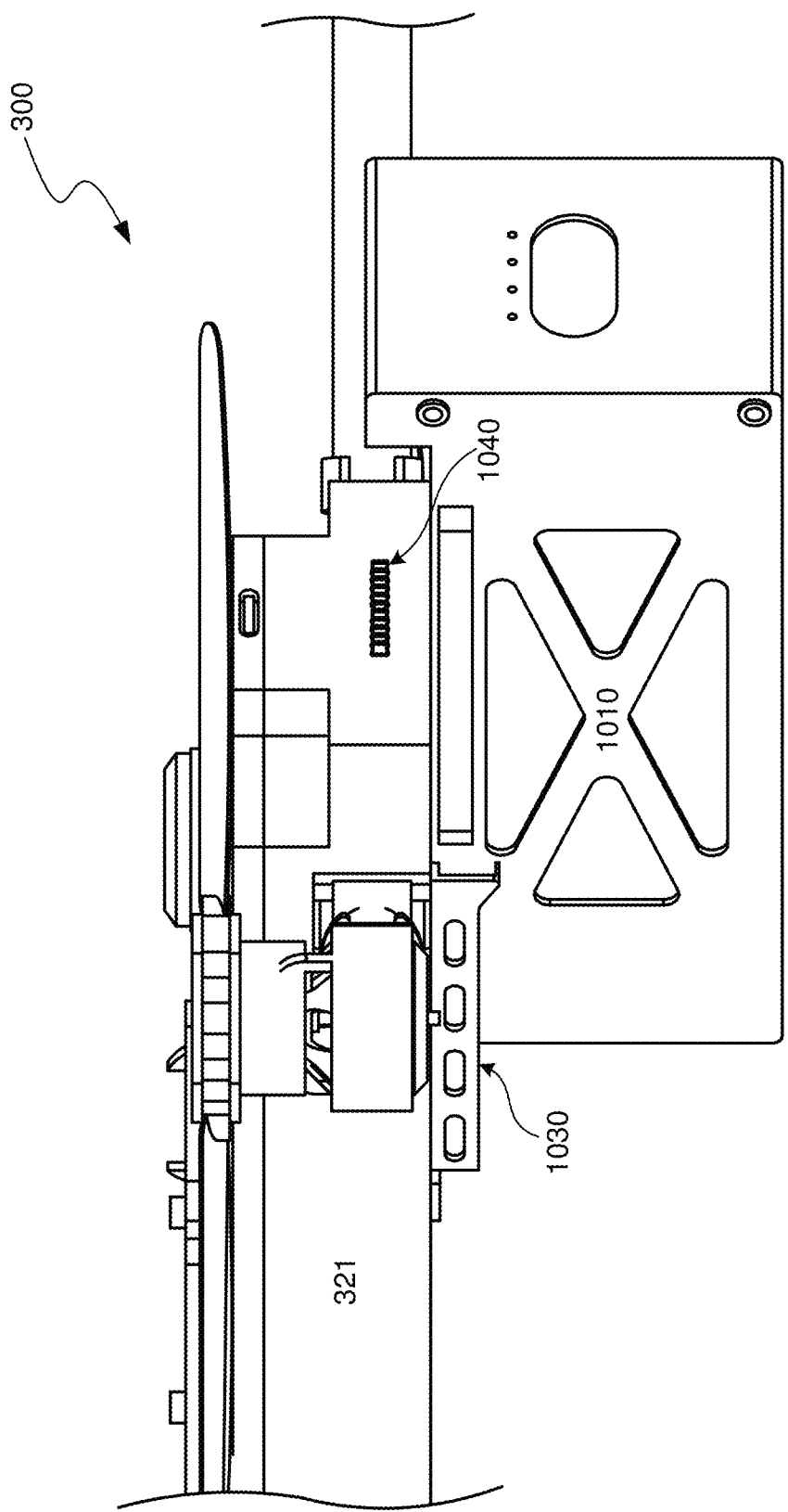
FIG. 10C shows another rear perspective view of the example UAV of FIG. 10A that depicts the battery pack partially in place in accordance with some embodiments.

FIG. 10B shows a rear perspective view of UAV 300 with the battery pack 1010 removed. As shown in FIG. 10B, the underside of the central body 321 includes one or more structural elements configured to detachably couple the battery pack 1010 to the body 321 of the UAV 300. In the example embodiment depicted in FIG. 10B, the structural elements include two rails 1030 configured to accommodate a housing of the battery pack 1010 and allow the battery pack to slide into and out of place. For example, FIG. 10C shows a second rear perspective view of UAV 300 that depicts the battery pack partially in place. Notably, as shown in FIG. 10C, the housing of the battery pack 1010 is shaped so as to slide along the rails 1030 on the underside of the body 321. A user may apply pressure to slide the battery pack 1010 into place until one or more electrical contacts 1040 on the body 321 couple to one or more contacts (not shown) of the battery pack 1010.

In some embodiments, magnets may be used to keep the battery pack 1010 in place and electrically coupled to onboard components. For example, the electrical contacts 1040 may be arranged proximate to a magnetic coupling configured to keep the battery pack 1010 in place, while the UAV 300 is in use. The magnetic coupling may allow a user to easily remove the battery pack 1010 by applying a small amount of force.

Detachable Payload

Figure 11A:
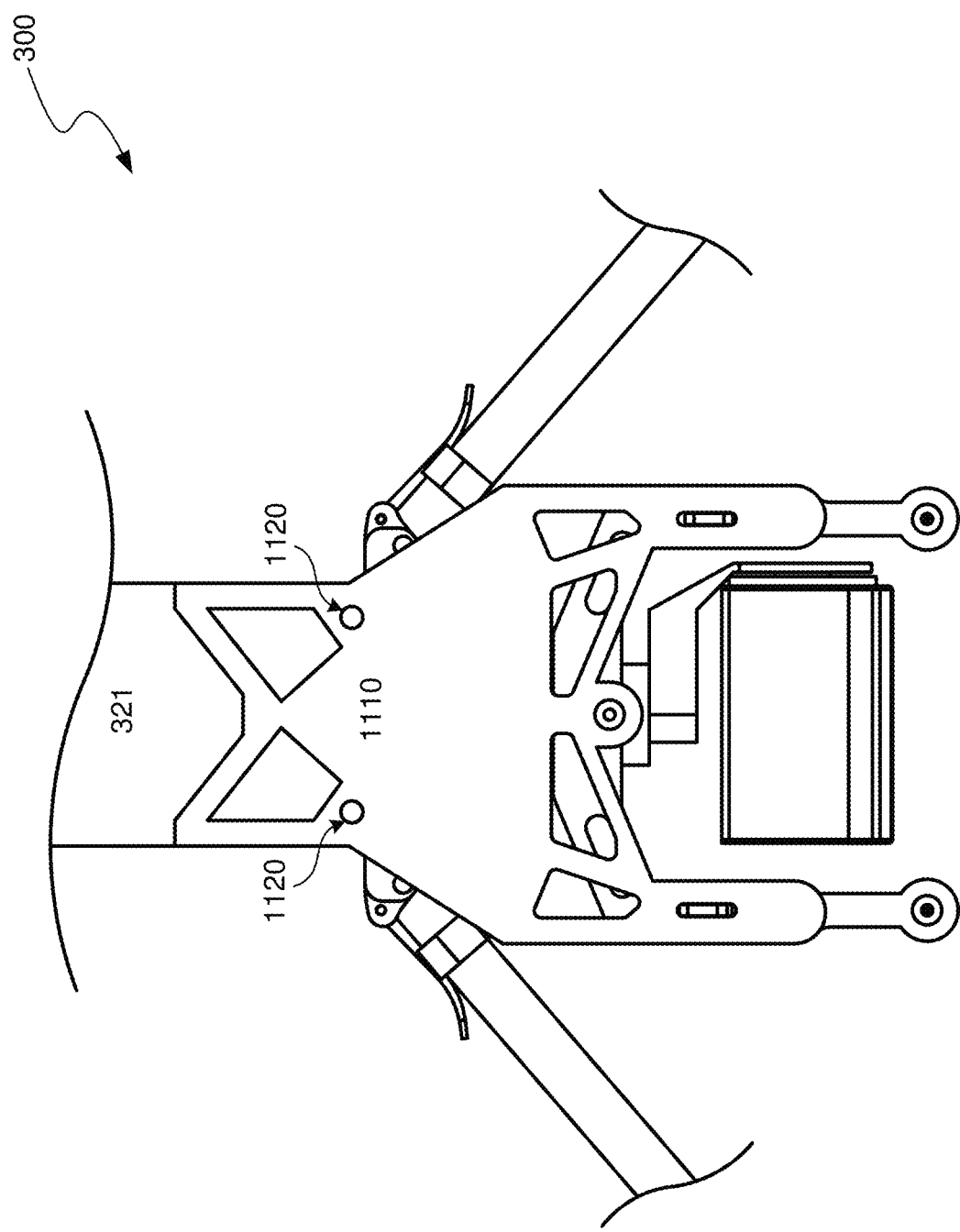
FIG. 11A shows a top view of an example UAV that depicts a detachable payload area in accordance with some embodiments.

In some embodiments, the UAV may be configured to accommodate detachable payloads. FIG. 11A shows a top view of UAV 300 that illustrates an example payload area. As shown in FIG. 11A, the payload area 1110 may include one or more surfaces on top of the central body 321 of the UAV 300. In some embodiments, the payload area includes one or more components 1120 configured to detachably couple to a payload (not shown). Components 1120 may comprise mechanical latches, magnets, or any other suitable means for detachably coupling to a payload. FIG. 11A shows a detachable payload area 1110 located on top of the body 321 proximate to the front end of the UAV 300. Other embodiments include payload mounting areas located elsewhere on the body 321, for example, proximate to the rear of the UAV 300.

Figure 11B:
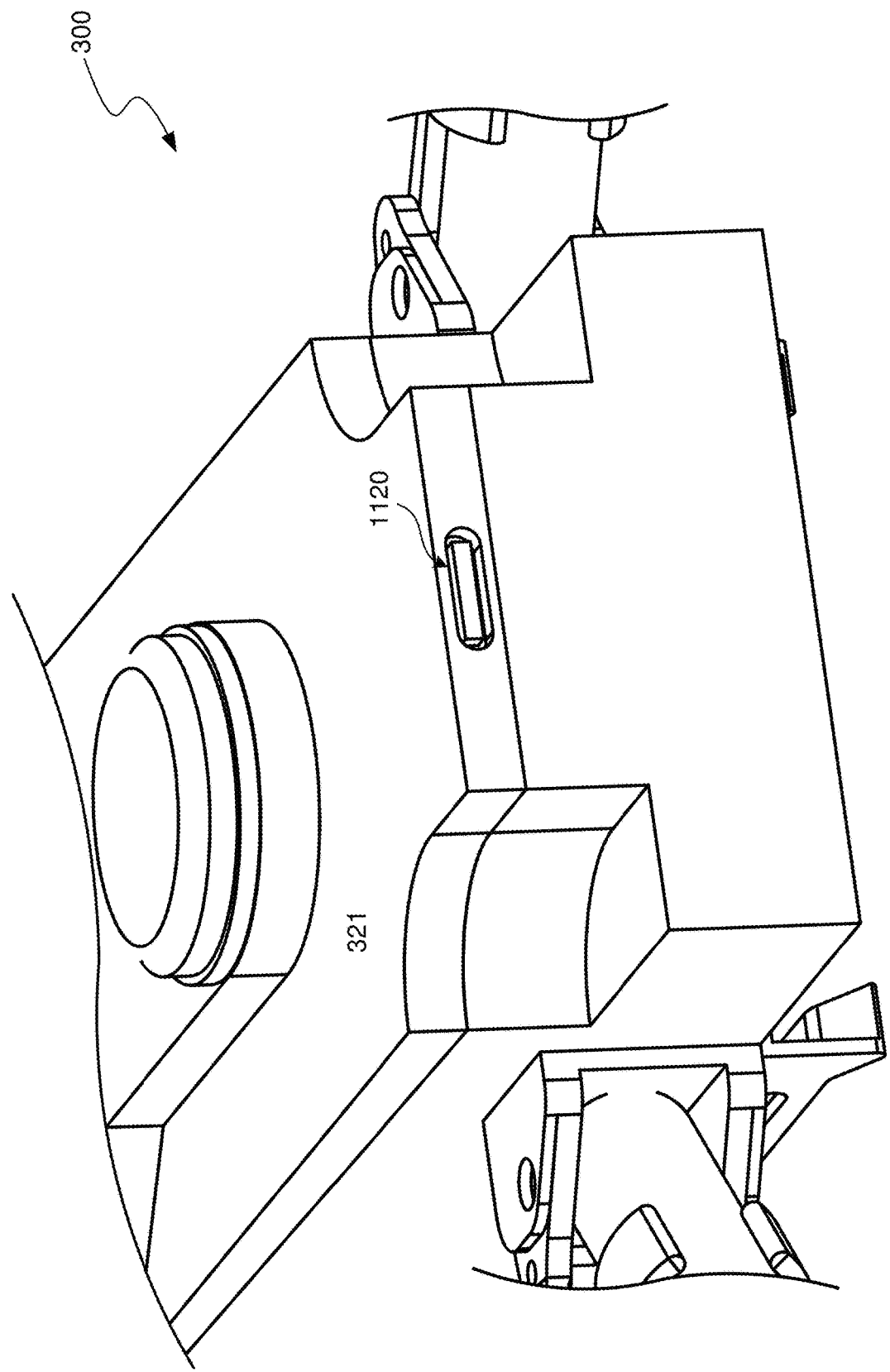
FIG. 11B shows a rear perspective view of an example UAV that depicts an interface for a detachable payload in accordance with some embodiments.

In some embodiments, UAV 300 may include one or more interfaces through which to communicate with components in a detachable payload. For example, FIG. 11B shows an example interface in the form of a USB connector 1120. Components in a detachable payload (e.g., a processing component, a radio component, a memory component, etc.) may communicate with internal components of the UAV 300 using the USB connection 1120. Other embodiments may use other types of wired or wireless interfaces to communicatively couple internal components with components in the detachable payload.

Radio Module

In some embodiments, the UAV may be configured to accommodate a radio module. The radio module may include RF components (e.g., transceiver circuits, processors, antennae, interface connectors, etc.) that may be utilized to extend the communications functionality of the UAV. For example, a UAV that does not include an integrated RF circuitry may be configured to accommodate a radio module to provide RF communication functionality.

Figure 12A:
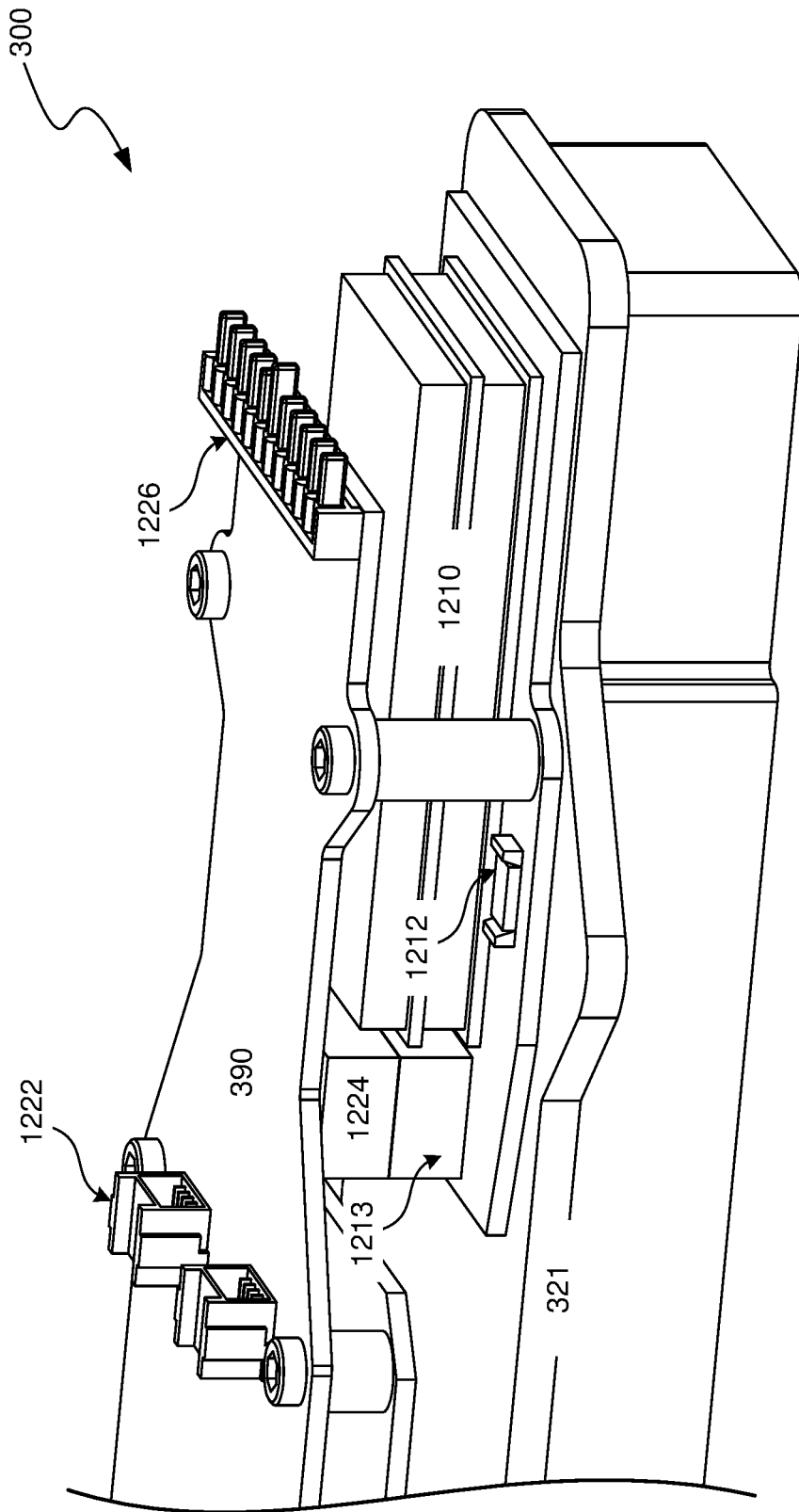
FIG. 12A shows a detail perspective view of an underside of an example UAV configured to accommodate a radio module in accordance with some embodiments.

FIG. 12A shows a detail perspective view of an underside of the example UAV 300 (e.g., similar to as depicted in FIG. 3H). As shown in FIG. 12A, the body 321 of UAV 300 may be configured to accommodate a radio module 1210. In an example embodiment, the radio module 1210 includes an omnidirectional antenna, a radio carrier PCBA 1212 configured for multi-channel communications, and an interface connector 1213 for connection to systems onboard the UAV 300. To facilitate communication with the RF components of the radio module 1210, the signal/power transmission board 390 (e.g., a printed circuit board) may include one or more interface connectors such as interface connectors 1222, 1224, and/or 1226. In some embodiments, each of the interface connectors may be of a different type (e.g., PCB board-to-board connector, USB, RJ modular connector, etc.) wherein at least one is of a type configured to accept the interface connector 1213 of the radio module 1210.

Self-Leveling Landing Gear

In some embodiments, a UAV may include a self-leveling landing gear configured to keep the UAV upright on uneven landing surfaces. FIG. 12B shows two views of a UAV 1250 with a self-leveling landing gear 1260. Specifically, FIG. 12B shows a first view 1280a in which the UAV 1250 has landed on a flat even surface and a second view 1280b in which the UAV 1250 has landed on a non-flat uneven surface (e.g., a sandbag).

Figure 12C:
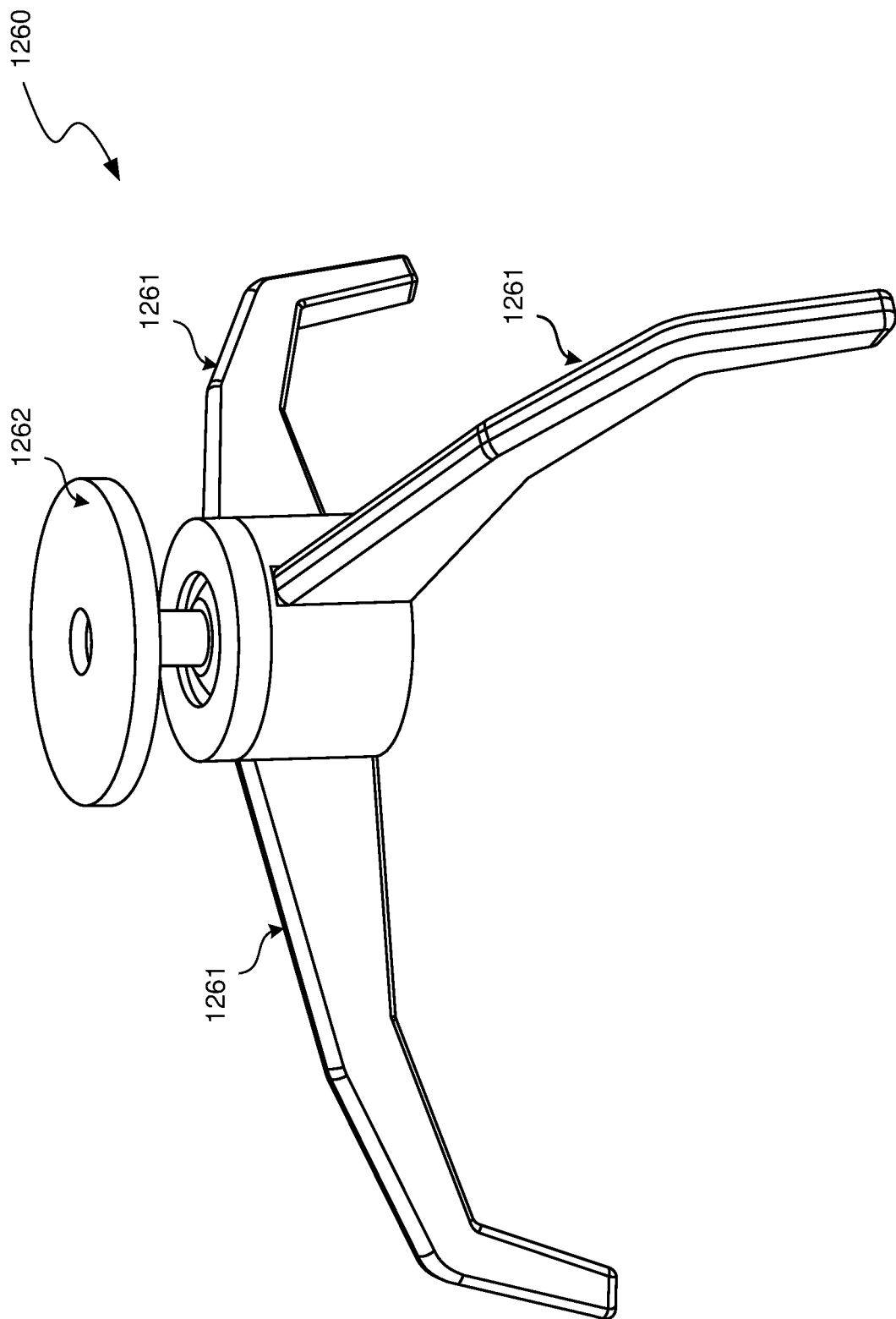

FIG. 12C show a detailed perspective view of the self-leveling landing gear 1260 depicted in FIG. 12B. In some embodiments, the self-leveling landing gear 1260 comprises multiple landing legs 1261 coupled to a locking swivel element 1262 that is free to rotate when there is no load on the landing legs 1261, but passively locks in place when load is applied. The locking swivel is coupled to a bottom side of a body of the UAV 1250. During a landing sequence, and before the UAV 1250 fully powers off, the locking swivel 1262 enables the landing legs 1261 to make contact with terrain and freely swivel, while the UAV 1250 remains level, until all legs are in contact. As the rotors of the UAV 1250 power down, load is applied to the self-leveling landing gear 1260 (due to the weight of the UAV 1250), thereby locking the landing swivel 1262 in place.

Figure 12D:
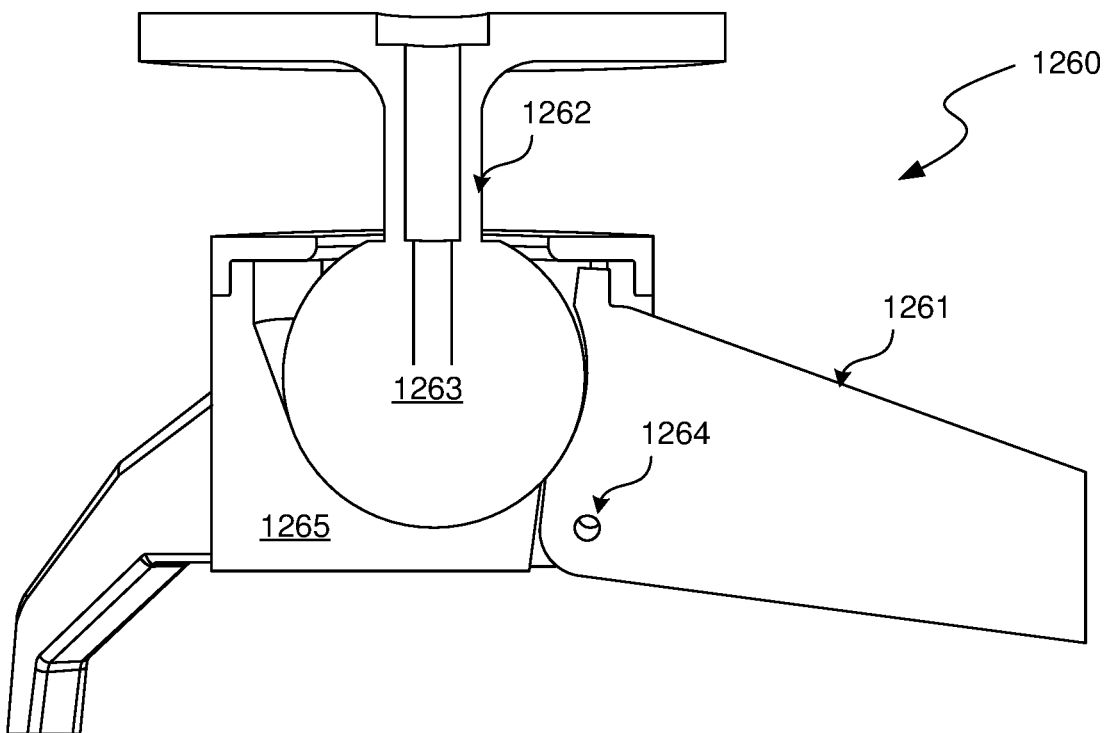
Figure 12E:
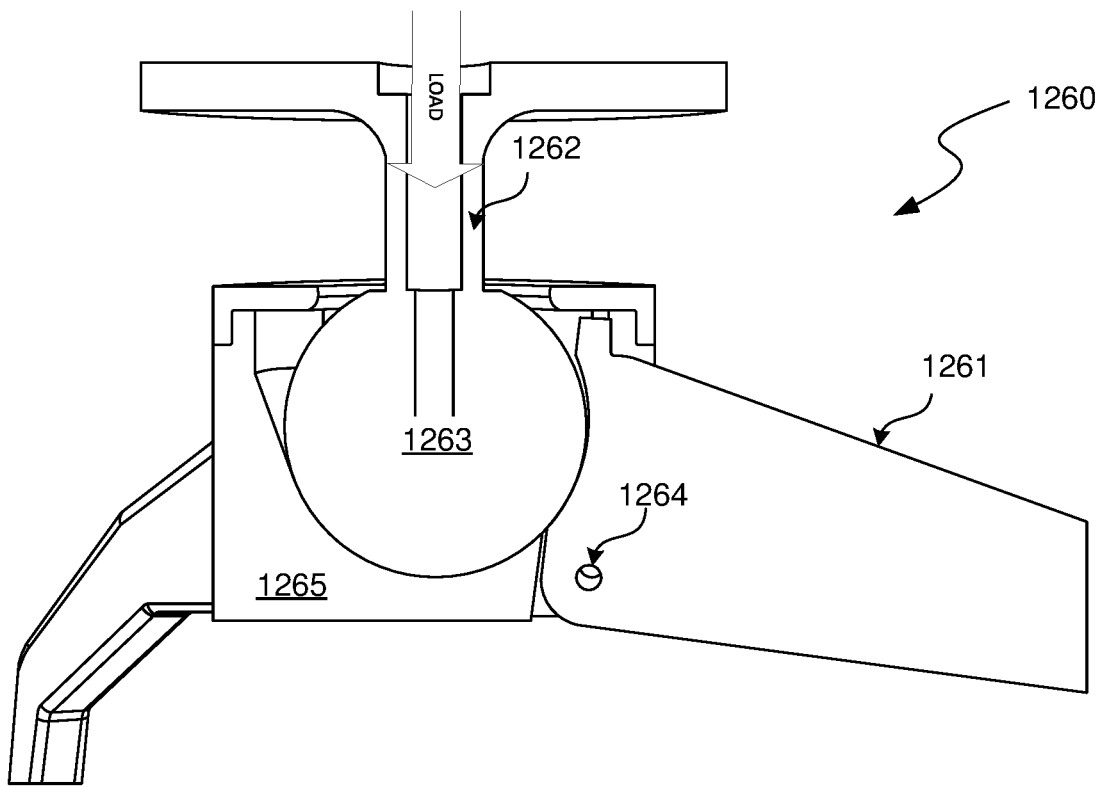

FIG. 12D shows a side section view of the self-leveling landing gear 1260 in an unlocked position (i.e., with little or no load applied) and FIG. 12E shows a side section view of the self-leveling landing gear 1260 in a locked position (i.e., with full load applied). As shown in FIGS. 12D and 12E, the self-leveling landing gear 1260 may passively lock in place when a load applied to a top surface cases the ball portion 1263 of the locking swivel element 1262 to contact each of the landing legs 1261. In some embodiments, each landing leg 1261 is rotatably coupled to a housing 1265 for the ball portion 1263 of the locking swivel element 1262. Load applied to the locking swivel element 1262 (e.g., as the UAV 1250 is settling down), causes the ball portion 1263 to move down within the housing 1265 thereby contacting an adjacent surface of each of the landing legs 1261. This contact causes the landing legs 1261 to rotate slightly about an axis 1264, thereby locking the ball portion 1263 in place. The lock is passively released as the load is relieved when the UAV 1250 takes off.

Note, FIGS. 12B-12E depict the self-leveling landing gear 1260 in the form of a tripod (i.e., including three landing legs 1261). This is just an example provided for illustrative purposes. Other self-leveling landing gear may include fewer or more landing gear than are shown.

UAV—Example System

Figure 13:
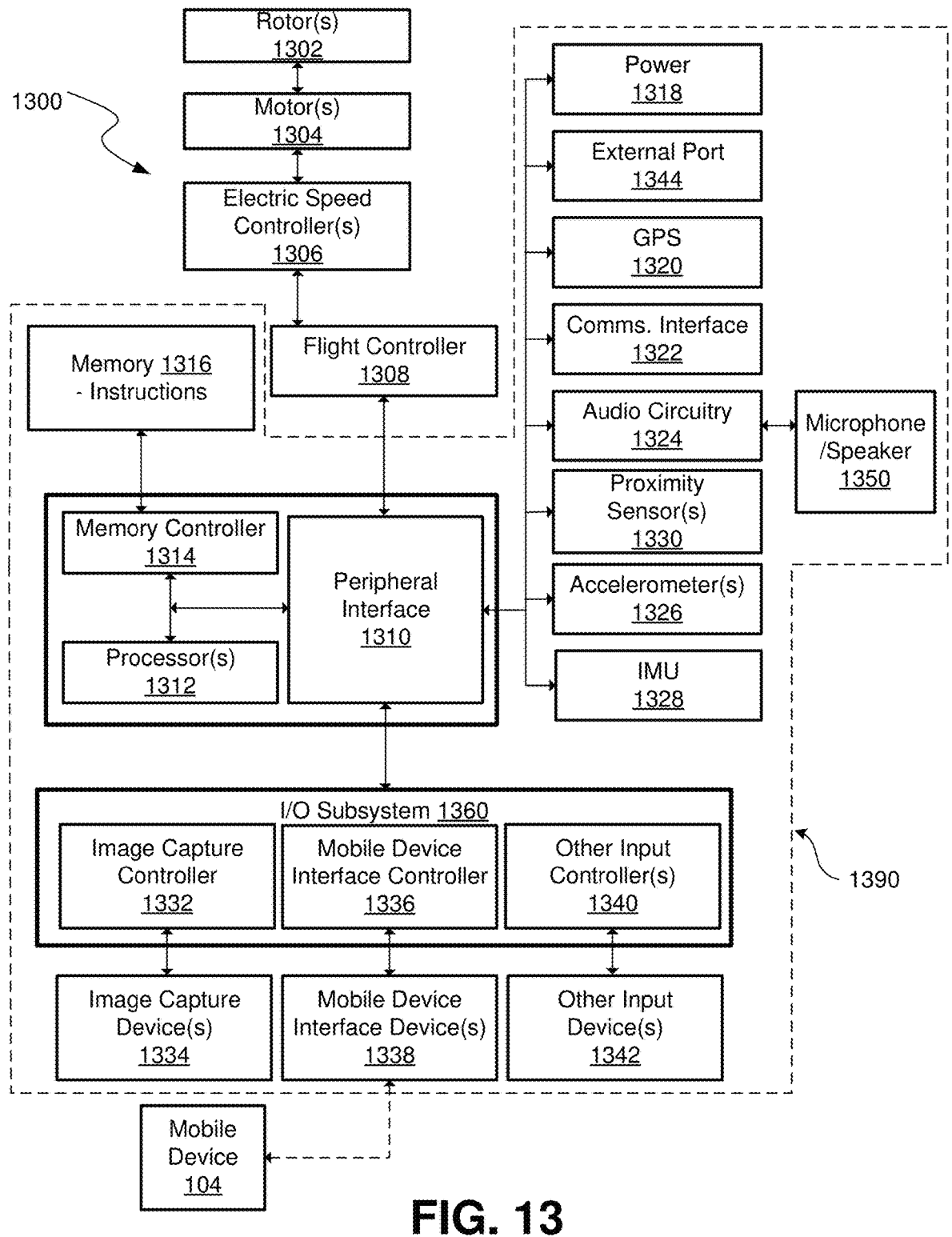
FIG. 13 shows a diagram of an example system including various functional system components of an example UAV in accordance with some embodiments.

FIG. 13 shows a diagram of an example system 1300 including various functional system components that may be part of any of the aforementioned aerial vehicles, including UAVs 100, 300, 500, 800, etc. System 1300 may include one or more propulsion systems (e.g., rotors 1302 and motor(s) 1304), one or more electronic speed controllers 1306, a flight controller 1308, a peripheral interface 1310, processor (s) 1312, a memory controller 1314, a memory 1316 (which may include one or more computer-readable storage media), a power module 1318, a GPS module 1320, a communications interface 1322, audio circuitry 1324, an accelerometer 1326 (including subcomponents, such as gyroscopes), an IMU 1328, a proximity sensor 1330, an optical sensor controller 1332 and associated optical sensor(s) 1334, a mobile device interface controller 1336 with associated interface device(s) 1338, and any other input controllers 1340 and input device(s) 1342, for example, display controllers with associated display device(s). These components may communicate over one or more communication buses or signal lines as represented by the arrows in FIG. 13.

System 1300 is only one example of a system that may be part of any of the aforementioned aerial vehicles. Other aerial vehicles may include more or fewer components than shown in system 1300, may combine two or more components as functional units, or may have a different configuration or arrangement of the components. Some of the various components of system 1300 shown in FIG. 13 may be implemented in hardware, software or a combination of both hardware and software, including one or more signal processing and/or application specific integrated circuits. Also, an aerial vehicle may include an off-the-shelf aerial vehicle (e.g., a currently available remote-controlled UAV), coupled with a modular add-on device (for example, one including components within outline 1390), to perform the innovative functions described in this disclosure.

A propulsion system (e.g., comprising components 1302-1304) may comprise fixed-pitch rotors. The propulsion system may also include variable-pitch rotors (for example, using a gimbal mechanism), a variable-pitch jet engine, or any other mode of propulsion having the effect of providing force. The propulsion system may vary the applied thrust, for example, by using an electronic speed controller 1306 to vary the speed of each rotor.

Flight controller 1308 may include a combination of hardware and/or software configured to receive input data (e.g., sensor data from image capture devices 1334, generated trajectories from an autonomous navigation system 120, or any other inputs), interpret the data and output control commands to the propulsion systems 1302-1306 and/or aerodynamic surfaces (e.g., fixed-wing control surfaces) of the aerial vehicle. Alternatively, or in addition, a flight controller 1308 may be configured to receive control commands generated by another component or device (e.g., processors 1312 and/or a separate computing device), interpret those control commands and generate control signals to the propulsion systems 1302-1306 and/or aerodynamic surfaces (e.g., fixed-wing control surfaces) of the aerial vehicle. In some embodiments, the previously mentioned navigation system 120 may comprise the flight controller 1308 and/or any one or more of the other components of system 1300. Alternatively, the flight controller 1308 shown in FIG. 13 may exist as a component separate from the navigation system 120, for example, similar to the flight controller 160 shown in FIG. 2.

Memory 1316 may include high-speed random-access memory and may also include non-volatile memory, such as one or more magnetic disk storage devices, flash memory devices, or other non-volatile solid-state memory devices. Access to memory 1316 by other components of system 1300, such as the processors 1312 and the peripherals interface 1310, may be controlled by the memory controller 1314.

The peripherals interface 1310 may couple the input and output peripherals of system 1300 to the processor(s) 1312 and memory 1316. The one or more processors 1312 run or execute various software programs and/or sets of instructions stored in memory 1316 to perform various functions for the UAV 100 and to process data. In some embodiments, processors 1312 may include general central processing units (CPUs); specialized processing units, such as graphical processing units (GPUs), that are particularly suited to parallel processing applications; other programmable processing units such as field programmable gate arrays (FPGAs); non-programmable processing units such as application specific integrated circuits (ASICs); or any combination thereof. In some embodiments, the peripherals interface 1310, the processor(s) 1312, and the memory controller 1314 may be implemented on a single integrated chip. In some other embodiments, they may be implemented on separate chips.

The network communications interface 1322 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11n and/or IEEE 802.11ac), Voice over Internet Protocol (VOIP), Wi-MAX, or any other suitable communication protocols.

The audio circuitry 1324, including the speaker and microphone 1350, may provide an audio interface between the surrounding physical environment and the aerial vehicle. The audio circuitry 1324 may receive audio data from the peripherals interface 1310, convert the audio data to an electrical signal, and transmit the electrical signal to the speaker 1350. The speaker 1350 may convert the electrical signal to human-audible sound waves. The audio circuitry 1324 may also receive electrical signals converted by the microphone 1350 from sound waves. The audio circuitry 1324 may convert the electrical signal to audio data and transmit the audio data to the peripherals interface 1310 for processing. Audio data may be retrieved from and/or transmitted to memory 1316 and/or the network communications interface 1322 by the peripherals interface 1310.

The I/O subsystem 1360 may couple input/output peripherals of the aerial vehicle, such as an optical sensor system 1334, the mobile device interface 1338, and other input/control devices 1342, to the peripherals interface 1310. The I/O subsystem 1360 may include an optical sensor controller 1332, a mobile device interface controller 1336, and other input controller(s) 1340 for other input or control devices. The one or more input controllers 1340 receive/send electrical signals from/to other input or control devices 1342. The other input/control devices 1342 may include physical buttons (e.g., push buttons, rocker buttons, etc.), dials, touchscreen displays, slider switches, joysticks, click wheels, and so forth.

The mobile device interface device 1338 along with mobile device interface controller 1336 may facilitate the transmission of data between the aerial vehicle and other computing devices such as a mobile device 104. According to some embodiments, communications interface 1322 may facilitate the transmission of data between the aerial vehicle and a mobile device 104 (for example, where data is transferred over a Wi-Fi network).

System 1300 also includes a power system 1318 for powering the various components. The power system 1318 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

System 1300 may also include one or more image capture devices 1334. Image capture devices 1334 may be the same as any of the image capture devices associated with any of the aforementioned aerial vehicles including UAVs 100, 300, 500, 800, etc. FIG. 13 shows an image capture device 1334 coupled to an image capture controller 1332 in I/O subsystem 1360. The image capture device 1334 may include one or more optical sensors. For example, image capture device 1334 may include charge-coupled device (CCD) or complementary metal-oxide semiconductor (CMOS) phototransistors. The optical sensors of image capture devices 1334 receive light from the environment, projected through one or more lenses (the combination of an optical sensor and lens can be referred to as a "camera"), and converts the light to data representing an image. In conjunction with an imaging module located in memory 1316, the image capture device 1334 may capture images (including still images and/or video). In some embodiments, an image capture device 1334 may include a single fixed camera. In other embodiments, an image capture device 1340 may include a single adjustable camera (adjustable using a gimbal mechanism with one or more axes of motion). In some embodiments, an image capture device 1334 may include a camera with a wide-angle lens providing a wider FOV (e.g., at least 180 degrees). In some embodiments, an image capture device 1334 may include an array of multiple cameras providing up to a full 360 degree view in all directions. In some embodiments, an image capture device 1334 may include two or more cameras (of any type as described herein) placed next to each other in order to provide stereoscopic vision. In some embodiments, an image capture device 1334 may include multiple cameras of any combination as described above. In some embodiments, the cameras of an image capture device 1334 may be arranged such that at least two cameras are provided with overlapping FOV at multiple angles around the aerial vehicle, thereby enabling stereoscopic (i.e., 3D) image/video capture and depth recovery (e.g., through computer vision algorithms) at multiple angles around the aerial vehicle. In some embodiments, the aerial vehicle may include some cameras dedicated for image capture of a subject and other cameras dedicated for image capture for visual navigation (e.g., through visual inertial odometry).

UAV system 1300 may also include one or more proximity sensors 1330. FIG. 13 shows a proximity sensor 1330 coupled to the peripherals interface 1310. Alternately, the proximity sensor 1330 may be coupled to an input controller 1340 in the I/O subsystem 1360. Proximity sensors 1330 may generally include remote sensing technology for proximity detection, range measurement, target identification, etc. For example, proximity sensors 1330 may include radar, sonar, and LIDAR.

System 1300 may also include one or more accelerometers 1326. FIG. 13 shows an accelerometer 1326 coupled to the peripherals interface 1310. Alternately, the accelerometer 1326 may be coupled to an input controller 1340 in the I/O subsystem 1360.

System 1300 may include one or more IMU 1328. An IMU 1328 may measure and report the UAV's velocity, acceleration, orientation, and gravitational forces using a combination of gyroscopes and accelerometers (e.g., accelerometer 1326).

System 1300 may include a global positioning system (GPS) receiver 1320. FIG. 13 shows a GPS receiver 1320 coupled to the peripherals interface 1310. Alternately, the GPS receiver 1320 may be coupled to an input controller 1340 in the I/O subsystem 1360. The GPS receiver 1320 may receive signals from GPS satellites in orbit around the earth, calculate a distance to each of the GPS satellites (through the use of GPS software), and thereby pinpoint a current global position of the aerial vehicle.

In some embodiments, the software components stored in memory 1316 may include an operating system, a communication module (or set of instructions), a flight control module (or set of instructions), a localization module (or set of instructions), a computer vision module (or set of instructions), a graphics module (or set of instructions), and other applications (or sets of instructions). For clarity, one or more modules and/or applications may not be shown in FIG. 13.

An operating system (e.g., Darwin™, RTXC, Linux™, Unix™, Apple™ OS X, Microsoft Windows™, or an embedded operating system such as VxWorks™) includes various software components and/or drivers for controlling and managing general system tasks (e.g., memory management, storage device control, power management, etc.), and facilitates communication between various hardware and software components.

A communications module may facilitate communication with other devices over one or more external ports 1344 and may also include various software components for handling data transmission via the network communications interface 1322. The external port 1344 (e.g., Universal Serial Bus (USB), Firewire, etc.) may be adapted for coupling directly to other devices or indirectly over a network (e.g., the Internet, wireless LAN, etc.).

A graphics module may include various software components for processing, rendering, and displaying graphics data. As used herein, the term "graphics" may include any object that can be displayed to a user, including, without limitation, text, still images, videos, animations, icons (such as user-interface objects including soft keys), and the like. The graphics module, in conjunction with a graphics processing unit (GPU) 1312, may process in real time, or near real time, graphics data captured by optical sensor(s) 1334 and/or proximity sensors 1330.

A computer vision module, which may be a component of a graphics module, provides analysis and recognition of graphics data. For example, while the aerial vehicle is in flight, the computer vision module, along with a graphics module (if separate), GPU 1312, and image capture devices (s) 1334, and/or proximity sensors 1330 may recognize and track the captured image of an object located on the ground. The computer vision module may further communicate with a localization/navigation module and flight control module to update a position and/or orientation of the aerial vehicle and to provide course corrections to fly along a planned trajectory through a physical environment.

A localization/navigation module may determine the location and/or orientation of the aerial vehicle and provide this information for use in various modules and applications (e.g., to a flight control module in order to generate commands for use by the flight controller 1308).

Image capture devices(s) 1334, in conjunction with an image capture device controller 1332 and a graphics module, may be used to capture images (including still images and video) and store them into memory 1316.

The above identified modules and applications each correspond to a set of instructions for performing one or more functions described above. These modules (i.e., sets of instructions) need not be implemented as separate software programs, procedures or modules, and, thus, various subsets of these modules may be combined or otherwise rearranged in various embodiments. In some embodiments, memory 1316 may store a subset of the modules and data structures identified above. Furthermore, memory 1316 may store additional modules and data structures not described above.

Example Computer Processing System

Figure 14:
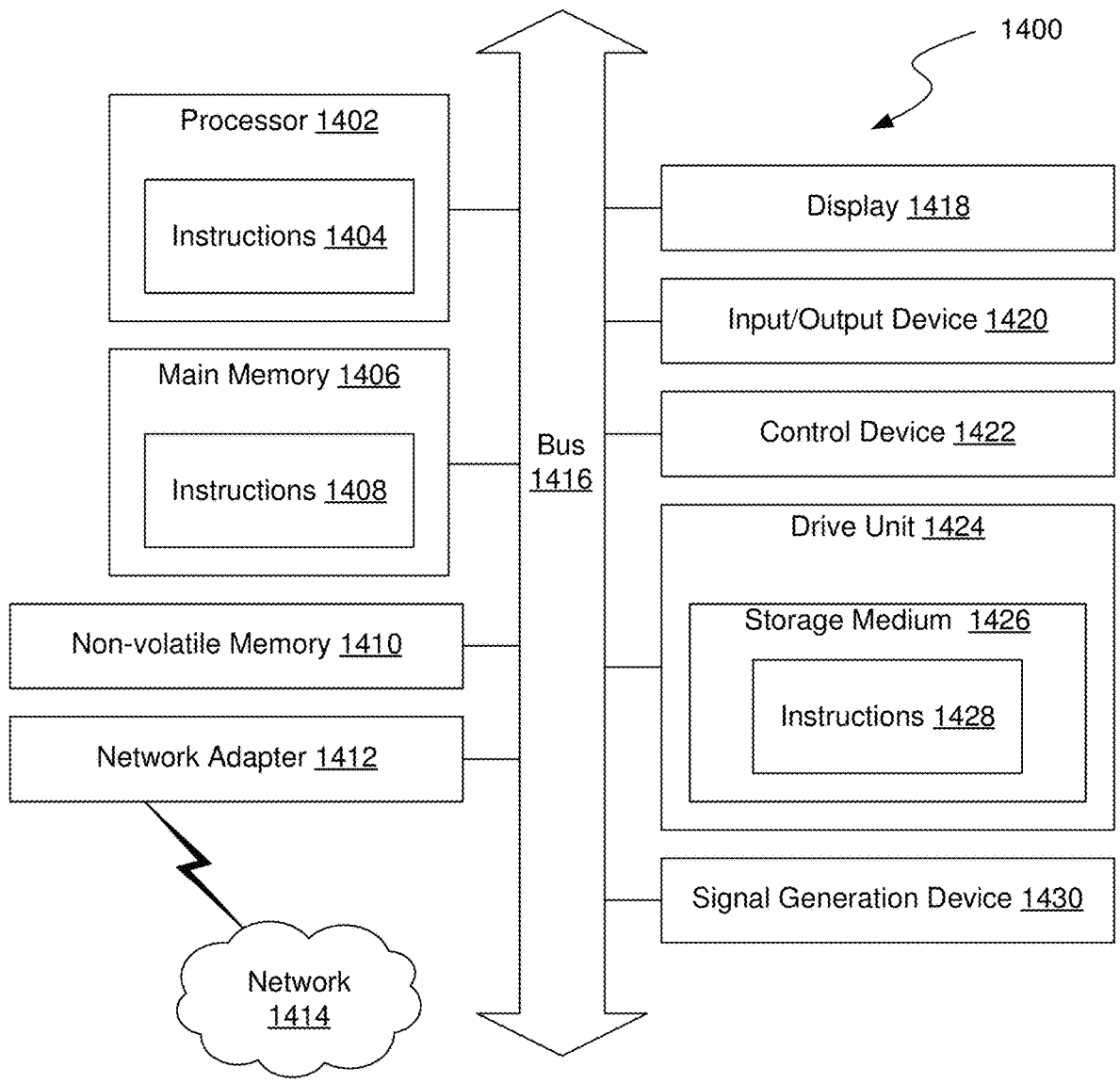
FIG. 14 shows a block diagram illustrating an example computer processing system in accordance with some embodiments.

FIG. 14 is a block diagram illustrating an example of a computer processing system 1400 in which at least some operations described in this disclosure can be implemented. The example computer processing system 1400 may be part of any of the aforementioned devices including, but not limited to, mobile device 104 or any of the aforementioned UAVs 100, 300, 500, 800, etc. The processing system 1400 may include one or more processors 1402 (e.g., CPU), main memory 1406, non-volatile memory 1410, network adapter 1412 (e.g., network interfaces), display 1418, input/output devices 1420, control device 1422 (e.g., keyboard and pointing devices), drive unit 1424, including a storage medium 1426, and signal generation device 1430 that are communicatively connected to a bus 1416. The bus 1416 is illustrated as an abstraction that represents any one or more separate physical buses, point-to-point connections, or both, connected by appropriate bridges, adapters, or controllers. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 1404, 1408, 1428), set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine or computer-readable media used to actually effect the distribution.

Further examples of machine-readable storage media, machine-readable media, or computer-readable (storage) media include recordable type media such as volatile and non-volatile memory devices 1410, floppy and other removable disks, hard disk drives, optical discs (e.g., Compact Disc Read-Only Memory (CD-ROMS), Digital Versatile Discs (DVDs)), and transmission type media, such as digital and analog communication links.

The network adapter 1412 enables the computer processing system 1400 to mediate data in a network 1414 with an entity that is external to the computer processing system 1400, such as a network appliance, through any known and/or convenient communications protocol supported by the computer processing system 1400 and the external entity. The network adapter 1412 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1412 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specifications and drawings are to be regarded in an illustrative sense, rather than a restrictive sense.

What is claimed is:

1. An aerial vehicle comprising:
   a plurality of upward facing cameras;
   a plurality of downward facing cameras;
   a forward facing camera attached to a gimbal;
   a plurality of illumination sources; and
   control circuitry communicatively coupled to the plurality of image capture devices and the plurality of illumination sources, the control circuitry configured to:
   selectively direct at least one of the plurality of illumination sources to emit transient bursts of light in a direction such that the bursts of light illuminate only portions of a surrounding physical environment;
   selectively direct one or more of the plurality of upward facing cameras or the plurality of downward facing cameras to capture images of the illuminated portions of the surrounding physical environment,
   wherein the transient bursts of light coincide with exposure periods of the one or more of the plurality of upward facing cameras or the plurality of downward facing cameras;
   process the images of the illuminated portions of the surrounding physical environment to obtain depth measurements; and
   generate a planned trajectory for the aerial vehicle through the surrounding physical environment based on the depth measurements.

2. The aerial vehicle of claim 1, wherein the emitted transient bursts of light illuminate the surrounding physical environment for only a period of time sufficient to capture the images of the illuminated portions of the surrounding physical environment.

3. The aerial vehicle of claim 1, wherein the control circuitry is further configured to:
   control a propulsion system and/or a flight surface of the aerial vehicle to cause the aerial vehicle to autonomously maneuver along the planned trajectory.

4. The aerial vehicle of claim 1, wherein each of the plurality of illumination sources is arranged with a corresponding one of the plurality of upward facing cameras or the plurality of downward facing cameras.

5. The aerial vehicle of claim 1, wherein the control circuitry is configured to selectively direct at the least one of the one or more of the plurality of illumination sources to emit the transient bursts of light based on environmental conditions.

6. The aerial vehicle of claim 1, wherein the environmental conditions and/or aerial vehicle parameters comprise one or more of:
   ambient light levels,
   a type of environment, and
   a current or planned motion or trajectory of the aerial vehicle.

7. The aerial vehicle of claim 1, wherein the one or more illumination sources emit bright burst of light with power output in a range of 10 to 1,000 watts.

8. The aerial vehicle of claim 1, wherein the transient bursts of light illuminate only portions of the environment using patterns of directed beams of light.

9. The aerial vehicle of claim 1, wherein the emitted transient bursts of light comprise infrared transient bursts of light.

10. The aerial vehicle of claim 1, wherein the control circuitry is configured to selectively direct the at least one of the one or more of the plurality of illumination sources to emit the transient bursts of light based on aerial vehicle parameters.

* * * * *